United States Patent
Shintani et al.

(10) Patent No.: US 10,798,283 B2
(45) Date of Patent: Oct. 6, 2020

(54) INFORMATION APPARATUS, CONTROL METHOD, AND COMPUTER READABLE RECORDING MEDIUM DETERMINING STATE INFORMATION OF THE INFORMATION APPARATUS ACROSS A POWER SWITCH AND TRANSMITTING SUCH STATE INFORMATION TO AN EXTERNAL, PORTABLE INFORMATION TERMINAL

(71) Applicant: Olympus Corporation, Hachioji-shi, Tokyo (JP)

(72) Inventors: Koichi Shintani, Hachioji (JP); Akira Tani, Sagamihara (JP); Kensei Ito, Sagamihara (JP); Yoshiyuki Fukuya, Sagamihara (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 52 days.

(21) Appl. No.: 16/191,411

(22) Filed: Nov. 14, 2018

(65) Prior Publication Data
US 2019/0158725 A1 May 23, 2019

(30) Foreign Application Priority Data

Nov. 21, 2017 (JP) ................................ 2017-224051
Dec. 28, 2017 (JP) ................................ 2017-254632

(51) Int. Cl.
*H04N 5/232* (2006.01)

(52) U.S. Cl.
CPC ..... *H04N 5/23206* (2013.01); *H04N 5/23241* (2013.01); *H04N 5/23245* (2013.01); *H04N 5/23293* (2013.01)

(58) Field of Classification Search
None
See application file for complete search history.

(56) References Cited

U.S. PATENT DOCUMENTS 8,634,095 B2 * 1/2014 Watanabe .......... G03G 15/5004
358/1.1
9,886,231 B2 * 2/2018 Jacobsen ................ G06F 3/017
(Continued)

FOREIGN PATENT DOCUMENTS

JP        2004-356992       12/2004
JP        2010068372 A  *    3/2010
(Continued)

OTHER PUBLICATIONS

Machine Translation of JP2010-068372 A (Year: 2010).*
Machine Translation of (JP2014-038367A (Year: 2014).*
Machine Translation of JP2016-100722A (Year: 2016).*

*Primary Examiner* — Tyler W. Sullivan
(74) *Attorney, Agent, or Firm* — John C. Pokotylo; Pokotylo Patent Services

(57) ABSTRACT

An information apparatus for communicating with a portable information terminal includes a processor including hardware. The processor determines state information regarding a state of the information apparatus when the power state is switched, by the power switch, from the on state to the office state. The processor also determines whether the manually set parameter has been changed before and after the power state is switched from the on state to the off state, based on the use history information of a manually set parameter in the information apparatus. Finally, the information apparatus transmits, to the portable information terminal, the state information indicating that the set parameter in the information apparatus has been changed when the processor determines that the set parameter has been
(Continued)

changed while keeping the processor energized after the power state is switched from the on state to the off state.

18 Claims, 35 Drawing Sheets

(56) References Cited

U.S. PATENT DOCUMENTS

| | | | | |
|---|---|---|---|---|
| 9,967,447 | B2* | 5/2018 | Aizawa | H04N 5/23206 |
| 10,061,479 | B2* | 8/2018 | Shigemitsu | H04N 21/4436 |
| 2009/0164821 | A1* | 6/2009 | Drescher | H04W 52/0283 |
| | | | | 713/323 |
| 2014/0244344 | A1* | 8/2014 | Bilet | G16H 40/20 |
| | | | | 705/7.28 |
| 2015/0062607 | A1* | 3/2015 | Higashi | G06F 1/32 |
| | | | | 358/1.13 |
| 2016/0026853 | A1* | 1/2016 | Wexler | G06T 7/97 |
| | | | | 382/103 |
| 2016/0132099 | A1* | 5/2016 | Grabau | G06F 1/3296 |
| | | | | 713/323 |
| 2019/0114888 | A1* | 4/2019 | Wei | G08B 13/19 |
| 2019/0141283 | A1* | 5/2019 | Haas | G11B 27/10 |

FOREIGN PATENT DOCUMENTS

| | | |
|---|---|---|
| JP | 2013-257896 | 12/2013 |
| JP | 2014038367 A * | 2/2014 |
| JP | 2016100722 A * | 5/2016 |

* cited by examiner

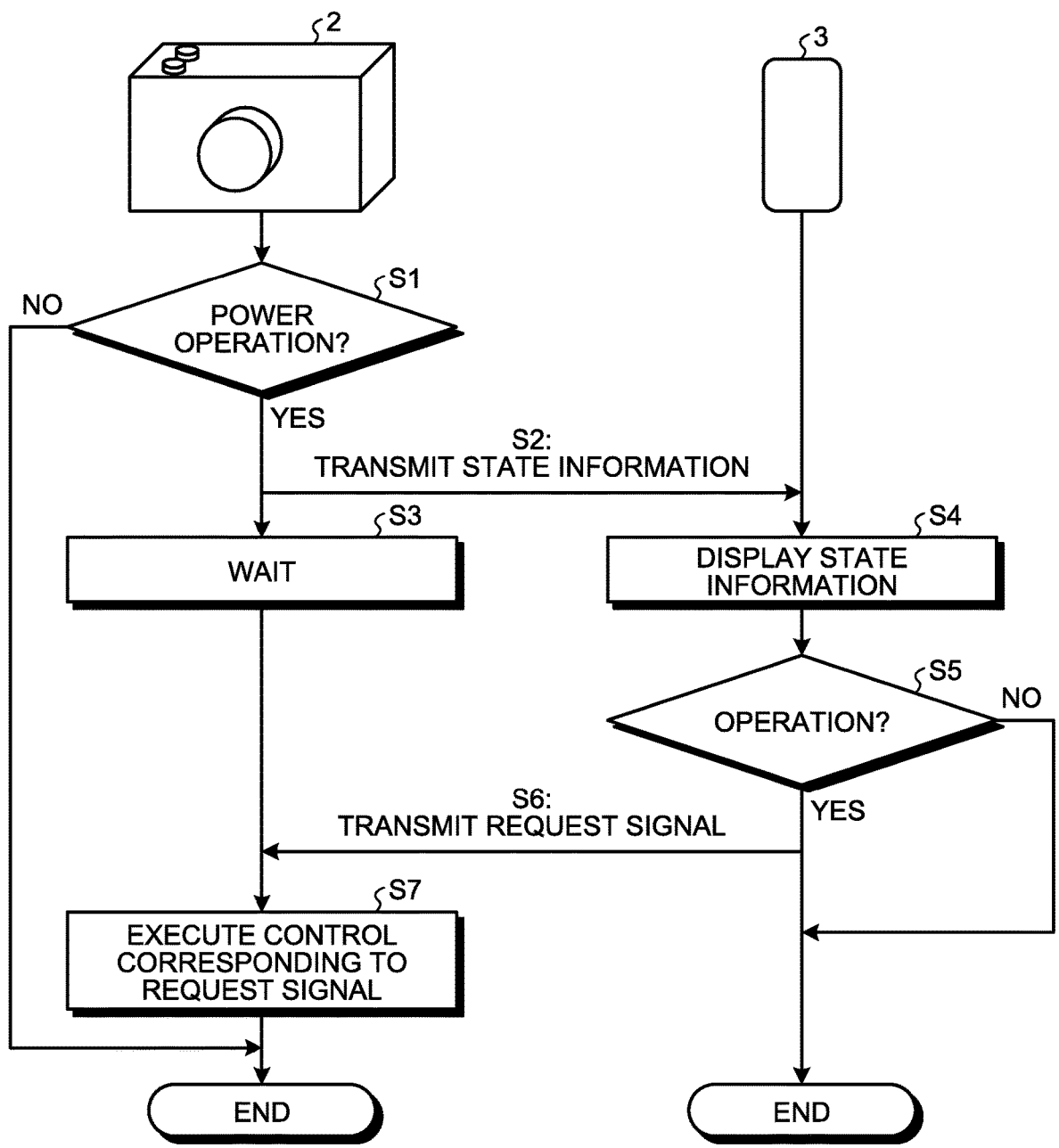

FIG.12

| T1 |
|---|
| SET INFORMATION |
| BATTERY REMAINING AMOUNT INFORMATION |
| MEMORY REMAINING AMOUNT INFORMATION |
| ADDITIONAL IMAGE THUMBNAIL INFORMATION |

INFORMATION APPARATUS, CONTROL METHOD, AND COMPUTER READABLE RECORDING MEDIUM DETERMINING STATE INFORMATION OF THE INFORMATION APPARATUS ACROSS A POWER SWITCH AND TRANSMITTING SUCH STATE INFORMATION TO AN EXTERNAL, PORTABLE INFORMATION TERMINAL

CROSS-REFERENCE TO RELATED APPLICATIONS

This application is based upon and claims the benefit of priority from Japanese Patent Application No. 2017-224051, filed on Nov. 21, 2017 and Japanese Patent Application No. 2017-254632, filed on Dec. 28, 2017, the entire contents of which are incorporated herein by reference.

BACKGROUND

The present disclosure relates to an information apparatus, a control method, and a computer readable recording medium.

Recently, there has been known a technique of preventing the power of a mobile phone from being turned off by an intentional power off operation, by prohibiting power shutdown when a power off operation is performed and when it cannot be confirmed that an owner of the mobile phone and an operator are an identical person, and transmitting the fact to a predetermined terminal (e.g. JP 2004-356992 A).

Furthermore, recently, users likely have portable information terminals (smartphone, wearable terminals, etc.) with them, and frequently perform daily communication with other users using a social networking service (SNS), or the like under such a situation, it may be considered that a possibility of being capable of effectively utilizing the convenience of other apparatuses by transmitting useful information to the portable information terminal similarly to performing communication with other users has spread.

SUMMARY

An information apparatus for communicating with a portable information terminal according to one aspect of the present disclosure includes a processor including hardware, the processor being configured to determine a use situation based on an operating rate per unit time of the information apparatus and transmit the use situation to the portable information terminal at a specific timing.

The above and other features, advantages and technical and industrial significance of this invention will be better understood by reading the following detailed description of presently preferred embodiments of the disclosure, when considered in connection with the accompanying drawings.

BRIEF DESCRIPTION OF THE DRAWINGS

FIG. 4 is a conceptual diagram schematically illustrating an overview of processing executed by the communication system according to the first embodiment;

FIG. 12 is a diagram schematically illustrating an overview of state information;

DETAILED DESCRIPTION

Figure 1:
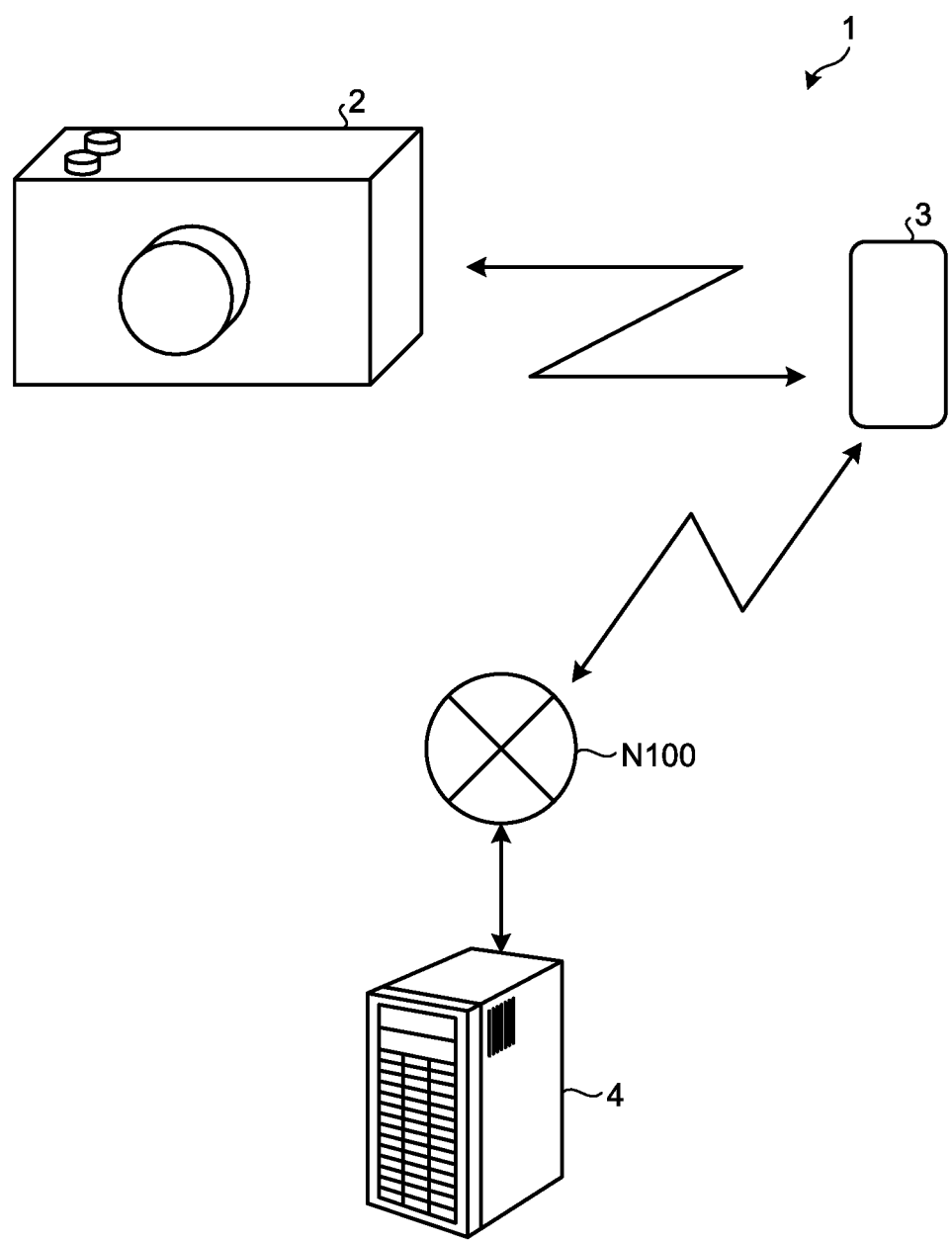
FIG. 1 is a schematic diagram illustrating an overview of a communication system according to a first embodiment.

Embodiments of the present disclosure will be described in detail below with reference to the drawings. In addition, the present disclosure is not limited by the following embodiments. In addition, the drawings to be referred to in the following description only schematically illustrate shapes, sizes, and positional relationships to such a degree that the description of the present disclosure can be understood. In other words, the present disclosure is not limited to the shapes, sizes, and positional relationships that are exemplified in the drawings. Furthermore, the following description will be given using, as an example of an information apparatus, an imaging apparatus that can interactively communicate with a mobile phone, but aside from the imaging apparatus, the present disclosure can be applied to a tablet terminal apparatus, a camcorder, an IC recorder equipped with a shooting function, a microscope such as a video microscope, and an industrial or medical endoscope.

First Embodiment

Overview of Communication System

FIG. 1 is a schematic diagram illustrating an overview of a communication system according to a first embodiment; A communication system 1 illustrated in FIG. 1 includes an information apparatus 2 that generates image data by capturing an image of a subject, and a portable information terminal 3 that can perform phone conversation with an external apparatus according to a predetermined communication standard. The following description will be given using a digital still camera as an example of the information apparatus 2, but aside from the digital still camera, the present disclosure can be applied to a tablet terminal apparatus, a camcorder, an IC recorder equipped with a shooting function, a microscope such as a video microscope, and an industrial or medical endoscope. In addition, the description will be given using a mobile phone as an example of the portable information terminal 3, but aside from the mobile phone, the present disclosure can be applied to a tablet terminal apparatus and a personal computer. Meanwhile, in an information apparatus such as a portable apparatus that can communicate with another apparatus, when power off of the information apparatus is performed, various types of information regarding a state of the information apparatus that are to be displayed on a display monitor of the information apparatus become nondisplay, and it becomes unable to recognize setting content changed by the information apparatus and a state of the information apparatus. Thus, recently, setting content changed by the information apparatus and a state of the information apparatus are desired to be identified in a power operation of the information apparatus. Nevertheless, conventionally, when a person is not an identical person of a mobile phone in a power off operation, the fact is only transmitted to a predetermined terminal. Thus, there has been such a problematic point that setting content changed by the information apparatus and state information regarding a state of the information apparatus cannot be recognized in a power operation of the information apparatus.

In the communication system 1 illustrated in FIG. 1, the information apparatus 2 and the portable information terminal 3 can interactively perform communication according to a predetermined communication standard. Specifically, the information apparatus 2 can wirelessly transmit image data and various types of information to the portable information terminal 3, display information transmitted from the portable information terminal 3, and perform control corresponding to an instruction signal transmitted from the portable information terminal 3. Furthermore, the information apparatus 2 can perform transmission, via a network N100, to an external social networking service (SNS) server 4, a photo storage server that records image data, and the like. In addition, the portable information terminal 3 can receive image data and various types of information from the information apparatus 2, transmit various types of information to the information apparatus 2, and transmit an instruction signal for instructing a predetermined operation of the information apparatus 2, such as a release instruction signal and a change signal for changing a shooting parameter, for example. Furthermore, the portable information terminal 3 can transmit, via the network N100, image data received from the information apparatus 2, to an SNS server, a photo storage server, and the like.

Under a situation illustrated in FIG. 1, when the information apparatus 2 and the portable information terminal 3 can interactively perform communication, when the user ends shooting that uses the information apparatus 2, the user performs a power operation such as a power off operation, for example, on the information apparatus 2, without checking the setting of the information apparatus 2 and state information indicating a state that are displayed on the information apparatus 2. Thus, because there is a high possibility that the user does not recognize the state of the information apparatus 2 when the user next performs shooting using the information apparatus 2, for example, a shooting mode and a shooting parameter of the information apparatus 2 of which the user can manually change the setting are set to unintended set parameters, battery capacity of the information apparatus 2 becomes insufficient, and capacity of a recording medium such as a memory card becomes insufficient. As a result, there has been a possibility that, even when the user performs shooting using the information apparatus 2, the user fails to perform shooting using a desired set parameter, and when shooting is performed by lending the information apparatus 2 to a third party other than the user, and asking the third party for shooting, a captured image fails to be in a desired state, or shooting fails to be performed due to capacity shortage of a memory card. Thus, in this first embodiment, when a power operation is performed on the information apparatus 2, state information of the information apparatus 2 is transmitted to the portable information terminal 3. Thus, in the following description, after a configuration of the information apparatus 2 and a configuration of the portable information terminal 3 are described, processes of the information apparatus 2 and the portable information terminal 3 will be described.

Configuration of Information Apparatus

First, a configuration of the information apparatus 2 will be described.

Figure 2:
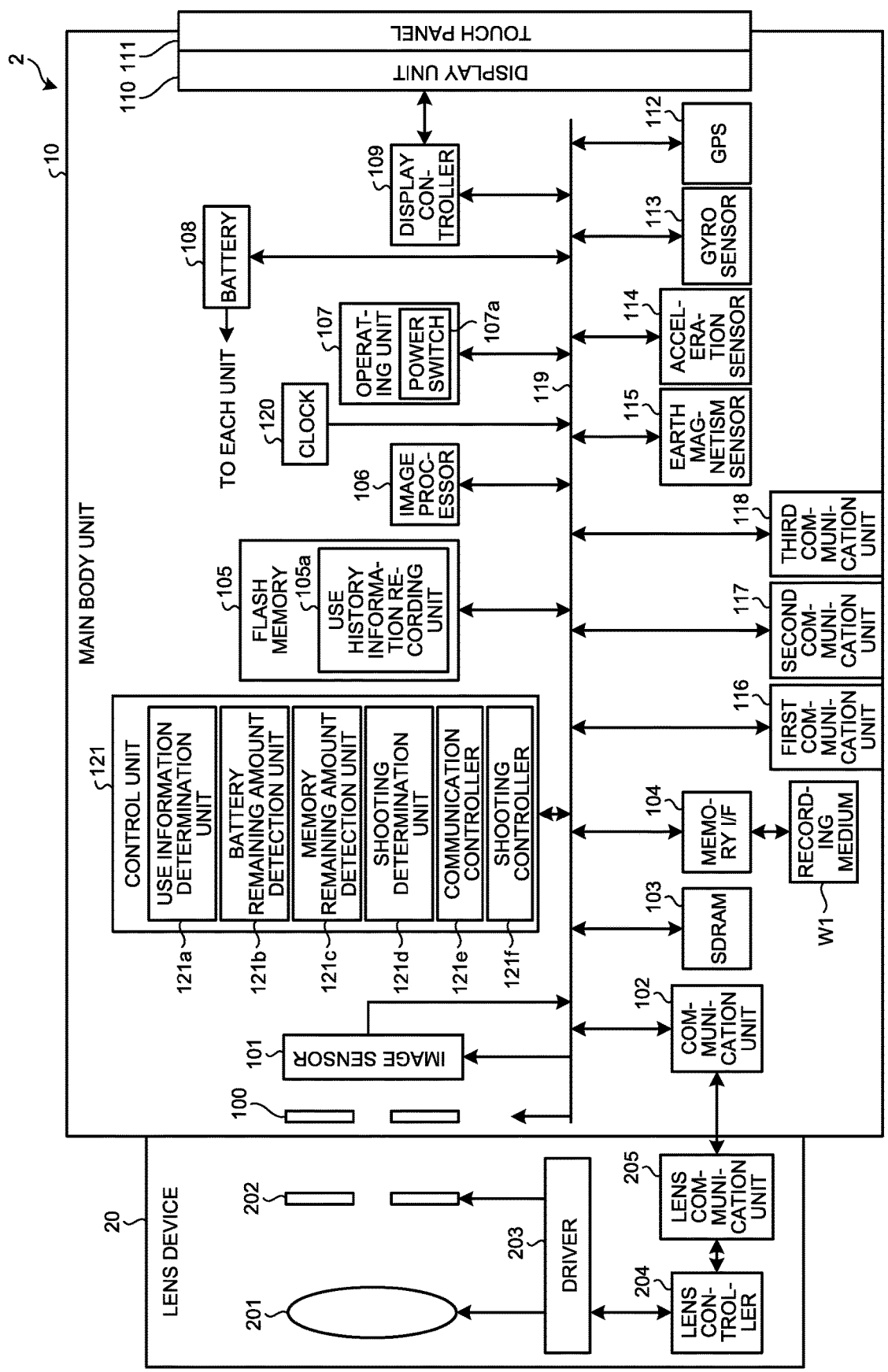
FIG. 2 is a block diagram illustrating a functional configuration of an information apparatus according to the first embodiment.

FIG. 2 is a block diagram illustrating a functional configuration of the information apparatus 2.

The information apparatus 2 illustrated in FIG. 2 includes a main body unit 10 and a lens device 20 detachable with respect to the main body unit 10.

Configuration of Lens Device

First, a configuration of the lens device 20 will be described.

The lens device 20 includes an optical system 201, a diaphragm 202, a driver 203, a lens controller 204, and a lens communication unit 205.

The optical system 201 includes a single or a plurality of lenses, and forms a subject image by condensing light from a predetermined viewing field region. Under the control of the lens controller 204 to be described later, the optical system 201 is moved in an optic axis direction by the driver 203 to thereby change a focal length and a focal position.

The diaphragm 202 adjusts exposure by controlling an entrance amount of light condensed by the optical system 201. The diaphragm 202 changes an aperture value using the driver 203.

The driver 203 changes a focal position and a focal length of the optical system 201 by moving the optical system 201 along the optical axis direction under the control of the lens controller 204. In addition, the driver 203 changes an aperture value by driving the diaphragm 202 under the control of the lens controller 204. The driver 203 includes a drive circuit and the like.

Based on an instruction signal input from the main body unit 10 via the lens communication unit 205, the lens controller 204 controls the optical system 201 and the diaphragm 202 by controlling driving of the driver 203. The lens controller 204 includes a central processing unit (CPU) and the like.

The lens communication unit 205 transmits an instruction signal input from the main body unit 10, to the lens controller 204 according to a predetermined communication standard, and transmits a signal input from the lens controller 204, to the main body unit 10.

Configuration of Main Body Unit

Next, a configuration of the main body unit 10 will be described.

The main body unit 10 includes a shutter 100, an image sensor 101, a communication unit 102, a synchronous dynamic random access memory (SDRAM) 103, a memory interface (I/F) 104, a flash memory 105, an image processor 106, an operating unit 107, a battery 108, a display controller 109, a display unit 110, a touch panel 111, a global positioning satellite (GPS) unit 112, a gyro sensor 113, an acceleration sensor 114, an earth magnetism sensor 115, a first communication unit 116, a second communication unit 117, a third communication unit 118, a bus 119, and a control unit 121.

Under the control of the control unit 121 to be described later, the shutter 100 sets a state of the image sensor 101 to an exposure state or a light-shielded state. For example, the shutter 100 includes a focal plane shutter or the like. In addition, an electrical shutter in the image sensor 101 to be described later may be used without using the shutter 100.

Under the control of the control unit 121 to be described later, the image sensor 101 generates and outputs image data (RAW data) by receiving a subject image condensed by the optical system 201, and performing photoelectric conversion. The image sensor 101 includes an image sensor such as a charge coupled device (CCD) and a complementary metal oxide semiconductor (CMOS). In addition, in this first embodiment, the description will be given using an image sensor having a Bayer array, as an example of the image sensor 101, but the image sensor 101 may be a stack-type image sensor such as Fovion, or may be an image sensor including a pixel having sensitivity to infrared light, for example. In addition, the image sensor 101 has an electrical shutter function that can electrically control a light receiving amount under the control of the control unit 121 to be described later.

The communication unit 102 transmits an instruction signal input from the control unit 121, to the lens device 20 according to a predetermined communication standard, and transmits a signal input from the lens device 20, to the control unit 121.

The SDRAM 103 temporarily records image data (RAW data) input from the image sensor 101 via the bus 119, and various types of information being processed by the information apparatus 2.

Under the control of the control unit 121 to be described later, the memory I/F 104 writes image data into a recording medium W1 such as a memory card that is attached from the outside of the main body unit 10, reads out image data recorded on the recording medium, and outputs the image data to the SDRAM 103.

The flash memory 105 records various programs for operating the information apparatus 2, and various types of data used in the execution of the programs. In addition, the flash memory 105 includes a use history information recording unit 105a that records a use history of a set parameter manually-settable in the information apparatus 2.

The image processor 106 includes a graphics processing unit (GPU), a Field Programmable Gate Array (FPGA), and the like, and performs predetermined image processing on image data (RAW data) generated by the image sensor 101. Here, as the predetermined image processing, basic image processing including noise reduction processing, optical black reduction processing, and white balance adjustment processing, and including synchronization processing of image data, color matrix calculation processing, y-correction processing, color reproduction processing, edge enhancement processing, and the like when the image sensor 101 has the Bayer array is performed. In addition, the image processor 106 performs image processing for reproducing a natural image, based on preset parameters of each type of image processing. Here, the parameters of each type of image processing include values of contrast, sharpness, saturation, white balance, and gradation. Furthermore, the image processor 106 executes special effect processing of applying a visual effect by combining a plurality of types of image processing. Here, as the special effect processing, for example, there is tone curve processing, saturation up processing, soft focus effect processing, whiteout effect processing, shading effect processing, starlight effect processing, or the like.

The operating unit 107 receives input of instruction signals for issuing various instructions of the information apparatus 2. The operating unit 107 includes a power switch 107a for switching a power state of the information apparatus 2 to an on state or an off state, a release switch for issuing a shooting instruction, an operating switch for switching various settings of the information apparatus 2, an operation switch for issuing an operation shooting instruction, a focus switch for changing a focus position of the information apparatus 2, an exposure compensation switch for compensating an exposure value of the information apparatus 2, a sensitivity (ISO) change switch for changing ISO sensitivity of the information apparatus 2, and the like. In addition, the operating unit 107 includes a push switch, a jog dial, a rotating lever, and the like.

The battery 108 is detachable with respect to the information apparatus 2, and supplies predetermined voltage to each unit constituting the information apparatus 2. The battery 108 includes a lithium ion rechargeable battery, a nickel hydride rechargeable battery, and the like.

The display controller 109 controls a display mode of the display unit 110. Specifically, the display controller 109 causes a live view image corresponding to image data on which the image processor 106 has performed image processing, to be displayed on the display unit 110. In addition, the display controller 109 causes state information indicating a current state of the information apparatus 2, to be displayed on the display unit 110. Here, the state information includes a battery remaining amount of the information apparatus 2, a memory remaining amount of the recording medium W1 attached to the information apparatus 2, and shooting parameters of the information apparatus 2 (e.g. shutter speed, aperture value, focal length, focus position, type of AF mode, ISO sensitivity, presence or absence of face detection, setting state of special effect processing, and type of image quality mode).

The display unit 110 includes a display panel such as a liquid crystal or an organic Electro Luminescence (EL). Under the control of the display controller 109, the display unit 110 displays various types of information regarding the information apparatus 2, a live view image, a captured image, and a moving image.

The touch panel 111 is provided with being superimposed on a display area of the display unit 110, detects a position touched from the outside, and outputs a signal corresponding to the detected position, to the control unit 121.

The GPS 112 receives trajectory information of satellites transmitted from a plurality of GPS satellites constituting a Global Positioning System (GPS) being a measuring means for measuring a position of an object on the ground, acquires position information of the information apparatus 2 in shooting and image playback, based on the received trajectory information, and outputs the position information to the control unit 121. Here, the position information is longitude, latitude, and time information.

The gyro sensor 113 detects posture of the information apparatus 2, and outputs the detection result to the control unit 121. Specifically, the gyro sensor 113 detects an angular velocity (inclination) of each of a yaw direction, a roll direction, and a pitch direction of the information apparatus 2, and outputs the angular velocity to the control unit 121.

The acceleration sensor 114 detects acceleration generated in the information apparatus 2, and outputs the detection result to the control unit 121.

The earth magnetism sensor 115 detects orientation of the information apparatus 2 that is obtainable when a direction in which an optical axis of the lens device 20 is oriented for the viewing field region is regarded as reference orientation, in a case where the optical axis of the lens device 20 becomes substantially horizontal. Specifically, the earth magnetism sensor 115 detects the orientation of the information apparatus 2 by detecting components of a vertical direction and a horizontal direction of earth magnetism, and detecting, as an azimuth angle, an angle formed by reference orientation that is based on north, and the optical axis of the lens device 20 in the information apparatus 2.

Under the control of the control unit 121, the first communication unit 116 performs radio communication of various types of data including a signal necessary for communication, with the portable information terminal 3 according to a predetermined protocol. The first communication unit 116 employs Bluetooth (registered trademark) (hereafter referred to simply as "Bluetooth") communication. In addition, the first communication unit 116 may employ another communication such as infrared communication (Infrared Data Association (IrDA)), aside from the Bluetooth communication. For example, in the case of Bluetooth, as roles of apparatuses, a relationship of a master and a slave in a close-range one-to-one relationship is obtained, and as schematic connection processing, the master searches for a desired slave, and performs connection. Thus, communication easily works out only by a relationship of an inquiry and a response. In other words, as a rough connection sequence, first, a master performs an inquiry as to whether a slave apparatus exists. Subsequently, the slave returns a response to the inquiry from the master. After that, the master connects with a desired slave among slaves that have responded. Nevertheless, in data communication, data transmission and reception are performed according to data transmission and reception instructions from the master, and if the master does not permit, data transmission and reception cannot be performed.

Under the control of the control unit 121, the second communication unit 117 performs radio communication of various types of data including a signal necessary for communication, with the portable information terminal 3 according to a predetermined protocol. The second communication unit 117 employs Bluetooth Low Energy (registered trademark) communication (hereinafter, simply referred to as "BLE communication").

Under the control of the control unit 121, the third communication unit 118 performs radio communication of various types of data including a signal necessary for communication, with an external server via the network N100 according to a predetermined protocol. The third communication unit 118 employs Wireless Fidelity (Wi-Fi) (registered trademark) (hereafter simply referred to as "Wi-Fi" or "WiFi") communication. For example, in the case of Wi-Fi, a local network is assumed, and as roles of apparatuses, there is a relationship of an access point and a station, and as schematic connection processing, a relationship in which the station connects to a wireless network constructed by the access point is obtained. As a rough connection sequence, first, the access point constructs a wireless network, and reports a network identifier (e.g., Service Set Identifier (SSID)) of itself. Subsequently, the station searches for the reported network identifier (SSID), and connects to a desired network (access point). Because a network with a number of apparatuses is assumed, a covered range is wide, and a strict identification step is to be taken while considering an interference problem. Thus, it sometimes takes time for connection establishment. Nevertheless, in data communication, data transmission and reception can be performed at individual timings of the access point and the station. In addition, the third communication unit 118 may employ communication that uses 4G radio, aside from Wireless Fidelity (Wi-Fi). It should be appreciated that the third communication unit 118 may employ another communication such as communication that uses 3G radio, communication that uses 5G radio, and Worldwide Interoperability for Microwave Access (WiMAX) communication.

The bus 119 serves as a transmission path connecting the units of the information apparatus 2, and transfers various types of data generated inside the information apparatus 2, to the units of the information apparatus 2.

A clock 120 counts a time, and outputs the time counting result to the control unit 121. Aside from the time counting function, the clock 120 generates time and date information regarding time and date of image data generated by the image sensor 101, and outputs the time and date information to the control unit 121.

The control unit 121 includes a central processing unit (CPU) and an application specific integrated circuit (ASIC), and comprehensively controls the units constituting the information apparatus 2. The control unit 121 includes a use information determination unit 121a, a battery remaining amount detection unit 121b, a memory remaining amount detection unit 121c, a shooting determination unit 121d, a communication controller 121e, and a shooting controller 121f.

The use information determination unit 121a determines a state of the information apparatus 2. Specifically, the use information determination unit 121a determines a variation in a set state of the information apparatus 2 that is changed by the user before and after a power state of the information apparatus 2 is switched (from the on state to the off state, or from the off state to the on state), or determines a variation in a wear state of each unit constituting the information apparatus 2. More specifically, the use information determination unit 121a determines, as a set state of the information apparatus 2 that is changed by the user before and after a power state of the information apparatus 2 is switched (from the on state to the off state, or from the off state to the on state), a transition of a set parameter manually-settable in the information apparatus 2 that is caused before and after the time of a power operation of the information apparatus 2, and the presence or absence of a captured image before and after the time of a power operation of the information apparatus 2. In addition, the use information determination unit 121a determines, as a wear state of each unit constituting the information apparatus 2, a wear state of the image sensor 101, a wear state that is based on the number of release times (the number of shutter times) of the shutter 100, a wear state of the battery 108, a remaining amount of the battery 108 attached to the information apparatus 2, and a memory remaining amount of the recording medium W1. For example, the use information determination unit 121a determines, based on use history information recorded in the use history information recording unit 105a of the flash memory 105, whether a set parameter has been changed before and after the time of a power operation of the information apparatus 2. More specifically, the use information determination unit 121a determines whether a set parameter having the number of times of use in a use history of a set parameter manually-settable in the information apparatus that is equal to or less than a predetermined value has been changed. Here, the set parameter includes a shooting parameter (aperture value (F value), shutter speed (SS), ISO sensitivity, exposure compensation value) and a parameter of the image processor 106. In addition, the use information determination unit 121a determines whether a remaining amount of the battery 108 that has been detected by the battery remaining amount detection unit 121b is a predetermined value or less. Furthermore, the use information determination unit 121a determines whether a memory remaining amount of the recording medium W1 that has been detected by the memory remaining amount detection unit 121c is a predetermined value or less. Furthermore, in addition, the use information determination unit 121a determines whether image data has been newly generated by the image sensor 101 before and after the power state has been switched.

The battery remaining amount detection unit 121b detects a remaining amount of the battery 108 attached to the information apparatus 2.

The memory remaining amount detection unit 121c detects a memory remaining amount of the recording medium W1 attached to the information apparatus 2.

The shooting determination unit 121d determines whether shooting has been performed after the power operation of the information apparatus 2.

The communication controller 121e controls communication of the first communication unit 116, the second communication unit 117, and the third communication unit 118. In addition, when it is determined by the use information determination unit 121a that the set parameter of the information apparatus 2 has been changed, the communication controller 121e transmits, as state information, that the set parameter in the information apparatus 2 has been changed, to the portable information terminal 3. In addition, when it is determined by the use information determination unit 121a that a remaining amount of the battery 108 is a predetermined value or less, the communication controller 121e transmits, as state information, that the remaining amount of the battery 108 is the predetermined value or less, to a portable information terminal 3. Furthermore, when it is determined by the use information determination unit 121a that a memory remaining amount of the recording medium W1 is a predetermined value or less, the communication controller 121e transmits, as state information, that the memory remaining amount of the recording medium W1 is the predetermined value or less, to the portable information terminal 3. Furthermore, in addition, when it is determined by the use information determination unit 121a that image data has been newly generated, the communication controller 121e transmits, as state information, thumbnail image data of the newly-generated image data, to the portable information terminal 3.

The shooting controller 121*f* performs shooting control of the information apparatus 2 by controlling the image sensor 101 and the lens device 20. In addition, under the operation of the operating unit 107, the shooting controller 121*f* changes a set parameter of which setting can be manually changed in the information apparatus 2.

Configuration of Portable Information Terminal

Next, a configuration of the portable information terminal 3 will be described.

Figure 3:
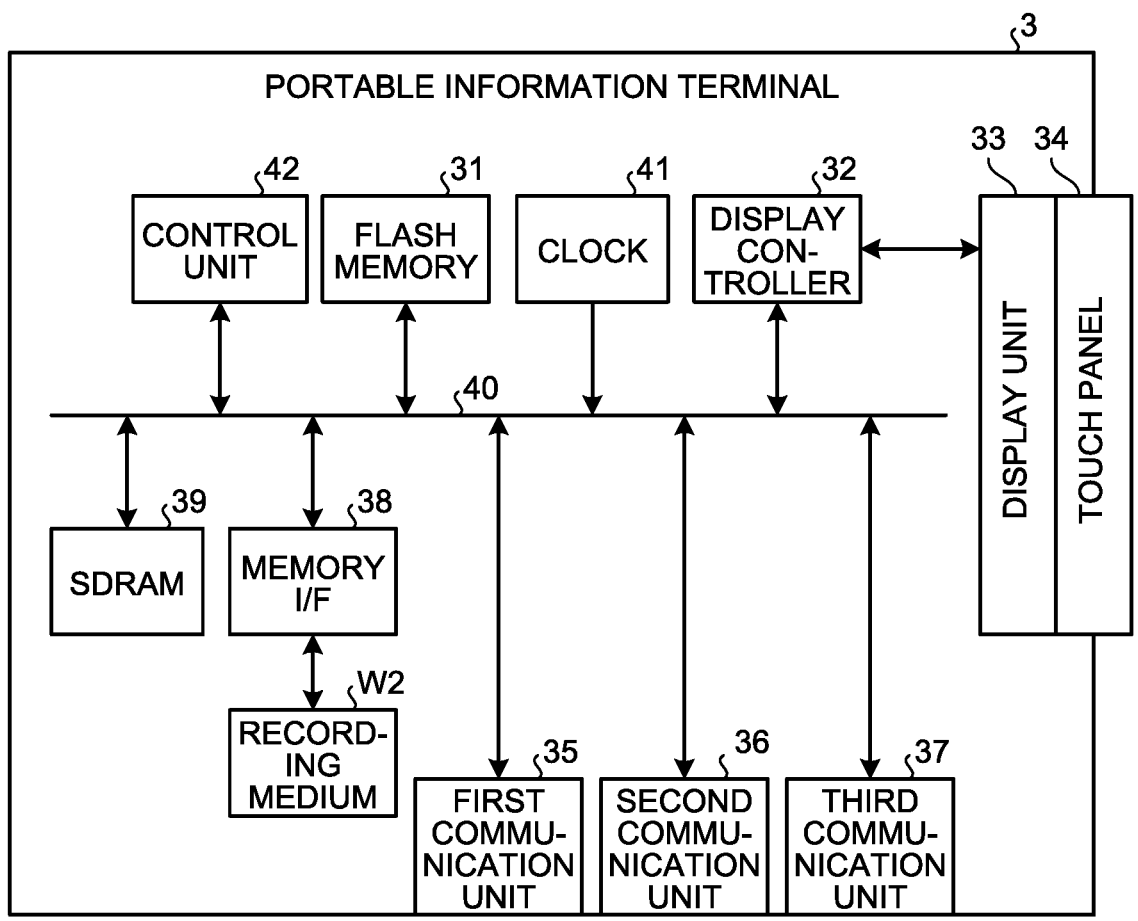
FIG. 3 is a block diagram illustrating a functional configuration of a portable information terminal according to the first embodiment.

FIG. 3 is a block diagram illustrating a functional configuration of the portable information terminal 3.

The portable information terminal 3 illustrated in FIG. 3 includes a flash memory 31, a display controller 32, a display unit 33, a touch panel 34, a first communication unit 35, a second communication unit 36, a third communication unit 37, a memory I/F 38, a SDRAM 39, a bus 40, and a control unit 42.

The flash memory 31 records various programs for operating the portable information terminal 3, and various types of data used in the execution of the programs.

The display controller 32 controls a display mode of the display unit 33. Specifically, the display controller 32 causes various types of information regarding the portable information terminal 3, and icons corresponding to various types of applications executable in the portable information terminal 3, to be displayed on the display unit 33.

The display unit 33 includes a display panel such as a liquid crystal or an organic EL. Under the control of the display controller 32, the display unit 33 displays various types of information regarding the portable information terminal 3 and the icons.

The touch panel 34 is provided with being superimposed on a display area of the display unit 33, detects a position touched from the outside, and outputs a signal corresponding to the detected position, to the control unit 42.

Under the control of the control unit 42 to be described later, the first communication unit 35 performs radio communication of various types of data including a signal necessary for communication, with the information apparatus 2 according to a predetermined protocol. The first communication unit 35 employs Bluetooth communication. In addition, the first communication unit 35 may employ another communication such as infrared communication (IrDA), aside from the Bluetooth communication.

Under the control of the control unit 42 to be described later, the second communication unit 36 performs radio communication of various types of data including a signal necessary for communication, with the information apparatus 2 according to a predetermined protocol. The second communication unit 36 employs BLE communication.

Under the control of the control unit 42 to be described later, the third communication unit 37 performs radio communication of various types of data including a signal necessary for communication, with an external server via the network N100 according to a predetermined protocol. The third communication unit 37 employs Wi-Fi communication. In addition, the third communication unit 37 may employ communication that uses 4G radio, aside from Wi-Fi. It should be appreciated that the third communication unit 37 may employ another communication such as communication that uses 3G radio, communication that uses 5G radio, and WiMAX communication.

Under the control of the control unit 42 to be described later, the memory I/F 38 writes various types of information such as, for example, image data, into a recording medium W2 such as a memory card that is attached from the outside of the portable information terminal 3, reads out various types of information recorded on the recording medium W2, and outputs the information to the SDRAM 39 to be described later.

The SDRAM 39 temporarily records various types of information being processed by the portable information terminal 3 via the bus 40.

The bus 40 serves as a transmission path connecting the units of the portable information terminal 3, and transfers various types of data generated inside the portable information terminal 3, to the units of the portable information terminal 3.

A clock 41 counts a time, and outputs the time counting result to the control unit 42. Aside from the time counting function, the clock 41 generates time and date information regarding time and date of each application recorded in the flash memory 31, and outputs the time and date information to the control unit 42.

The control unit 42 includes a CPU and the like, and controls the units constituting the portable information terminal 3.

Overview of Processing of Communication System

Next, an overview of processing executed by the communication system 1 will be described. FIG. 4 is a conceptual diagram schematically illustrating an overview of processing executed by the communication system 1.

As illustrated in FIG. 4, when a power operation such as, for example, a power off operation is performed by the user via the power switch 107*a* (Step S1: Yes), the information apparatus 2 first transmits state information regarding a state of the information apparatus 2, to the portable information terminal 3 by Bluetooth communication or BLE communication (Step S2), and waits until a signal from the portable information terminal 3 is received, or waits until a certain period of time elapses (Step S3). In this case, the information apparatus 2 performing polling in a state where BLE communication can be performed.

Subsequently, the portable information terminal 3 displays the state information received from the information apparatus 2 (Step S4), and when an operation corresponding to the state information is performed by the user (Step S5: Yes), transmits a request signal corresponding to the operation, to the information apparatus 2 by Bluetooth communication or BLE communication (Step S6). After Step S6, the portable information terminal 3 ends the processing.

After that, the information apparatus 2 executes control corresponding to the request signal received from the portable information terminal 3 (Step S7). For example, the information apparatus 2 transmits a memory remaining amount of the recording medium W1 to the portable information terminal 3, and releases the media of the recording medium W1 by deleting transmitted still image data and moving image data. After Step S7, the information apparatus 2 ends the processing.

In Step S1, when a power operation is not performed by the user (Step S1: No), the information apparatus 2 ends the processing.

In Step S5, when an operation corresponding to the state information is not performed by the user (Step S5: No), the portable information terminal 3 ends the processing.

Display Pattern of Portable Information Terminal

Next, a display pattern used when the portable information terminal 3 displays, in Step S4 described above, the state information received from the information apparatus 2 will be described. The portable information terminal 3 performs display while changing display content for each type of state information received from the information apparatus 2. Specifically, the portable information terminal 3 displays display content corresponding to four states. More specifically, the portable information terminal 3 performs display while changing display content according to first state information received when a set parameter is changed to a set parameter having the significantly-low number of times of use that is based on a use history of a set parameter of the information apparatus 2, second state information received when a battery remaining amount of the information apparatus 2 is a predetermined value or less, third state information received when a remaining amount of the recording medium W1 attached to the information apparatus 2 is a predetermined value or less, and fourth state information received when shooting is newly performed in the information apparatus 2.

First State Information

Figure 5A:
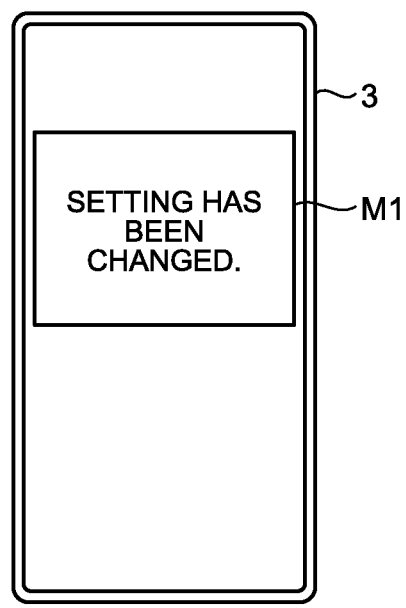
FIG. 5A is a diagram schematically illustrating an example of an image to be displayed when the portable information terminal according to the first embodiment receives first state information.
Figure 5B:
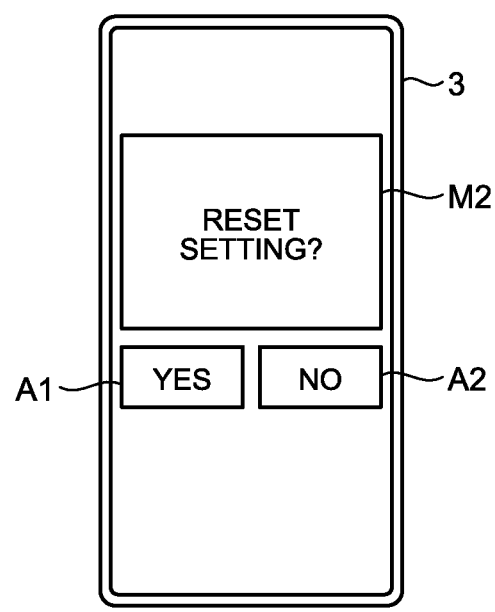
FIG. 5B is a diagram schematically illustrating an example of an image to be displayed when the portable information terminal according to the first embodiment receives first state information.

FIGS. 5A and 5B are diagrams schematically illustrating examples of images to be displayed when the portable information terminal 3 receives the first state information. As illustrated in FIG. 5A, when the first state information is received from the information apparatus 2, the portable information terminal 3 displays a message M1 corresponding to the first state information. After that, as illustrated in FIG. 5B, the portable information terminal 3 displays a message M2 for transmitting a reset request signal for resetting a set parameter of the information apparatus 2 to a state at the time of a power operation such as, for example, at the time of power on, or resetting the set parameter to a default value, an icon A1 for receiving input for transmitting the reset request signal, and an icon A2 for receiving input for not transmitting the reset request signal. The user selects the icon A1 or the icon A2. The portable information terminal 3 thereby transmits a reset request signal corresponding to an operation of the user, to the information apparatus 2. As a result, the information apparatus 2 resets a set parameter of the information apparatus 2 to a state at the time of a power operation such as, for example, at the time of power on.

Second State Information

Figure 6:
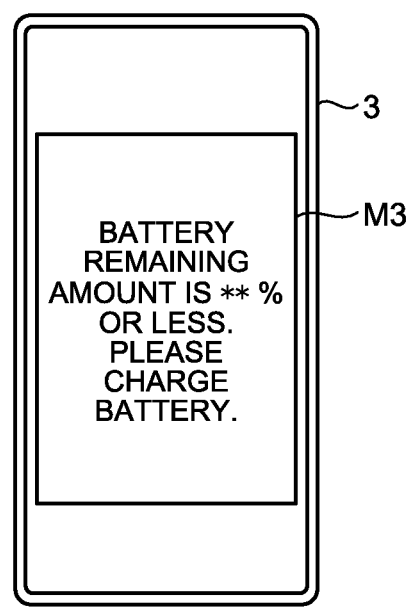
FIG. 6 is a diagram schematically illustrating an example of an image to be displayed when the portable information terminal according to the first embodiment receives second state information.

FIG. 6 is a diagram illustrating an example of an image to be displayed when the portable information terminal 3 receives the second state information. The portable information terminal 3 displays a message M3 corresponding to the second state information. In this case, the user detaches the battery 108 from the information apparatus 2, and performs charging of the battery 108.

Third State Information

Figure 7A:
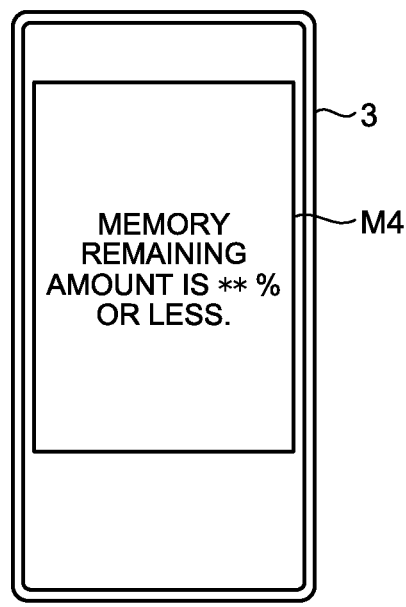
FIG. 7A is a diagram schematically illustrating an example of an image to be displayed when the portable information terminal according to the first embodiment receives third state information.
Figure 7B:
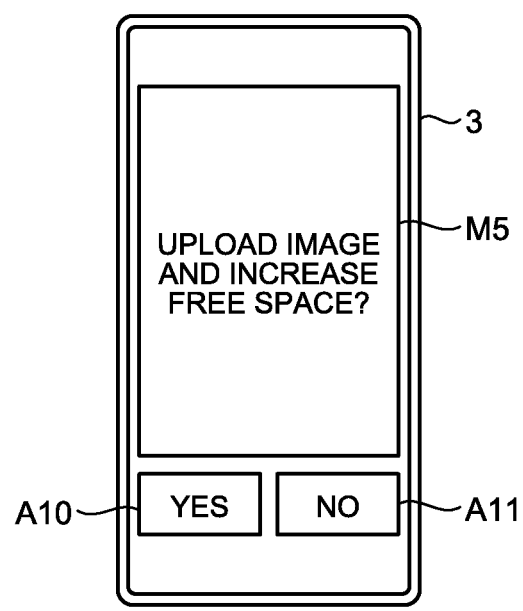
FIG. 7B is a diagram schematically illustrating an example of an image to be displayed when the portable information terminal according to the first embodiment receives third state information.
Figure 7C:
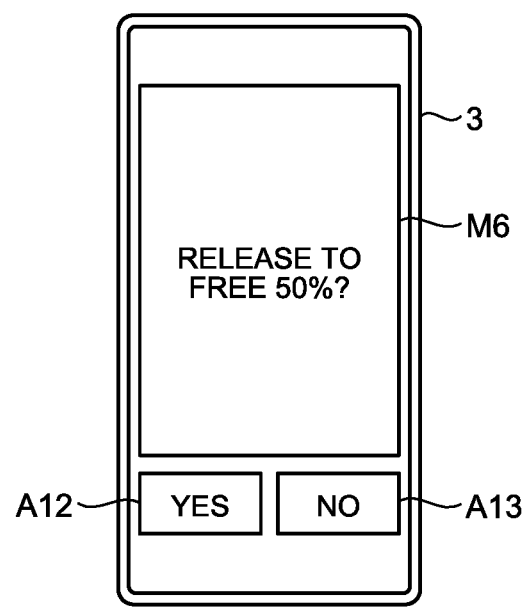
FIG. 7C is a diagram schematically illustrating an example of an image to be displayed when the portable information terminal according to the first embodiment receives third state information.

FIGS. 7A, 7B, and 7C are diagrams schematically illustrating examples of images to be displayed when the portable information terminal 3 receives the third state information. As illustrated in FIG. 7A, when the third state information is received from the information apparatus 2, the portable information terminal 3 displays a message M4 corresponding to the third state information. After that, as illustrated in FIG. 7B, the portable information terminal 3 displays a message M5 for transmitting a media release request signal for increasing a remaining amount of the recording medium W1 of the information apparatus 2, an icon A10 for receiving input for transmitting the media release request signal for increasing a remaining amount of the recording medium W1 of the information apparatus 2, and an icon A11 for receiving input for not transmitting the media release request signal for increasing a remaining amount of the recording medium W1 of the information apparatus 2. In this case, when the user selects the icon A10, as illustrated in FIG. 7C, the portable information terminal 3 displays a message M6 for transmitting a media release request signal for instructing a numerical value of a free space of the recording medium W1 of the information apparatus 2, an icon A12 for receiving input for transmitting a media release request signal for setting a free space of the recording medium W1 of the information apparatus 2, and an icon A13 for receiving input for cancelling the setting of a free space of the recording medium W1 of the information apparatus 2. In this case, the user sets a numerical value of a free space of the recording medium W1 of the information apparatus 2 by performing a slide operation or a flick operation on the touch panel 34 of the portable information terminal 3. Furthermore, the user selects the icon A12 or the icon A13. The portable information terminal 3 thereby transmits a media release request signal corresponding to an operation of the user, to the information apparatus 2.

Fourth State Information

Figure 8A:
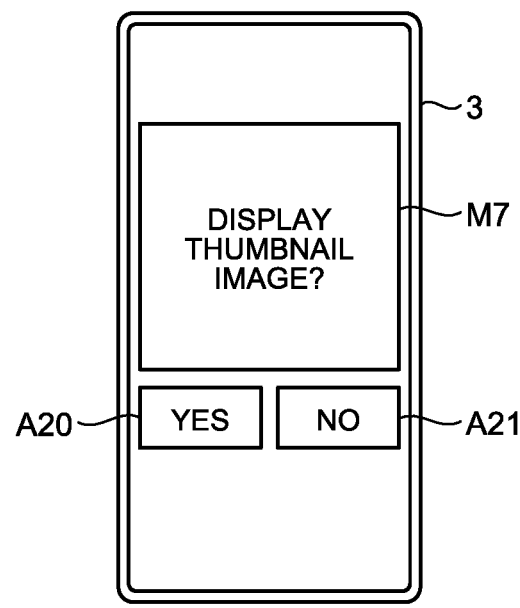
FIG. 8A is a diagram schematically illustrating an example of an image to be displayed when the portable information terminal according to the first embodiment receives fourth state information.
Figure 8B:
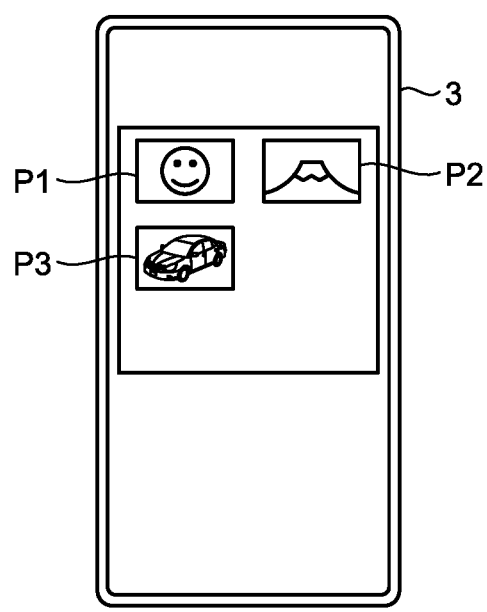
FIG. 8B is a diagram schematically illustrating an example of an image to be displayed when the portable information terminal according to the first embodiment receives fourth state information.
Figure 8C:
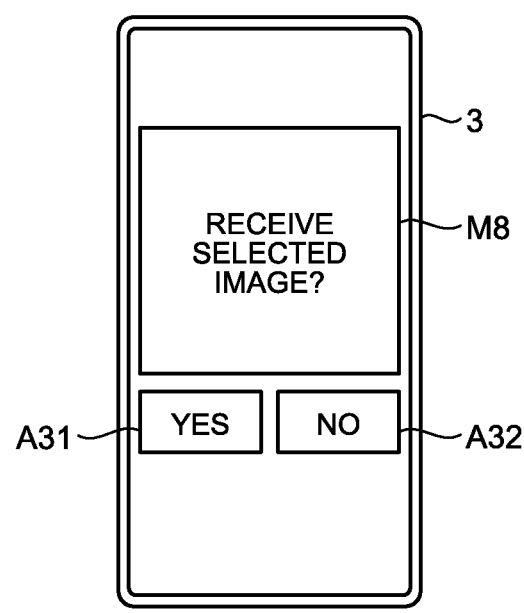
FIG. 8C is a diagram schematically illustrating an example of an image to be displayed when the portable information terminal according to the first embodiment receives fourth state information.

FIGS. 8A, 8B, and 8C are diagrams schematically illustrating examples of images to be displayed when the portable information terminal 3 receives the fourth state information. As illustrated in FIG. 8A, when the fourth state information is received from the information apparatus 2, the portable information terminal 3 displays a message M7 corresponding to the fourth state information, an icon A20 for receiving input of an image transfer request signal for requesting the transfer of a thumbnail image, and an icon A21 for receiving input for not transmitting an image transfer request signal requesting the transfer of a thumbnail image. In this case, when the user selects the icon A20, as illustrated in FIG. 8B, the portable information terminal 3 displays examples of thumbnail images P1 to P3 to be transmitted to the information apparatus 2. After that, when the user selects a desired thumbnail image, as illustrated in FIG. 8C, the portable information terminal 3 displays a message M8 for receiving image data corresponding to the thumbnail image, to the information apparatus 2, an icon A31 for receiving input of an image transfer request signal for transferring image data to the information apparatus 2, and an icon A32 for receiving input of a signal for cancelling transfer of image data to the information apparatus 2. The user selects the icon A31 or the icon A32. The portable information terminal 3 thereby transmits an image transfer request signal corresponding to an operation of the user, to the information apparatus 2.

Processing of Information Apparatus

Figure 9:
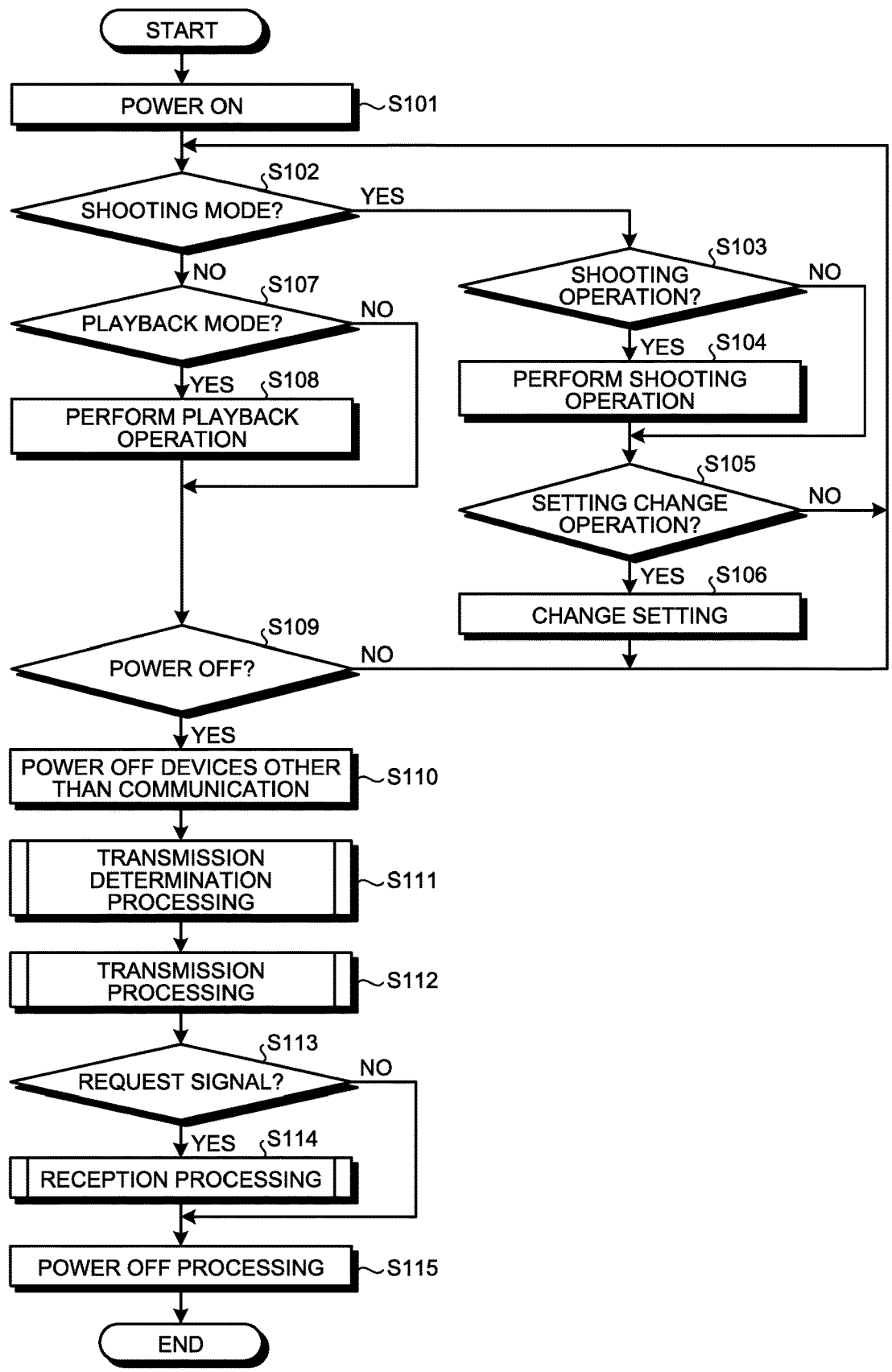
FIG. 9 is a flowchart illustrating an overview of processing executed by the information apparatus according to the first embodiment.

Next, details of processing executed by the information apparatus 2 will be described. FIG. 9 is a flowchart illustrating an overview of processing executed by the information apparatus 2.

As illustrated in FIG. 9, first, the power switch 107a of the operating unit 107 is operated, and power of the information apparatus 2 is turned on (Step S101), and when a shooting mode is set in the information apparatus 2 (Step S102: Yes), the information apparatus 2 advances the processing to Step S103 to be described later. In contrast to this, when a shooting mode is not set in the information apparatus 2 (Step S102: No), the information apparatus 2 dvances the processing to Step S107 to be described later.

In Step S103, when a shooting operation is performed via the operating unit 107 (Step S103: Yes), the shooting controller 121f causes the image sensor 101 to execute a shooting operation (Step S104). In this case, the image processor 106 performs predetermined image processing on image data generated by the image sensor 101, and records the resultant image data in the recording medium W1. After Step S104, the information apparatus 2 advances the processing to Step S105 to be described later.

In Step S103, when a shooting operation is not performed via the operating unit 107 (Step S103: No), the information apparatus 2 advances the processing to Step S105 to be described later.

Subsequently, when a setting change operation of changing setting of a shooting parameter of the information apparatus 2 is performed via the operating unit 107 (Step S105: Yes), the shooting controller 121f changes the setting of a set parameter of the information apparatus 2 according to an operation of the operating unit 107 (Step S106). Specifically, the control unit 121 changes a parameter of image processing of the image processor 106, changes a value of exposure compensation, and changes content of special effect processing that can be executed by the image processor 106. In this case, the use history information recording unit 105a records the number of times of use and a numerical value for each item. After Step S106, the information apparatus 2 advances the processing to Step S102 to be described later.

In Step S105, when a setting change operation of changing setting of a set parameter of the information apparatus 2 is not performed via the operating unit 107 (Step S105: No), the information apparatus 2 advances the processing to Step S102 to be described later.

In Step S107, when a playback mode is set in the information apparatus 2 (Step S107: Yes), the display controller 109 executes a playback operation of displaying an image corresponding to image data recorded in the recording medium W1, on the display unit 110 to play back the image (Step S108). After Step S108, the information apparatus 2 advances the processing to Step S109 to be described later.

In Step S107, when a playback mode is not set in the information apparatus 2 (Step S107: No), the information apparatus 2 advances the processing to Step S109 to be described later.

Subsequently, when a power off operation of turning off power of the information apparatus 2 is performed via the operating unit 107 (Step S109: Yes), the information apparatus 2 advances the processing to Step S110 to be described later. In contrast to this, when a power off operation of turning off power of the information apparatus 2 is not performed via the operating unit 107 (Step S109: No), the information apparatus 2 returns to Step S102 described above.

In Step S110, the control unit 121 powers off devices other than communication, in the units constituting the information apparatus 2. Specifically, the control unit 121 performs control of turning off the powers of devices other than devices related to the first communication unit 116, the second communication unit 117, and the third communication unit 118. More specifically, the control unit 121 powers off devices other than communication by stopping power supply from the battery 108 to main devices such as, for example, the image sensor 101, the communication unit 102, the image processor 106, the display controller 109, the display unit 110, the touch panel 111, the gyro sensor 113, the acceleration sensor 114, the earth magnetism sensor 115, and the lens device 20. By the power off, because many switches become unresponsive, and a display or the like can no longer be seen, the user can determine that the information apparatus 2 does not function and enters an energy saving state, and can put off or put the apparatus into a bag or a pocket while feeling safe. If the information apparatus 2 becomes nondisplay, many users forget about the apparatus, and start another action or work. Thus, in the subject application, a power off processing of stopping the information apparatus 2 is performed by performing energy saving and recording various types of parameters into the flash memory 105, so that the information can be communicated later. In addition, in this first embodiment, it is represented that "devices other than communication are powered off", but a specific switch, a partial clock, actuation of a partial function at a time set by a timer as necessary, or the like is enabled to be performed.

In Step S111, the information apparatus 2 executes transmission determination processing of determining a state of the information apparatus 2, and determining whether to transmit a transmission state to the portable information terminal 3. In addition, the details of the transmission determination processing will be described later. After Step S111, the information apparatus 2 advances the processing to Step S112 to be described later.

Subsequently, the information apparatus 2 executes transmission processing of transmitting state information, by wireless connecting with the portable information terminal 3 (Step S112). In addition, the details of the transmission processing will be described later.

After that, when a request signal is received from the portable information terminal 3 (Step S113: Yes), the information apparatus 2 executes reception processing of performing control corresponding to the request signal (Step S114). In addition, the details of the reception processing will be described later. After Step S114, the information apparatus 2 advances the processing to Step S115 to be described later.

In Step S113, when a request signal is not received from the portable information terminal 3 (Step S113: No), the information apparatus 2 advances the processing to Step S115 to be described later.

In Step S115, because the control unit 121 stops power supply from the battery 108 to main portions, many switches become unresponsive, and a display or the like can no longer be seen. As a result, the user can determine that the information apparatus 2 does not function and enters an energy saving state, and can put off or put the apparatus into a bag or a pocket while feeling safe. If the information apparatus 2 becomes nondisplay, many users forget about the apparatus, and start another action or work. Thus, in the subject application, a power off processing of stopping the information apparatus 2 is performed by performing energy saving and recording various types of parameters into the flash memory 105, so that the information can be communicated later. After Step S115, the information apparatus 2 ends the processing. In this first embodiment, it is represented as "power off", but a specific switch, a partial communication unit (e.g. the second communication unit 117), a clock, actuation of a partial function at a time set by a timer as necessary, or the like is enabled to be performed.

Transmission Determination Processing

Figure 10:
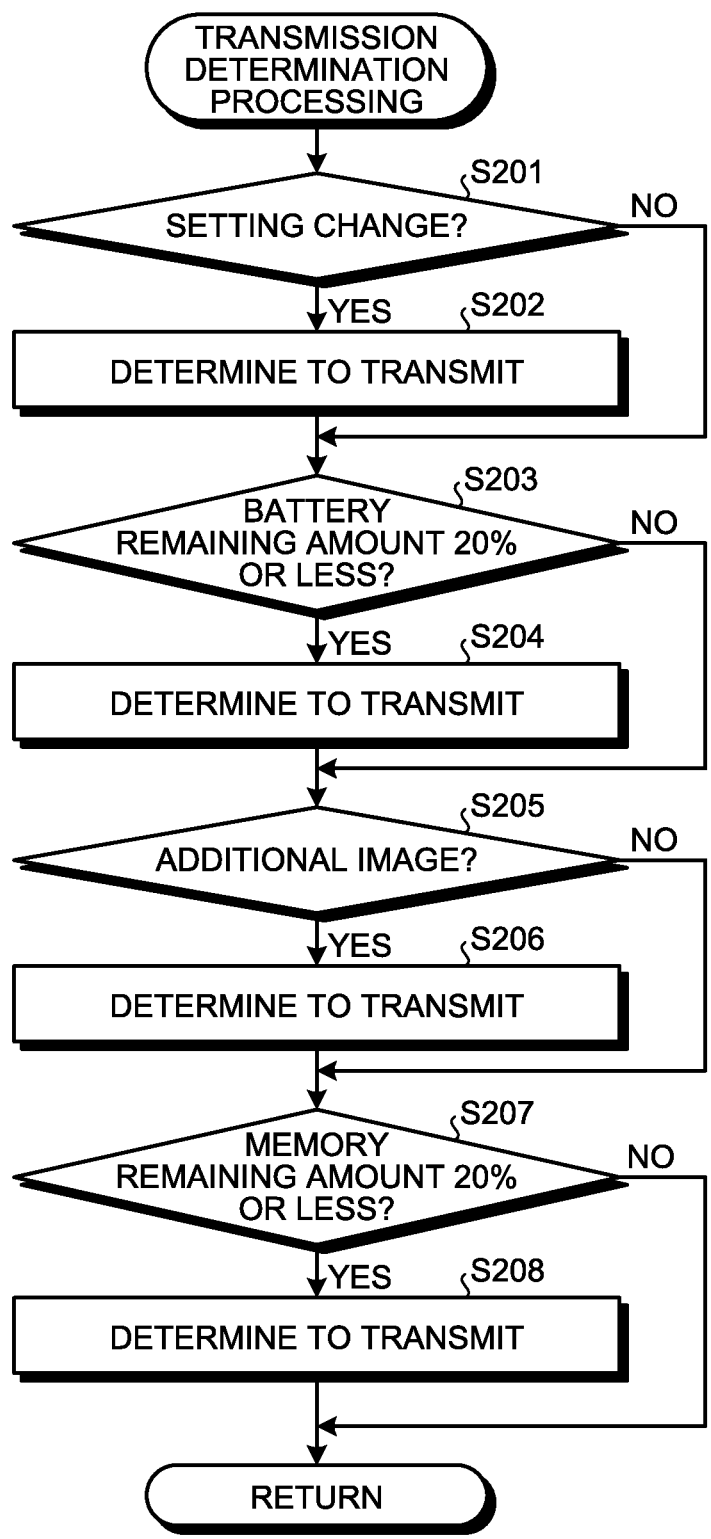
FIG. 10 is a flowchart illustrating an overview of transmission determination processing in FIG. 9.

Next, the details of the transmission determination processing described in Step S111 of FIG. 9 described above will be described. FIG. 10 is a flowchart illustrating an overview of the transmission determination processing.

As illustrated in FIG. 10, first, a use information determination unit 102a determines whether the setting of a set parameter of the information apparatus 2 has been changed, based on use history information of a set parameter the information apparatus 2 that is recorded in the flash memory 105 (Step S201). Specifically, the use information determination unit 102a determines whether the set parameter is a set parameter having the number of times of use that is equal to or less than a predetermined value, based on the use history information recorded in the flash memory 105. For example, the use information determination unit 102a determines whether a set parameter changed by the operating unit 107 in a period from when the power enters the on state, to when a power off operation is performed is a set parameter prominently-unused in the number of times of use in the past use history. This can prevent a set parameter unintended by the user from being used when shooting is performed next or when shooting is performed after power startup. When it is determined that the setting of a set parameter of the information apparatus 2 has been changed (Step S201: Yes), the use information determination unit 102a determines that state information is to be transmitted (Step S202). After Step S202, the information apparatus 2 advances the processing to Step S203 to be described later. In addition, the definition of the predetermined value can be changed, and is about 10 times, for example, when it is considered in a predetermined period such as, for example, one year.

In Step S201, when the use information determination unit 102a determines that the setting of a set parameter of the information apparatus 2 is not changed (Step S201: No), the information apparatus 2 advances the processing to Step S203 to be described later.

In S203, the use information determination unit 121a determines whether a remaining amount of the battery 108 that has been detected by the battery remaining amount detection unit 121b is 20% or less. When it is determined by the use information determination unit 121a that a remaining amount of the battery 108 that has been detected by the battery remaining amount detection unit 121b is 20% or less (Step S203: Yes), the use information determination unit 121a determines that state information is to be transmitted (Step S204). After Step S204, the information apparatus 2 advances the processing to Step S205 to be described later.

In Step S203, when it is determined by the use information determination unit 121a that a remaining amount of the battery 108 that has been detected by the battery remaining amount detection unit 121b is not 20% or less (Step S203: No), the information apparatus 2 advances the processing to Step S205 to be described later.

In Step S205, the shooting determination unit 121d determines whether there is an additional image by the information apparatus 2 performing shooting from the previous connection. When it is determined by the shooting determination unit 121d that there is an additional image (Step S205: Yes), the use information determination unit 121a determines that state information is to be transmitted (Step S206). After Step S206, the information apparatus 2 advances the processing to Step S207 to be described later.

In Step S205, when it is determined by the shooting determination unit 121d that there is no additional image (Step S205: No), the information apparatus 2 advances the processing to Step S207.

In Step S207, the use information determination unit 121a determines whether a memory remaining amount of the recording medium W1 that has been detected by the memory remaining amount detection unit 121c is 20% or less. When a memory remaining amount of the recording medium W1 that has been detected by the memory remaining amount detection unit 121c is 20% or less (Step S207: Yes), the use information determination unit 121a determines that state information is to be transmitted (Step S208). After Step S208, the information apparatus 2 returns to a main routine in FIG. 9. In contrast to this, when a memory remaining amount of the recording medium W1 that has been detected by the memory remaining amount detection unit 121c is not 20% or less (Step S207: No), the information apparatus 2 returns to a main routine in FIG. 9.

Transmission Processing

Figure 11:
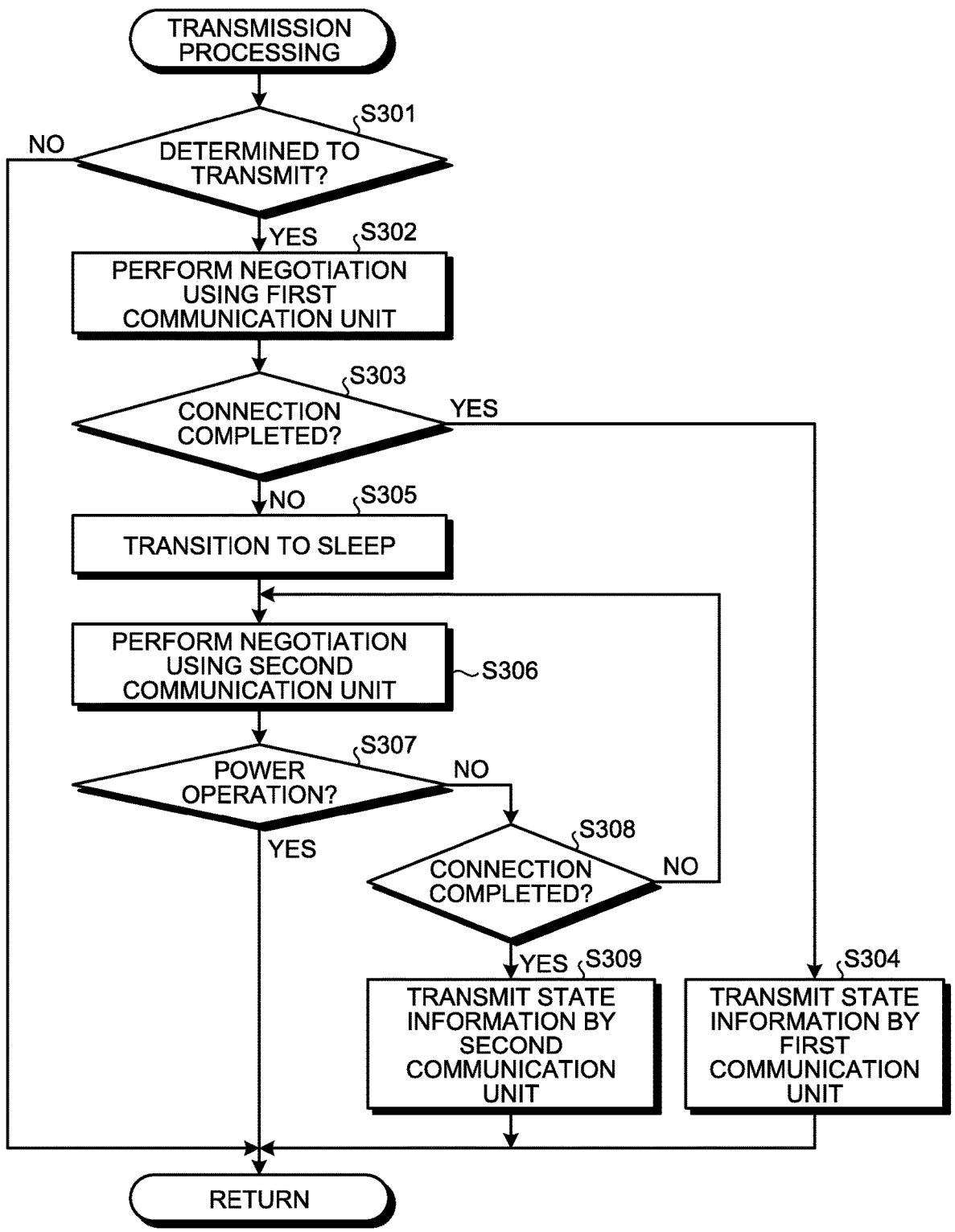
FIG. 11 is a flowchart illustrating an overview of transmission processing in FIG. 9.

Next, the details of the transmission processing described in Step S112 of FIG. 9 described above will be described. FIG. 11 is a flowchart illustrating an overview of the transmission processing.

As illustrated in FIG. 11, when it is determined by the use information determination unit 121a that transmission is to be performed (Step S301: Yes), the communication controller 121e first performs, using the first communication unit 116, negotiation for performing communication with the portable information terminal 3 (Step S302), and when connection with the portable information terminal 3 is completed (Step S303: Yes), state information is transmitted to the portable information terminal 3 by the first communication unit 116 (Step S304). For example, as illustrated in FIG. 12, the communication controller 121e causes the first communication unit 116 to transmit state information T1 determined by the use information determination unit 121a, to the portable information terminal 3. After Step S304, the information apparatus 2 returns to a main routine in FIG. 9.

In Step S301, when it is determined by the use information determination unit 121a that transmission is to be performed (Step S301: Yes), the communication controller 121e performs, using the first communication unit 116, negotiation for performing communication with the portable information terminal 3 (Step S302), and when connection with the portable information terminal 3 is not completed (Step S303: No), the state of the information apparatus 2 is shifted to sleep (Step S305). After Step S305, the information apparatus 2 advances the processing to Step S306 to be described later.

In Step S301, when it is not determined by the use information determination unit 121a that transmission is to be performed (Step S301: No), the information apparatus 2 returns to a main routine in FIG. 9.

In Step S306, the communication controller 121e performs, using the second communication unit 117, negotiation for performing communication with the portable information terminal 3.

Subsequently, when a power operation of bringing the power of the information apparatus 2 into the on state is performed on the operating unit 107 (Step S307: Yes), the information apparatus 2 returns to a main routine in FIG. 9. In contrast to this, when a power operation of bringing the power of the information apparatus 2 into the on state is not performed on the operating unit 107 (Step S307: No), the information apparatus 2 advances the processing to Step S308 to be described later.

In Step S308, when connection with the portable information terminal 3 is completed (Step S308: Yes), the communication controller 121e transmits, by the second communication unit 117, state information to the portable information terminal 3 (Step S309). After Step S309, the information apparatus 2 returns to a main routine in FIG. 9.

In Step S308, when connection with the portable information terminal 3 is not completed (Step S308: No), the information apparatus 2 returns to Step S306 described above.

Reception Processing

Figure 13:
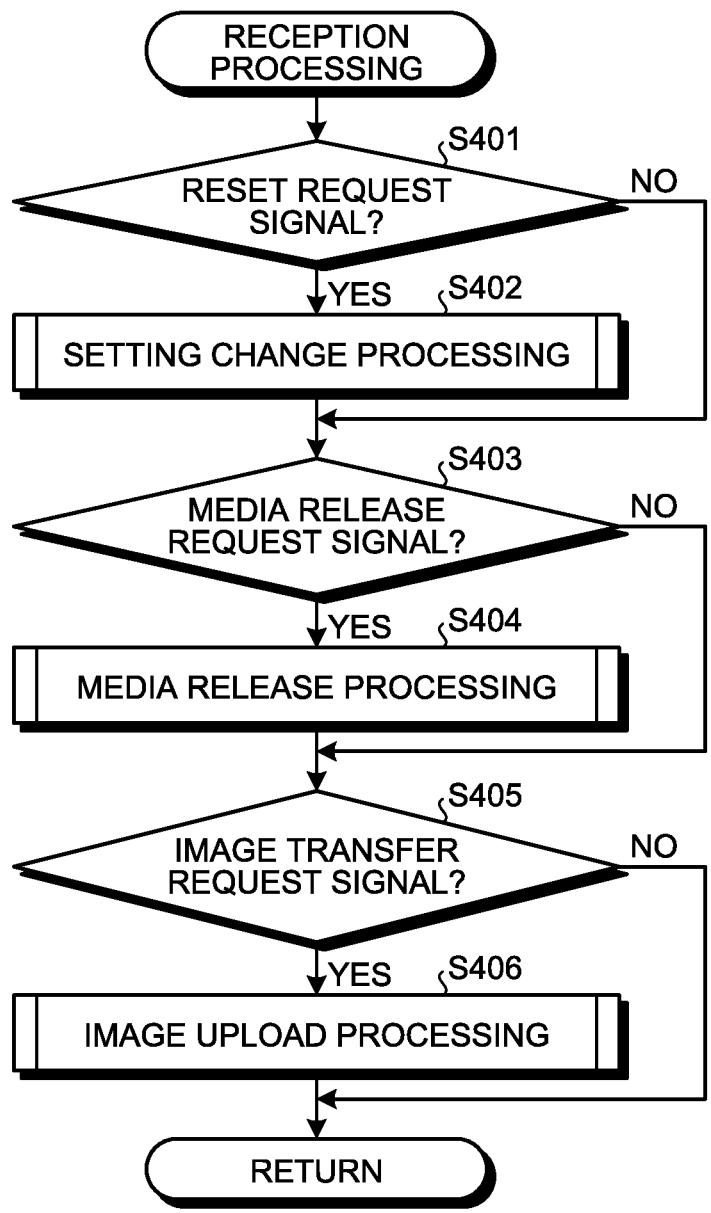
FIG. 13 is a flowchart illustrating an overview of reception processing in FIG. 9.

Next, the details of the reception processing described in Step S114 of FIG. 9 described above will be described. FIG. 13 is a flowchart illustrating an overview of the reception processing.

As illustrated in FIG. 13, when the portable information terminal 3 receives a reset request signal for changing a set parameter manually-settable in the information apparatus 2, to a state before the power state of the information apparatus 2 is switched (Step S401: Yes), the information apparatus 2 first executes setting change processing of changing the set parameter of the information apparatus 2 to the state before the on state of the power (Step S402). After Step S402, the information apparatus 2 advances the processing to Step S403 to be described later. In contrast to this, when the portable information terminal 3 does not receive a reset request signal (Step S401: No), the information apparatus 2 advances the processing to Step S403 to be described later.

Setting Change Processing

Figure 14:
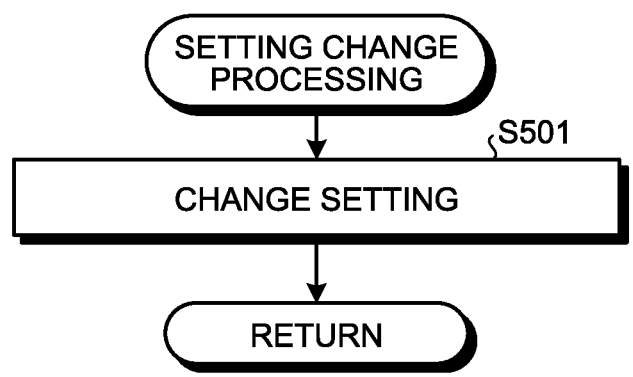
FIG. 14 is a flowchart illustrating an overview of setting change processing in FIG. 13.

FIG. 14 is a flowchart illustrating an overview of the setting change processing in Step S402 of FIG. 13.

As illustrated in FIG. 14, the shooting controller 121*f* changes the set parameter of the information apparatus 2 to the state before the on state of the power (Step S501). After Step S501, the information apparatus 2 returns to a subroutine in FIG. 13.

Referring back to FIG. 13, the description subsequent to Step S403 will be continued.

In Step S403, when a media release request signal for releasing image data recorded in the recording medium W1 is received from the portable information terminal 3 (Step S403: Yes), the information apparatus 2 executes media release processing of performing release by transmitting image data recorded in the recording medium W1, to the portable information terminal 3, and deleting the image data from the recording medium W1 (Step S404). After Step S404, the information apparatus 2 advances the processing to Step S405 to be described later. In contrast to this, when a media release request signal is not received from the portable information terminal 3 (Step S403: No), the information apparatus 2 advances the processing to Step S405 to be described later.

Media Release Processing

Figure 15:
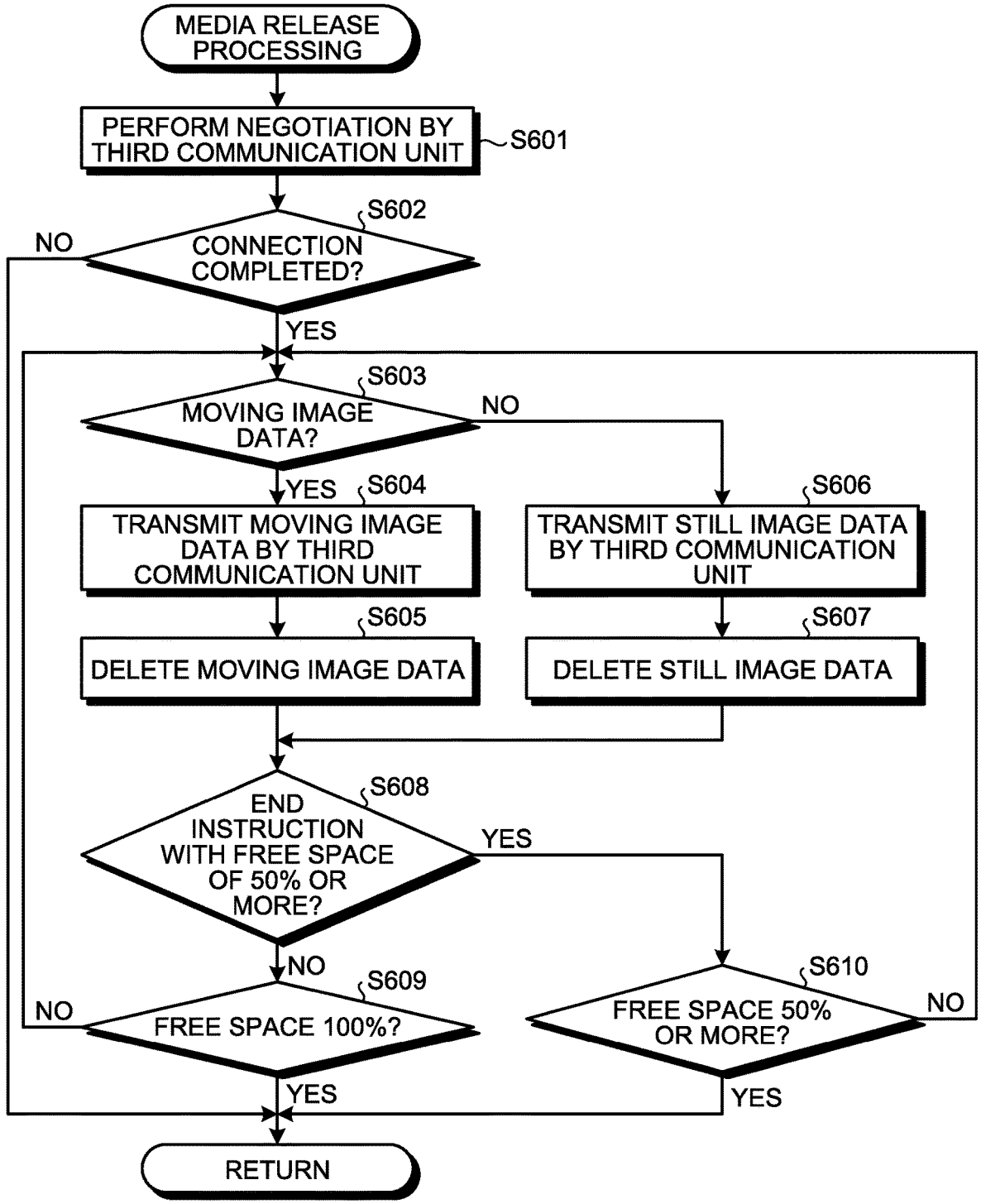
FIG. 15 is a flowchart illustrating an overview of media release processing in FIG. 13.

FIG. 15 is a flowchart illustrating an overview of media release processing described in Step S404 of FIG. 13.

As illustrated in FIG. 15, the communication controller 121*e* first performs negotiation with the portable information terminal 3 by the third communication unit 118 (Step S601), and when connection with the portable information terminal 3 is completed (Step S602: Yes), the information apparatus 2 advances the processing to Step S603 to be described later. In contrast to this, when connection with the portable information terminal 3 is not completed (Step S602: No), the information apparatus 2 returns to a subroutine in FIG. 13.

In Step S603, when there is moving image data in data recorded in the recording medium W1 (Step S603: Yes), the information apparatus 2 advances the processing to Step S604 to be described later. In contrast to this, when there is no moving image data in data recorded in the recording medium W1 (Step S603: No), the information apparatus 2 advances the processing to Step S606 to be described later.

In Step S604, the communication controller 121*e* transfers, by the third communication unit 118, a moving image recorded in the recording medium W1, to the portable information terminal 3. In this case, the communication controller 121*e* causes the third communication unit 118 to transmit moving images recorded in the recording medium W1, in the order of older record time and date.

Subsequently, the communication controller 121*e* deletes the moving images transmitted by the third communication unit 118, from the recording medium W1 (Step S605). After Step S605, the information apparatus 2 advances the processing to Step S608 to be described later.

In Step S606, the communication controller 121*e* transfers, by the third communication unit 118, a still image recorded in the recording medium W1, to the portable information terminal 3. In this case, the communication controller 121*e* causes the third communication unit 118 to transmit still images recorded in the recording medium W1, in the order of older record time and date.

Subsequently, the communication controller 121*e* deletes the still images transmitted by the third communication unit 118, from the recording medium W1 (Step S607). After Step S607, the information apparatus 2 advances the processing to Step S608 to be described later.

In Step S608, when an end instruction with a free space of 50% or more of the recording medium W1 is issued (Step S608: Yes), the information apparatus 2 advances the processing to Step S610 to be described later. In contrast to this, when an end instruction with a free space of 50% or more of the recording medium W1 is not issued (Step S608: No), the information apparatus 2 advances the processing to Step S609 to be described later.

In Step S609, when a free space of the recording medium W1 reaches 100% (Step S609: Yes), the information apparatus 2 returns to a subroutine in FIG. 13. In contrast to this, when a free space of the recording medium W1 does not reach 100% (Step S609: No), the information apparatus 2 returns to Step S603 described above.

In Step S610, when a free space of the recording medium W1 reaches 50% or more (Step S610: Yes), the information apparatus 2 returns to a subroutine in FIG. 13. In contrast to this, when a free space of the recording medium W1 does not reach 50% or more (Step S610: No), the information apparatus 2 returns to Step S603 described above.

Referring back to FIG. 13, the description subsequent to Step S405 will be continued.

In Step S405, when an image transfer request signal is received from the portable information terminal 3 (Step S405: Yes), the information apparatus 2 executes image upload processing of sequentially uploading image data selected in the portable information terminal 3, to the portable information terminal 3 (Step S406). After Step S406, the information apparatus 2 returns to a main routine in FIG. 9. In contrast to this, when an image transfer request signal is not received from the portable information terminal 3 (Step S405: No), the information apparatus 2 returns to a main routine in FIG. 9.

Image Upload Processing

Figure 16:
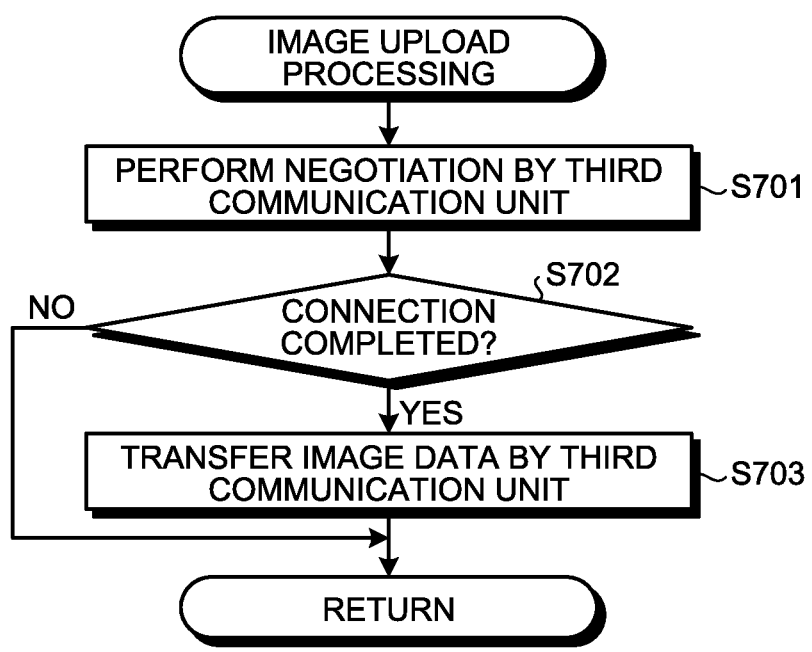
FIG. 16 is a flowchart illustrating an overview of image upload processing in FIG. 13.

FIG. 16 is a flowchart illustrating an overview of the image upload processing in Step S406 of FIG. 13.

As illustrated in FIG. 16, the communication controller 121*e* first performs negotiation with the portable information terminal 3 by the third communication unit 118 (Step S701), and when connection with the portable information terminal 3 is completed (Step S702: Yes), causes the third communication unit 118 to transmit an image selected from among a plurality of images recorded in the recording medium W1, to the portable information terminal 3 (Step S703). After Step S703, the information apparatus 2 returns to a subroutine in FIG. 13.

In S702, when connection with the portable information terminal 3 is not completed (Step S702: No), the information apparatus 2 returns to a subroutine in FIG. 13.

Processing of Portable Information Terminal

Next, processing executed by the portable information terminal 3 will be described.

Figure 17:
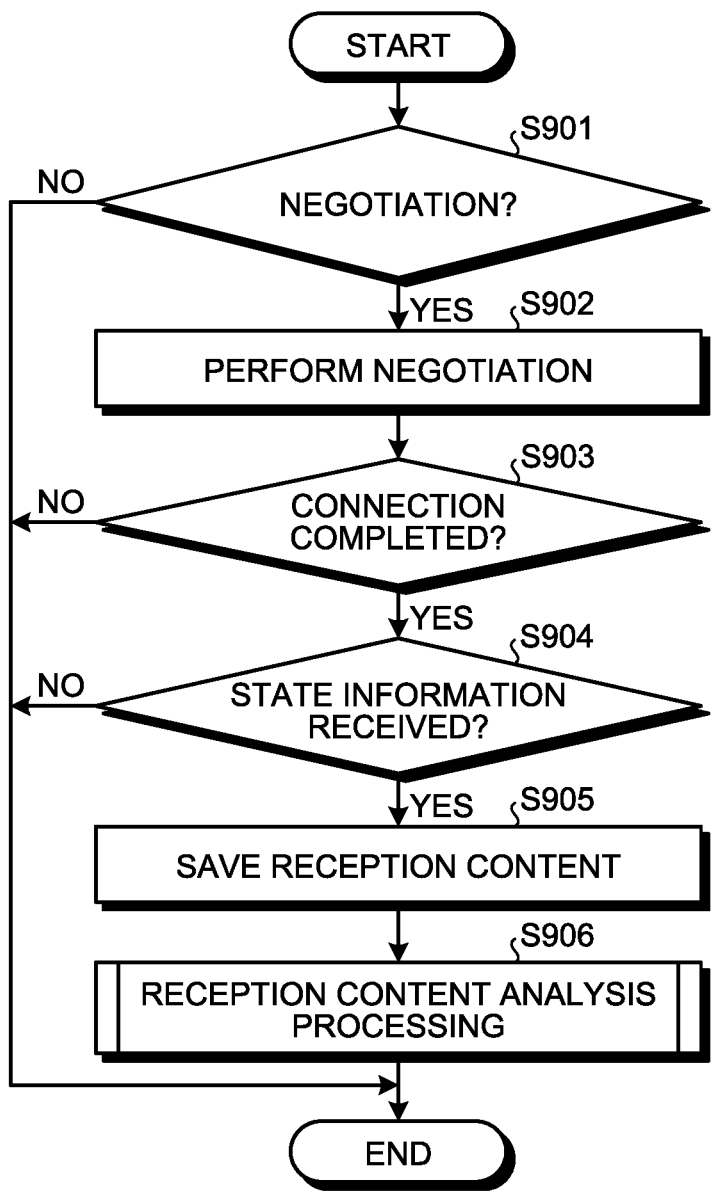
FIG. 17 is a flowchart illustrating an overview of processing executed by the portable information terminal according to the first embodiment.

FIG. 17 is a flowchart illustrating an overview of processing executed by the portable information terminal 3.

As illustrated in FIG. 17, when negotiation is performed from the information apparatus 2 (Step S901: Yes), the control unit 42 first causes any of the first communication unit 35, the second communication unit 36, and the third communication unit 37 to perform negotiation (Step S902), and when connection with the information apparatus 2 is completed (Step S903: Yes), the portable information terminal 3 advances the processing to Step S904 to be described later.

In Step S901, when negotiation is not performed from the information apparatus 2 (Step S901: No), the portable information terminal 3 ends the processing.

In Step S903, when connection with the information apparatus 2 is not completed (Step S903: No), the portable information terminal 3 ends the processing.

In Step S904, when state information is received from the information apparatus 2 (Step S904: Yes), the control unit 42 records reception content of the state information that has been received from the information apparatus 2, into the SDRAM 39 (Step S905). After Step S905, the portable information terminal 3 advances the processing to Step S906 to be described later.

In Step S904, when state information is not received from the information apparatus 2 (Step S904: No), the portable information terminal 3 ends the processing.

In Step S906, the portable information terminal 3 analyzes the reception content of the state information that has been received from the information apparatus 2, and executes reception content analysis processing of performing processing corresponding to an analysis result. After Step S906, the portable information terminal 3 ends the processing.

Reception Content Analysis Processing

Figure 18:
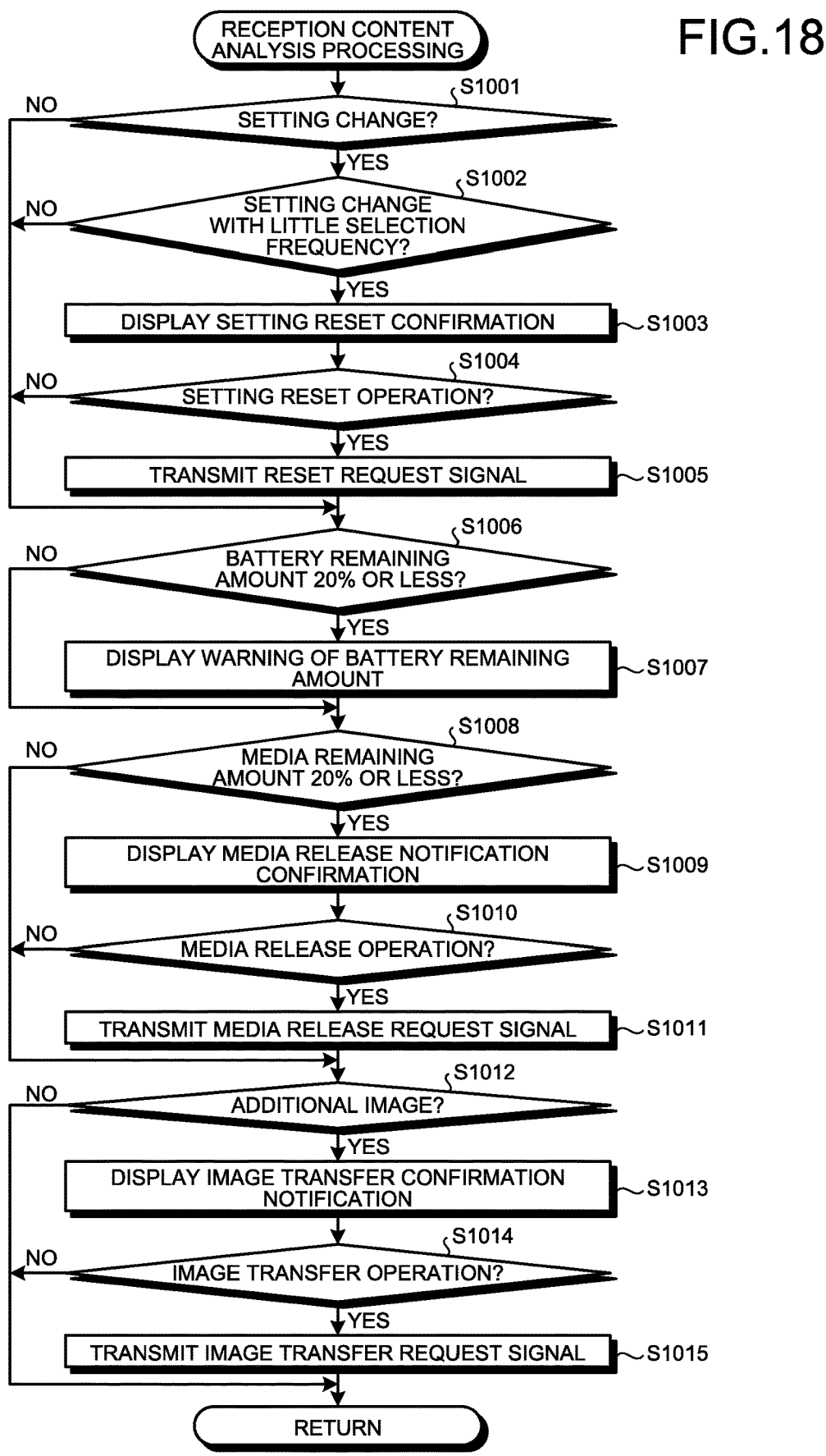
FIG. 18 is a flowchart illustrating an overview of content analysis processing in FIG. 17.

FIG. 18 is a flowchart illustrating an overview of the content analysis processing in Step S906 of FIG. 17.

As illustrated in FIG. 18, when there is setting change information in state information (Step S1001: Yes), when the change is a setting change with a little selection frequency (Step S1002: Yes), the display controller 32 first causes setting reset confirmation to be displayed on the display unit 33 (Step S1003). Specifically, the display controller 32 causes the message M1 in FIG. 5A described above, to be displayed on the display unit 33.

Subsequently, when a setting reset operation is performed via the touch panel 34 (Step S1004: Yes), the control unit 42 causes the first communication unit 35 to transmit a reset request signal for resetting the setting of the information apparatus 2 to the state before the power of the information apparatus 2 becomes the on state (Step S1005). After Step S1005, the portable information terminal 3 advances the processing to Step S1006 to be described later.

In Step S1001, when there is no setting change information in state information (Step S1001: No), the portable information terminal 3 advances the processing to Step S1006 to be described later.

In Step S1002, the change is not a setting change with small selection frequency (Step S1002: No), the portable information terminal 3 advances the processing to Step S1006 to be described later.

In Step S1004, when a setting reset operation is not performed via the touch panel 34 (Step S1004: No), the portable information terminal 3 advances the processing to Step S1006 to be described later.

In Step S1006, when a remaining amount of the battery 108 of the information apparatus 2 is 20% or less (Step S1006: Yes), the display controller 32 causes a warning indicating that the remaining amount of the battery 108 of the information apparatus 2 becomes insufficient (e.g. the message M3 in FIG. 6), to be displayed on the display unit 33 (Step S1007). After Step S1007, the portable information terminal 3 advances the processing to Step S1008 to be described later.

In Step S1006, when a remaining amount of the battery 108 of the information apparatus 2 is not 20% or less (Step S1006: No), the portable information terminal 3 advances the processing to Step S1008 to be described later.

In Step S1008, when a media remaining amount of the recording medium W1 of the information apparatus 2 is 20% or less (Step S1008: Yes), the display controller 32 displays media release notification confirmation of the recording medium W1 of the information apparatus 2 (e.g. the message M4 in FIG. 7A→the message M5 in FIG. 7B) (Step S1009).

Subsequently, when a media release operation is performed via the touch panel 34 (Step S1010: Yes), the control unit 42 causes the first communication unit 35 to transmit a media release request signal for instructing media release of the recording medium W1 of the information apparatus 2 (Step S1011). After Step S1011, the portable information terminal 3 advances the processing to Step S1012 to be described later.

In Step S1008, when a media remaining amount of the recording medium W1 of the information apparatus 2 is not 20% or less (Step S1008: No), the portable information terminal 3 advances the processing to Step S1012 to be described later.

In Step S1010, when a media release operation is not performed via the touch panel 34 (Step S1010: No), the portable information terminal 3 advances the processing to Step S1012 to be described later.

In Step S1012, when there is an additional image generated by performing shooting after power of the information apparatus 2 is turned on, in the recording medium W1 of the information apparatus 2 (Step S1012: Yes), the display controller 32 causes image transfer confirmation notification of the information apparatus 2 (e.g. the message M7 in FIG. 8A), to be displayed on the display unit 33 (Step S1013).

Subsequently, when an image transfer operation is performed via the touch panel 34 (Step S1014: Yes), the control unit 42 causes the first communication unit 35 to transmit an image transfer request signal for instructing transfer of an image selected via the touch panel 34 (Step S1015). After Step S1015, the portable information terminal 3 returns to a main routine in FIG. 17.

In Step S1012, when shooting is not performed after power of the information apparatus 2 is turned on, and there is no additional image in the recording medium W1 of the information apparatus 2 (Step S1012: No), the portable information terminal 3 returns to a main routine in FIG. 17.

In Step S1014, when an image transfer operation is not performed via the touch panel 34 (Step S1014: No), the portable information terminal 3 returns to a main routine in FIG. 17.

According to the first embodiment described above, in a power operation of the information apparatus 2, the communication controller 121*e* transmits a determination result of the use information determination unit 121*a* to the portable information terminal 3 as state information regarding the information apparatus 2. Thus, the state information of the information apparatus 2 can be recognized in the power operation.

In addition, according to the first embodiment, when it is determined by the use information determination unit 121*a* that a set parameter of the information apparatus 2 has been changed, the communication controller 121*e* transmits, as state information, that a set parameter manually-settable in the information apparatus 2 has been changed, to the portable information terminal 3. Thus, a set parameter of the information apparatus 2 can be recognized.

In addition, according to the first embodiment, the use information determination unit 121a determines, based on use history information recorded in the use history information recording unit 105a, whether a set parameter having the number of times of use that is a predetermined value or less has been changed. Thus, it can be recognized that a set parameter rarely used is set in the information apparatus 2. This can prevent shooting from being performed using a set parameter undesired by the user, after shooting or during shooting.

In addition, according to the first embodiment, when a reset request signal for returning a set parameter to a state before the power state is switched is input from the portable information terminal 3, the shooting controller 121f returns the set parameter of the information apparatus 2 to a state before the power state is switched. This can prevent shooting from being performed using a set parameter rarely used.

In addition, according to the first embodiment, when it is determined by the use information determination unit 121a that a remaining amount of the battery 108 is a predetermined value or less, the communication controller 121e transmits, as state information of the information apparatus 2, that a remaining amount of the battery 108 is a predetermined value or less, to the portable information terminal 3. Thus, the state information of the information apparatus 2 can be recognized in the power operation.

In addition, according to the first embodiment, when it is determined by the use information determination unit 121a that a memory remaining amount of the recording medium W1 is a predetermined value or less, the communication controller 121e transmits, as state information of the information apparatus 2, that a memory remaining amount of the recording medium W1 is a predetermined value or less, to the portable information terminal 3. Thus, the state information of the information apparatus 2 can be recognized in the power operation.

In addition, according to the first embodiment, when a media release request signal for releasing a memory remaining amount of the recording medium W1 is input from the portable information terminal 3, when a plurality of moving image data and a plurality of still image data are recorded in the recording medium W1, the communication controller 121e transmits data from the plurality of moving image data to the portable information terminal 3, in other words, earlier transmits moving image data that largely occupies a memory capacity in the recording medium W1, and deletes the moving image data that has been transmitted from the recording medium W1, from the recording medium W1. Thus, media release of the recording medium W1 can be promptly performed.

In addition, according to the first embodiment, when it is determined by the use information determination unit 121a that image data has been newly generated, the communication controller 121e transmits, as state information, thumbnail image data of the newly-generated image data, to the portable information terminal 3. Thus, state information of the information apparatus 2 can be recognized in the power operation.

Second Embodiment

Next, the second embodiment will be described. A communication system according to the second embodiment differs in configuration from the communication system 1 according to the first embodiment described above. Specifically, the communication system according to the second embodiment interactively performs communication between an information apparatus and a plurality of portable information terminals. Hereinafter, after the configuration of the communication system according to the second embodiment is described, processes of an information apparatus and portable information terminals that constitute the communication system according to the second embodiment will be described. In addition, the same configurations as those in the communication system 1 according to the aforementioned first embodiment are assigned the same sings, and the description thereof will be omitted.

Overview of Communication System

Figure 19:
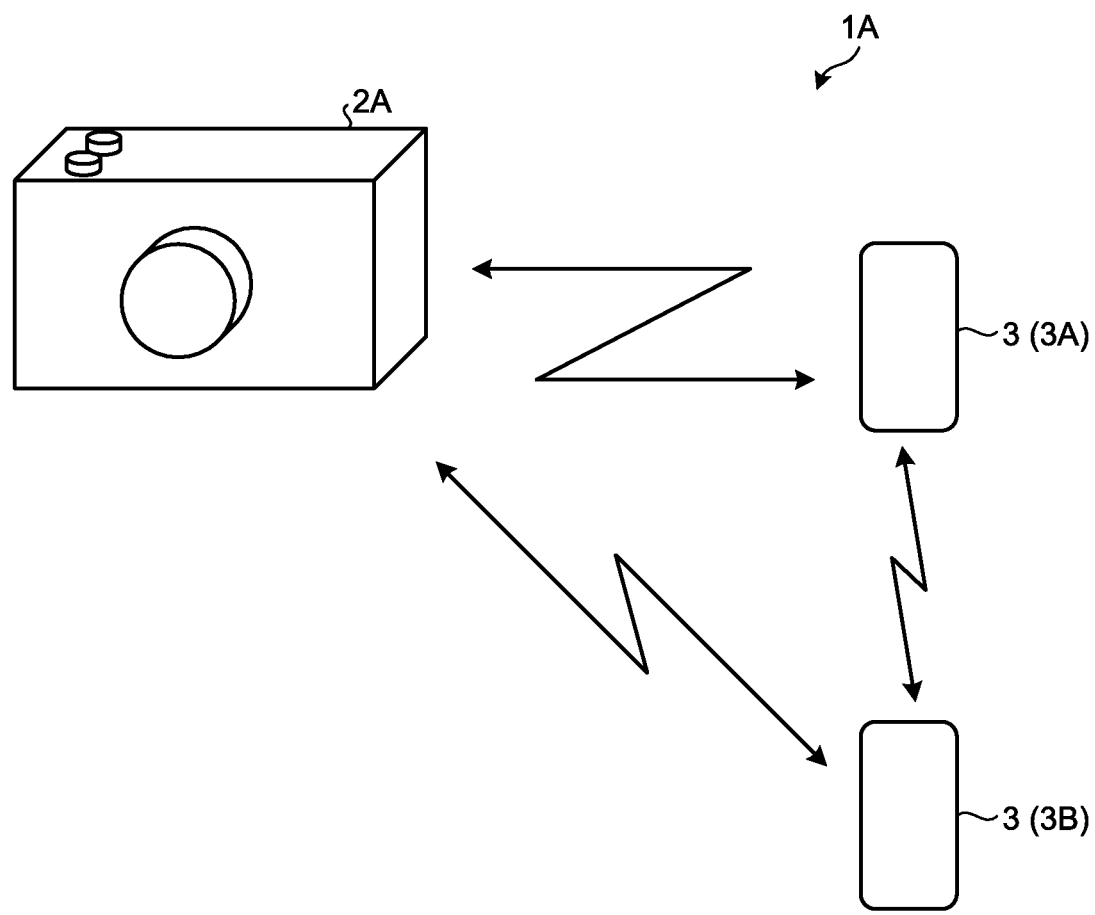
FIG. 19 is a schematic diagram illustrating an overview of a communication system according to a second embodiment.

FIG. 19 is a schematic diagram illustrating an overview of the communication system according to the second embodiment. A communication system 1A illustrated in FIG. 19 includes an information apparatus 2A in place of the information apparatus 2 according to the first embodiment described above, and a plurality of portable information terminals 3. Owners of the plurality of portable information terminals 3 are different from each other. Thus, the following description will be given while representing one portable information terminal 3 as a portable information terminal 3A, and another portable information terminal 3 as a portable information terminal 3B. In addition, because the configurations of the portable information terminal 3A and the portable information terminal 3B are the same as the configuration of the portable information terminal 3 according to the first embodiment described above, the detailed description will be omitted.

Configuration of Information Apparatus

Figure 20:
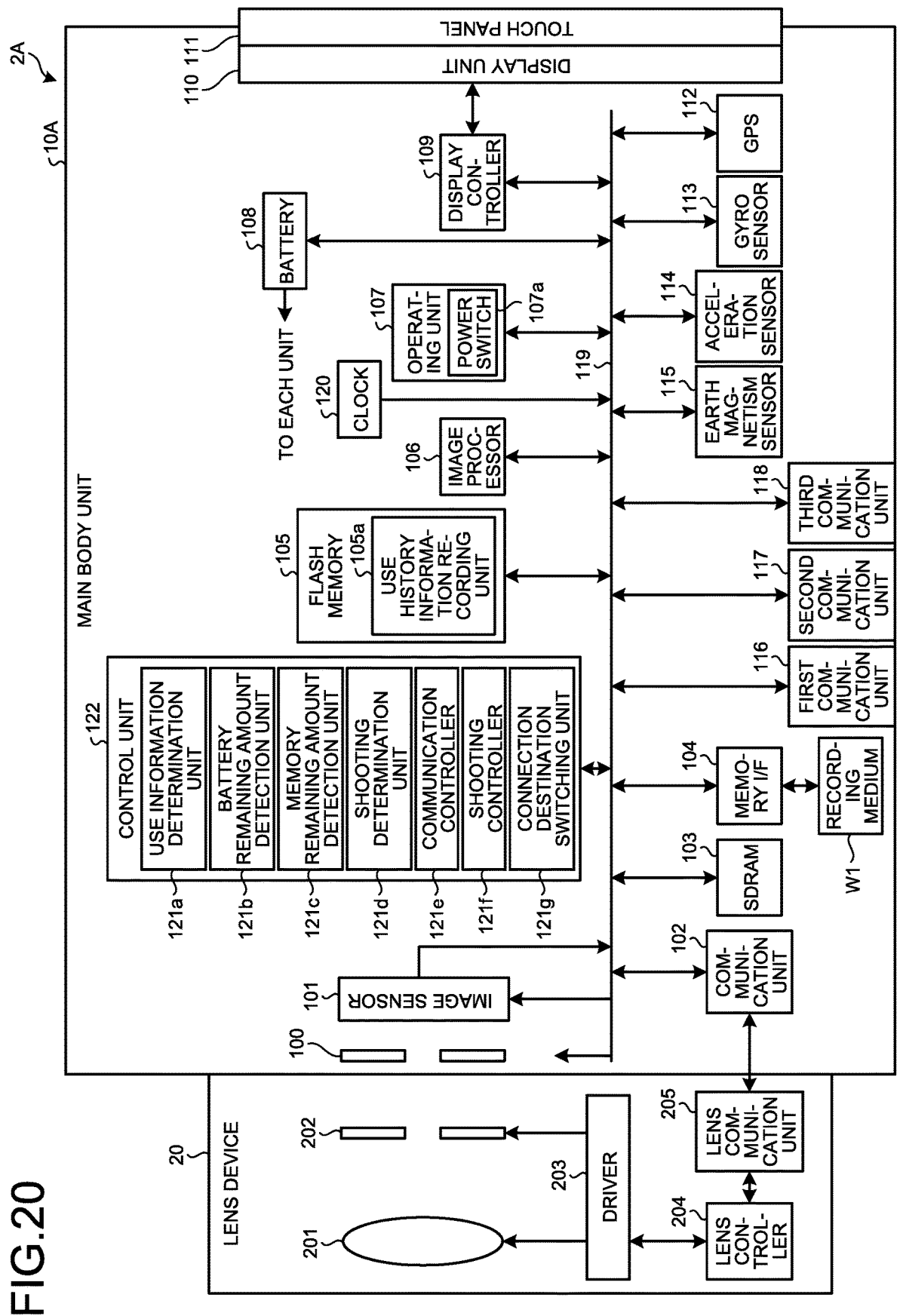
FIG. 20 is a schematic diagram illustrating a functional configuration of an information apparatus according to the second embodiment.

FIG. 20 is a block diagram illustrating a functional configuration of the information apparatus 2A.

The information apparatus 2A illustrated in FIG. 20 includes a main body unit 10A in place of the main body unit 10 according to the first embodiment described above. In addition, the main body unit 10A includes a control unit 122 in place of the control unit 121 according to the first embodiment described above. The control unit 122 further includes a connection destination switching unit 121g in addition to the configurations of the control unit 121 according to the first embodiment described above.

The connection destination switching unit 121g switches a connection destination to which the information apparatus 2A connects, based on a switching instruction signal transmitted from the portable information terminal 3A or the portable information terminal 3B.

Overview of Processing of Communication System

Figure 21:
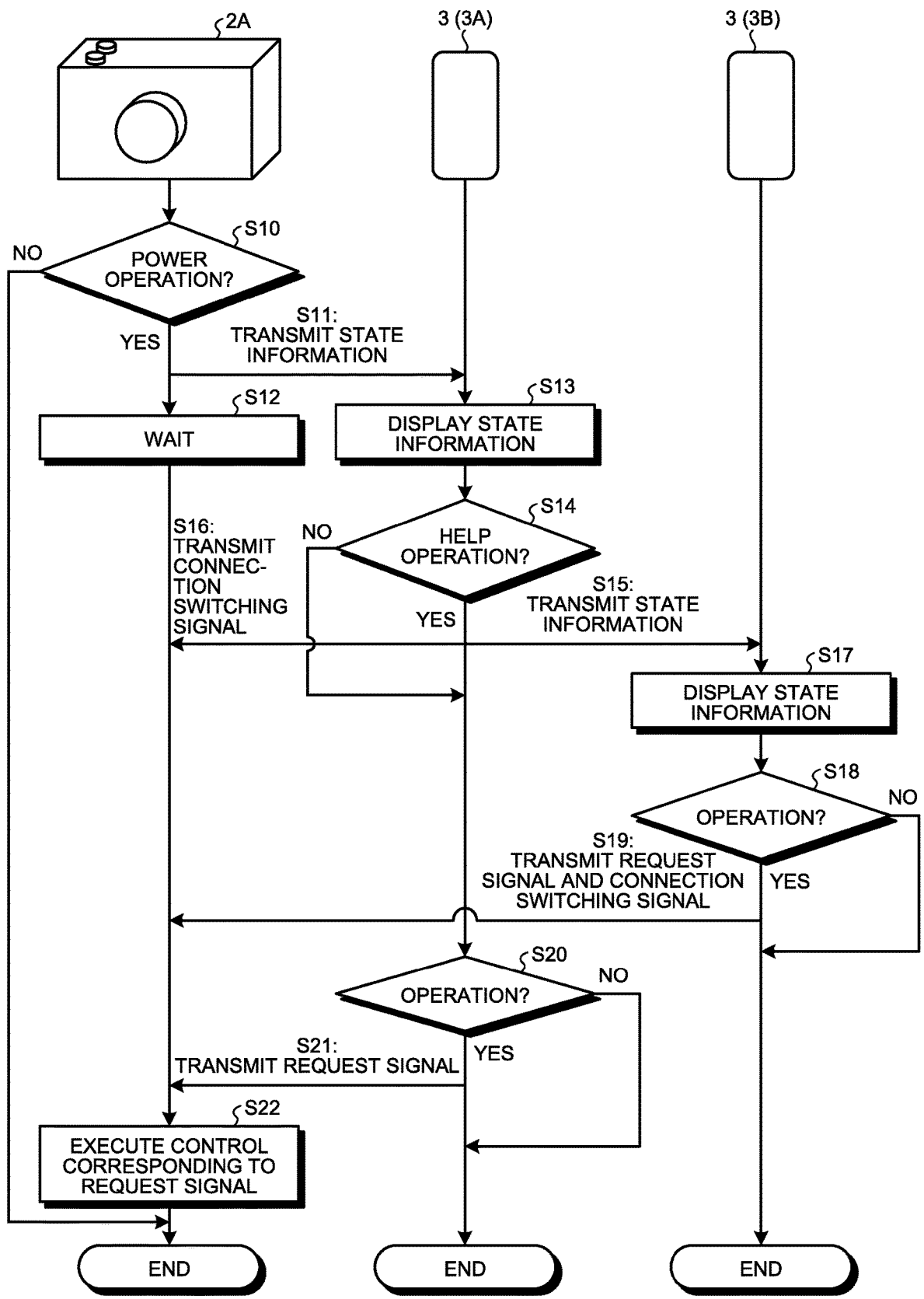
FIG. 21 is a conceptual diagram schematically illustrating an overview of processing executed by the communication system according to the second embodiment.

Next, an overview of processing executed by the communication system 1A will be described. FIG. 21 is a conceptual diagram schematically illustrating an overview of processing executed by the communication system 1A. In FIG. 21, Steps S10 to S13 respectively correspond to the aforementioned Steps S1 to S4 in FIG. 4.

In Step S14, when a help operation is performed via the touch panel 34 when the display unit 33 displays state information of the information apparatus 2A (Step S14: Yes), the portable information terminal 3A transmits state information of the information apparatus 2A that has been received from the information apparatus 2A, to the portable information terminal 3B (Step S15), and transmits a connection switching signal for instructing switching of a connection destination of the information apparatus 2A from the portable information terminal 3A to the portable information terminal 3B, to the information apparatus 2A (Step S16). The reason of the occurrence of such a situation is as follows. Because it is difficult to recognize a state of the information apparatus 2A even when an owner of the portable information terminal 3A operating the information apparatus 2A checks state information of the information apparatus 2A using the portable information terminal 3A, the owner of the portable information terminal 3A asks an informed owner of the portable information terminal 3B for performing an operation only for a short time. Unforeseeable circumstances are thereby prevented from occurring in shooting while resolving a failure generated in the information apparatus 2A. This can prevent a shutter chance from being missed.

Subsequently, the portable information terminal 3B displays state information received from the portable information terminal 3A (Step S17), and when an operation corresponding to the state information is performed by an owner (Step S18: Yes), transmits a request signal corresponding to the operation, and a connection switching signal for instructing switching of a connection destination to the portable information terminal 3A, to the information apparatus 2A by Bluetooth communication or BLE communication (Step S19). The information apparatus 2A can thereby switch the connection destination to the portable information terminal 3A after performing control corresponding to an instruction signal of the portable information terminal 3B. After Step S19, the portable information terminal 3B ends the processing.

In Step S18, when an operation corresponding to the state information is not performed by an owner (Step S18: No), the portable information terminal 3B ends the processing.

In Step S14, when a help operation is not performed via the touch panel 34 when the display unit 33 displays state information of the information apparatus 2A (Step S14: No), the portable information terminal 3A advances the processing to Step S20 to be described later.

Steps S20 to S22 respectively correspond to the aforementioned Steps S5 to S7 in FIG. 4.

Processing of Information Apparatus

Figure 22:
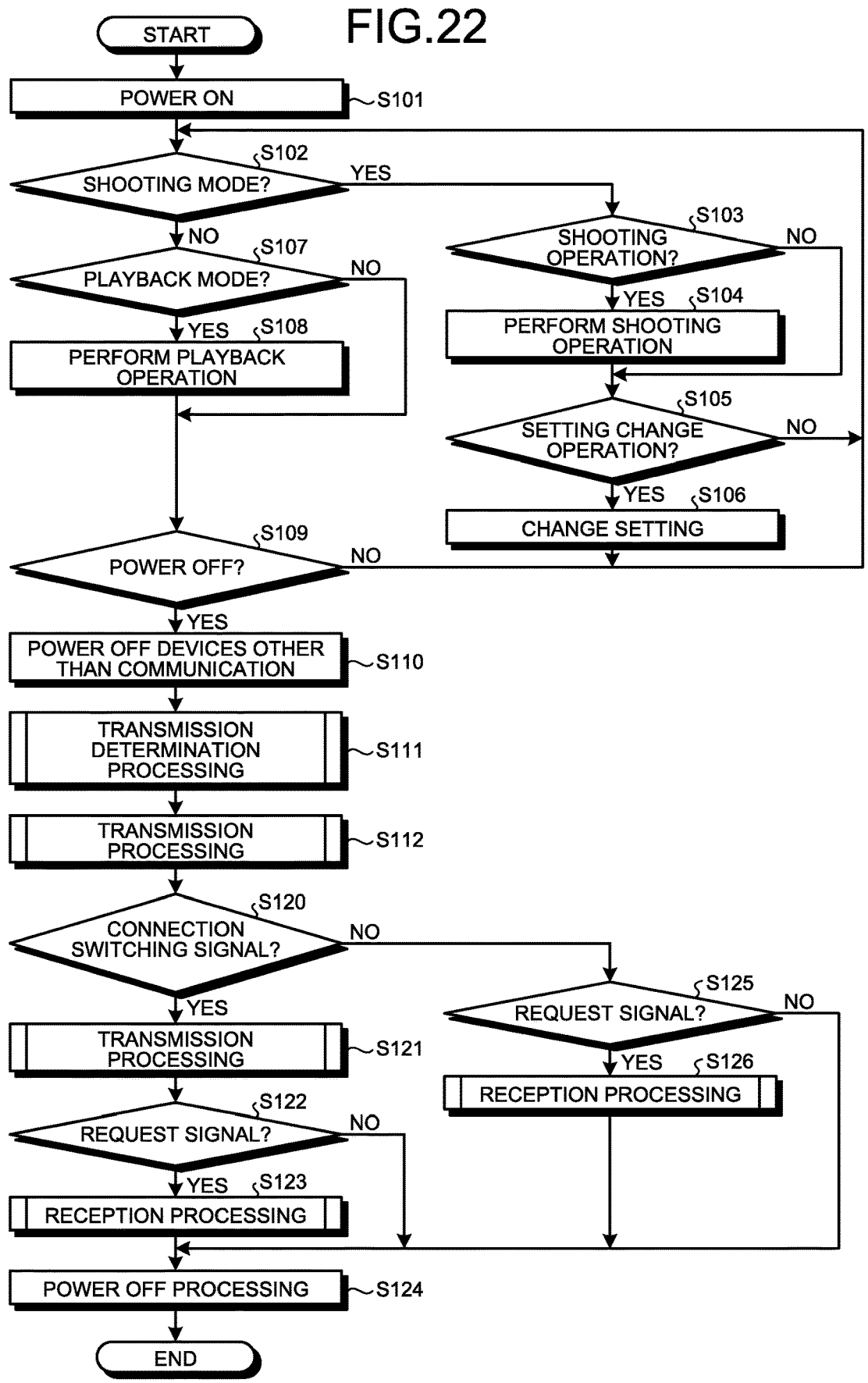
FIG. 22 is a flowchart illustrating an overview of processing executed by the information apparatus according to the second embodiment.

Next, details of processing executed by the information apparatus 2A will be described. FIG. 22 is a flowchart illustrating an overview of processing executed by the information apparatus 2A. In FIG. 22, Steps S101 to S112 are similar to those in FIG. 9 described above, and Steps subsequent to Step S120 are different. Thus, the following description will be given of the Steps subsequent to Step S120.

In Step S120, when a connection switching signal for instructing switching of a connection destination of the information apparatus 2A from the portable information terminal 3A to the portable information terminal 3B is issued from the portable information terminal 3A (Step S120: Yes), the information apparatus 2A executes transmission processing of transmitting state information by wirelessly connecting with the portable information terminal 3B (Step S121). In addition, because the transmission processing is similar to the transmission processing described in FIG. 11 of the first embodiment described above, the detailed description will be omitted.

Subsequently, when a request signal is issued from the portable information terminal 3B (Step S122: Yes), the information apparatus 2A executes reception processing of performing control corresponding to the request signal (Step S123). In addition, because the reception processing is similar to the reception processing described in FIG. 13 of the first embodiment described above, the detailed description will be omitted.

After that, the control unit 121 executes power off processing of stopping the information apparatus 2 by stopping power supply from the battery 108 (Step S124). After Step S124, the information apparatus 2A ends the processing.

In Step S120, when a connection switching signal for instructing switching of a connection destination of the information apparatus 2A from the portable information terminal 3A to the portable information terminal 3B is not issued from the portable information terminal 3A (Step S120: No), the information apparatus 2A advances the processing to Step S125 to be described later.

In Step S122, when a request signal is not issued from the portable information terminal 3B (Step S122: No), the information apparatus 2A advances the processing to Step S124.

Steps S125 and S126 respectively correspond to the aforementioned Steps S113 and S114. After Step S126, the information apparatus 2A advances the processing to Step S124.

Processing of Portable Information Terminal

Next, processing executed by the portable information terminal 3A will be described.

Figure 23:
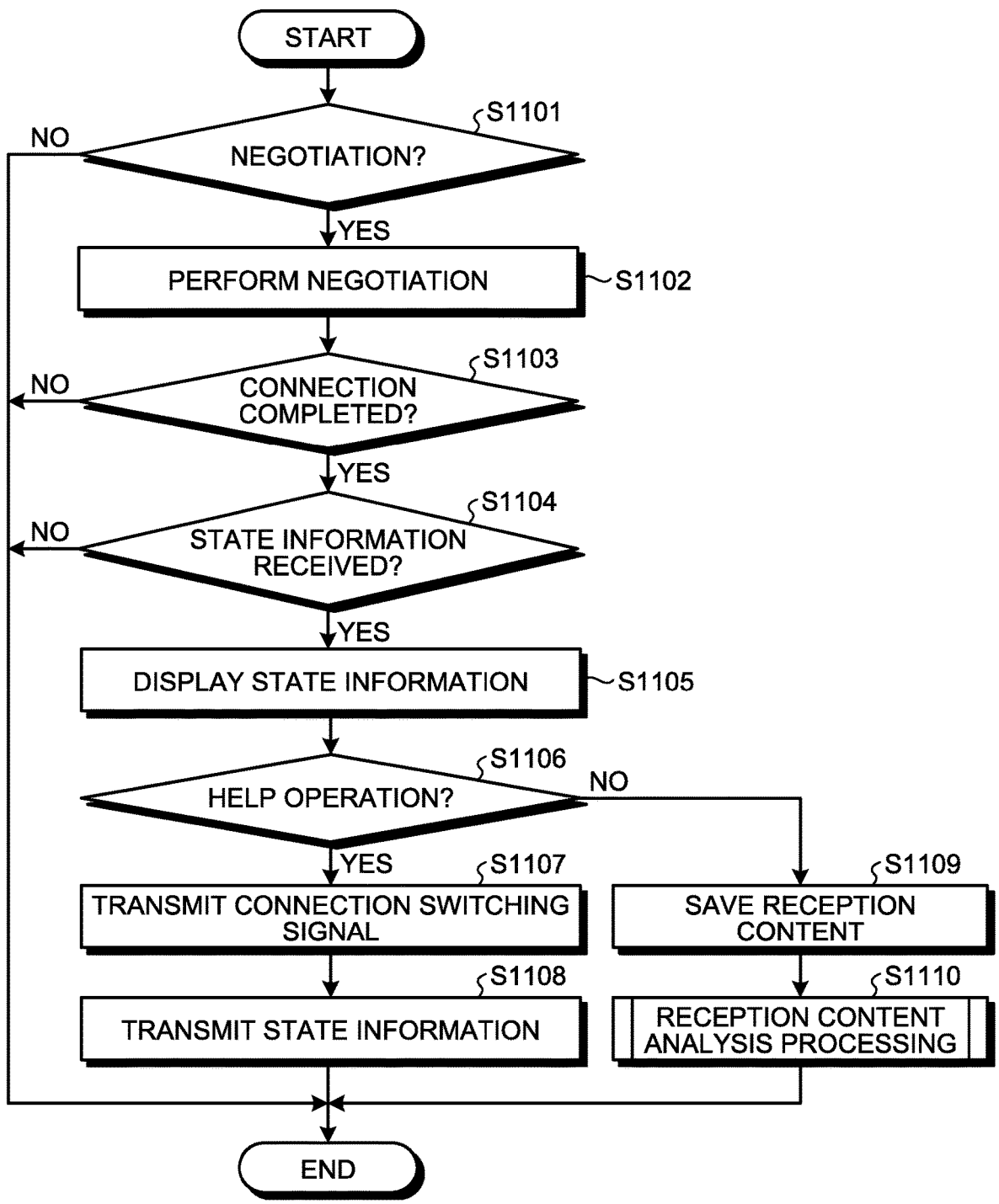
FIG. 23 is a flowchart illustrating an overview of processing executed by a portable information terminal according to the second embodiment.

FIG. 23 is a flowchart illustrating an overview of processing executed by the portable information terminal 3A. In addition, in this second embodiment, because the portable information terminal 3B also executes similar processing, the detailed description of processing will be omitted. In addition, in FIG. 23, Steps S1101 to S1104 respectively correspond to the aforementioned Steps S901 to S904 in FIG. 17.

In Step S1105, the display controller 32 causes the state information received from the information apparatus 2A, to be displayed on the display unit 33.

Subsequently, when a help operation is performed via the touch panel 34 (Step S1106: Yes), the control unit 42 causes the first communication unit 35 to transmit, to the information apparatus 2A, a connection switching signal for instructing switching of a connection destination from the portable information terminal 3A to the portable information terminal 3B (Step S1107), and causes the first communication unit 35 to transmit the state information received from the information apparatus 2A, to the portable information terminal 3B (Step S1108). After Step S1108, the portable information terminal 3A ends the processing.

In Step S1106, when a help operation is not performed via the touch panel 34 (Step S1106: No), the portable information terminal 3A advances the processing to Step S1109 to be described later.

Steps S1109 and S1110 respectively correspond to the aforementioned Steps S905 and S906 in FIG. 17. After Step S1110, the portable information terminal 3A ends the processing.

According to the second embodiment described above, because it is difficult to recognize a state of the information apparatus 2A even when an owner of the portable information terminal 3A operating the information apparatus 2A checks state information of the information apparatus 2A using the portable information terminal 3A, the owner of the portable information terminal 3A asks an informed owner of the portable information terminal 3B for performing an operation only for a short time. Unforeseeable circumstances can be thereby prevented from occurring in shooting performed after a power operation, while resolving a failure generated in the information apparatus 2A.

Third Embodiment

Next, the third embodiment will be described. An information apparatus according to the third embodiment differs from the information apparatus 2 according to the first embodiment described above, in configuration, and also in processing to be executed. Hereinafter, after the configuration of the information apparatus according to the third embodiment is described, processes of the information apparatus and a portable information terminal that constitute a communication system according to this third embodiment will be described. In addition, the same configurations as those in the communication system 1 according to the aforementioned first embodiment are assigned the same sings, and the description thereof will be omitted.

Configuration of Information Apparatus

Figure 24:
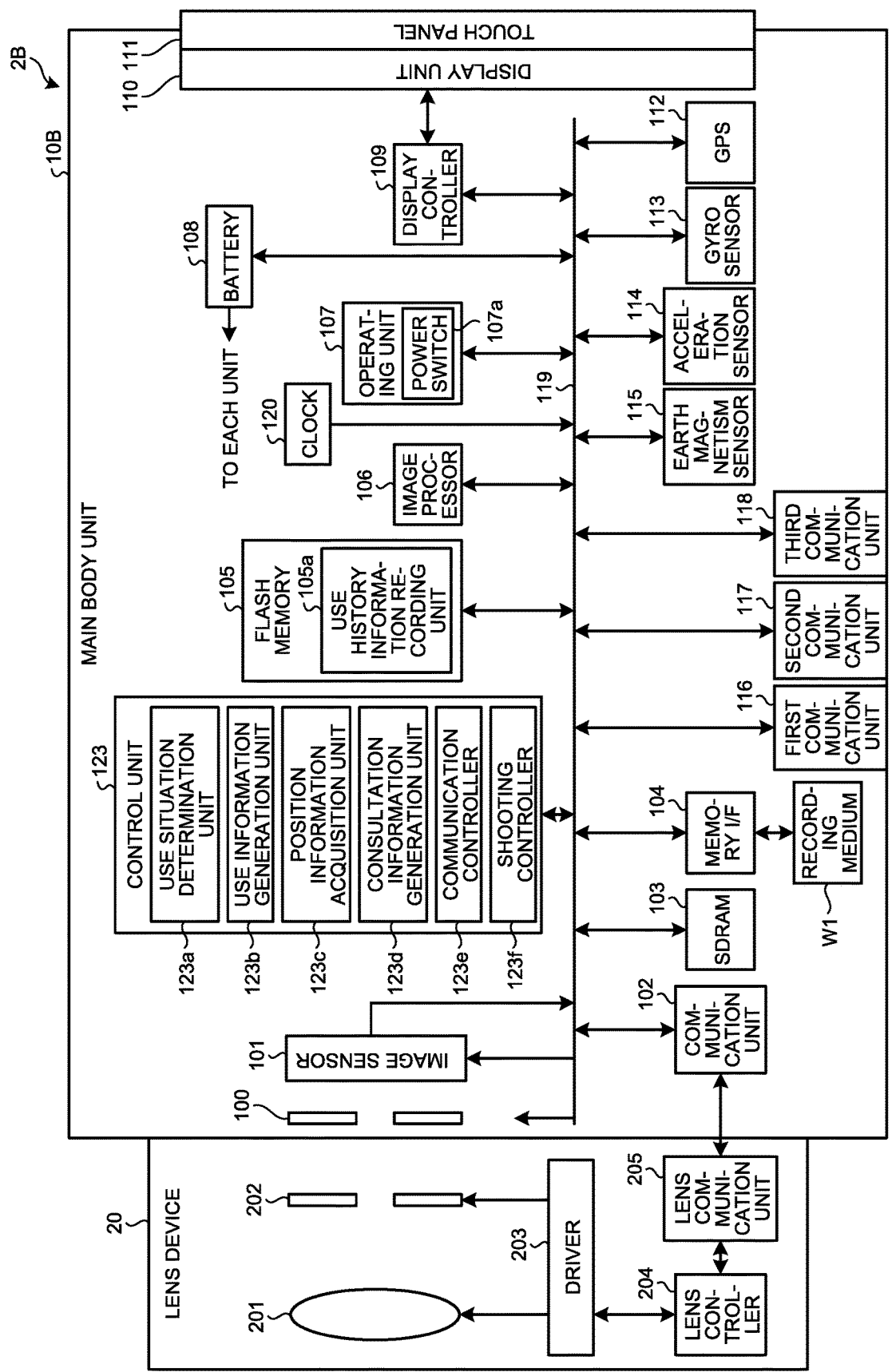
FIG. 24 is a block diagram illustrating a functional configuration of an information apparatus according to a third embodiment.

FIG. 24 is a schematic diagram illustrating an overview of the information apparatus according to the third embodiment. An information apparatus 2B illustrated in FIG. 24 includes a control unit 123 in place of the control unit 121 of the information apparatus 2 according to the first embodiment described above. Meanwhile, in an information apparatus such as a terminal and a portable apparatus that can communicated with another apparatus, when power off of the information apparatus is performed, the information apparatus no longer performs communication with another apparatus. Thus, a use situation of the information apparatus becomes unable to be recognized. Thus, recently, a use situation of the information apparatus is desired to be identified after a power operation of the information apparatus. Nevertheless, conventionally, a communication style of a person wearing a terminal is merely visualized. Thus, there has been such a problematic point that a use situation of an information apparatus such as a terminal cannot be recognized.

The control unit 123 includes a CPU and an ASIC, and comprehensively controls the units constituting the information apparatus 2B. The control unit 123 includes a use situation determination unit 123a, a use information generation unit 123b, a position information acquisition unit 123c, a consultation information generation unit 123d, a communication controller 123e, and a shooting controller 123f.

The use situation determination unit 123a performs determination regarding an operational situation, for issuing an advice for optimizing an operation of the information apparatus 2B. Nevertheless, the concept of the term "use situation determination" is broad, and an embodiment intended for improving an operating rate, and effectively utilizing the information apparatus 2B owned by the user is mainly presented here. In addition, in a similar point of view, if the operation of the information apparatus 2B involves excessive wasting and abrasion, a failure sometimes occurs in an important scene. Thus, information for optimizing such a way of use may be used. For example, if a use situation of the information apparatus 2B that is obtained after the lapse of a predetermined time from when a power state of the information apparatus 2B is switched by the operating unit 107 is determined, information regarding an operation such as information indicating that power has not been input for a long period is identified, and this serves as effective information for promoting an operation. Specifically, the use situation determination unit 123a determines a use situation based on an operational situation as to how the information apparatus 2B has been used after the power of the information apparatus 2B is input, and the information apparatus 2B operates, and a situation regarding maintenance of the information apparatus 2B (maintenance situation). The maintenance situation here refers to information that can assume a situation requiring maintenance, and can give an advice about excessive use, for example. The charging, wasting, and the like of the battery may be regarded as an operational situation, or may be regarded as a maintenance situation, or either situation may be decided by the setting.

Furthermore, the use situation determination unit 123a determines, based on time and date counted by the clock 120, an operational situation of the information apparatus 2B such as when and how the apparatus has been used and when the apparatus has been unused. Here, as a simple example, the operational situation includes a situation where the apparatus has been unused for a certain period of time, and a situation where a use time of one time is relatively shorter than a reference time held in advance. The use situation determination unit 123a may determine an operational situation of the information apparatus 2B by further acquiring information of a location where the information apparatus 2B is used.

In addition, the use situation determination unit 123a may have information of a maintenance situation of each unit constituting the information apparatus 2B. As information of a maintenance situation, for example, there are a situation of a deteriorated consumable, a cleaning situation, and the like. Using information of such a situation itself, the use situation determination unit 123a may determine a member to be replaced and a time for replacement of a consumable member, for example, or may determine whether repair such as replacement is necessary when replacement of a member or replacement of a consumable member has not been performed for a long time. For example, when the information apparatus 2B is a camera, wasting and consumption of the image sensor 101, a display element, or a memory, a continuous operating state, deterioration caused by heat generation, a use situation that is based on the number of releases of the shutter 100 (the number of shutter times), a wear state of the battery 108, and the like are determined. The use situation determination unit 123a determines a use situation of the shutter 100 based on a degree of abrasion, for example. Specifically, when the number of releases is large in a predetermined short time, the use situation determination unit 123a determines that abrasion has occurred. In addition, the use situation determination unit 123a determines a degree of battery deterioration based on an elapsed time from when a battery has been lastly charged, and the number of charging times. Specifically, in the case of a situation where charging is repeated at a frequency equal or larger than a predetermined frequency, the use situation determination unit 123a determines that deterioration occurs in the battery. By advising appropriate maintenance of the information apparatus 2B using such wasting information or deterioration information of the shutter 100 or a battery, the user can comfortably use the information apparatus 2B.

In this manner, because the information apparatus 2B includes a control unit including high-performance CPU and ASIC that can perform high-speed and large-volume information processing, not only information from the outside can be processed, but also necessary information regarding an apparatus main body can be detected, determined, processed, and recorded. In particular, the use frequency and the use situation in the apparatus main body (or including peripheral accessory) become important information when effective utilization of the apparatus is promoted, and maintenance is appropriately performed. The information apparatus 2B is only required to perform such situation determination on a temporal basis of a use of some sort. At the use start or in the middle of use of the information apparatus, it cannot be identified how long the apparatus is to be further used. It is there easy and effective to collectively perform determination at a timing when the use is to be ended (at the time of an operation of the power), or the like. Aside from this, use situations may be summarized per unit time such as a daily basis or weekly basis. Alternatively, information such as what type of function is how used in which time zone of time zones obtained by dividing one day may be acquired and summarized. Such a use situation may be represented by representation such as an operating rate per unit time. This may be an operating rate of each function such as how many hours in one day the apparatus is used, and which function is used at what frequency. This may be information indicating whether the user is a heavy user or a person who uses the apparatus not so often, and specific numerical information, and when the apparatus is frequency used, information can preferably classify functions frequency used. Also when the apparatus is used not so often, the apparatus can possibly be unused due to some functions, information of a use frequency of each function is important.

The use information generation unit 123b generates use information regarding a use situation of the information apparatus 2B. Specifically, the use information generation unit 123b generates use information in which the number of shooting times the information apparatus 2B has performed shooting, and times and dates are associated.

The position information acquisition unit 123c acquires position information of the information apparatus 2B based on position information detected by the GPS 112.

Based on a determination result of the use situation determination unit 123a, the consultation information generation unit 123d generates consultation information for consulting with the user of the portable information terminal 3. In addition, a database storing, as a set, a specific apparatus use situation, a request or a question to the user thereto, and the like may be provided, and the consultation information generation unit 123d may search the database for information corresponding to each apparatus use situation. In addition, according to a specific program executed by the information apparatus 2B, and a learning result of machine learning executed by the information apparatus 2B, a relationship of effective actions to apparatus use situations may be generated and output. The consultation information generation unit 123d needs not generate or output all pieces of consultation information, and may generate or output only information indicating that consultation is to be performed. The consultation information generation unit 123d may generate content itself of consultation information in cooperation with the portable information terminal 3 or another apparatus to which the portable information terminal 3 connects via a network. In addition, the generation itself of consultation information may be performed by the portable information terminal 3 and/or another apparatus. As an unused period of the information apparatus 2B becomes longer, while energy of a battery gets low, affection of the user to the information apparatus 2B gets little. Thus, if an unused period becomes longer, information to be generated as consultation information increases in a degree of urgency. In this manner, consultation information is preferably information changed according to a time in which an unused state continues.

The communication controller 123e controls communication of the first communication unit 116, the second communication unit 117, and the third communication unit 118. In addition, the communication controller 123e transmits a determination result of the use situation determination unit 123a or consultation information generated by the consultation information generation unit 123d, to the portable information terminal 3. It should be appreciated that information is required as necessary in a situation other than an unused situation. Because notification is desired to be urgently performed during use in some cases, consultation information may be transmitted at a specific timing such as, for example, a timing at which new information is received, and a timing at which a predetermined time has passed.

The shooting controller 123f performs shooting control of the information apparatus 2B by controlling the image sensor 101 and the lens device 20. In addition, under the operation of the operating unit 107, the shooting controller 123f changes a set parameter of which setting can be manually changed in the information apparatus 2B.

Overview of Processing of Communication System

Figure 25:
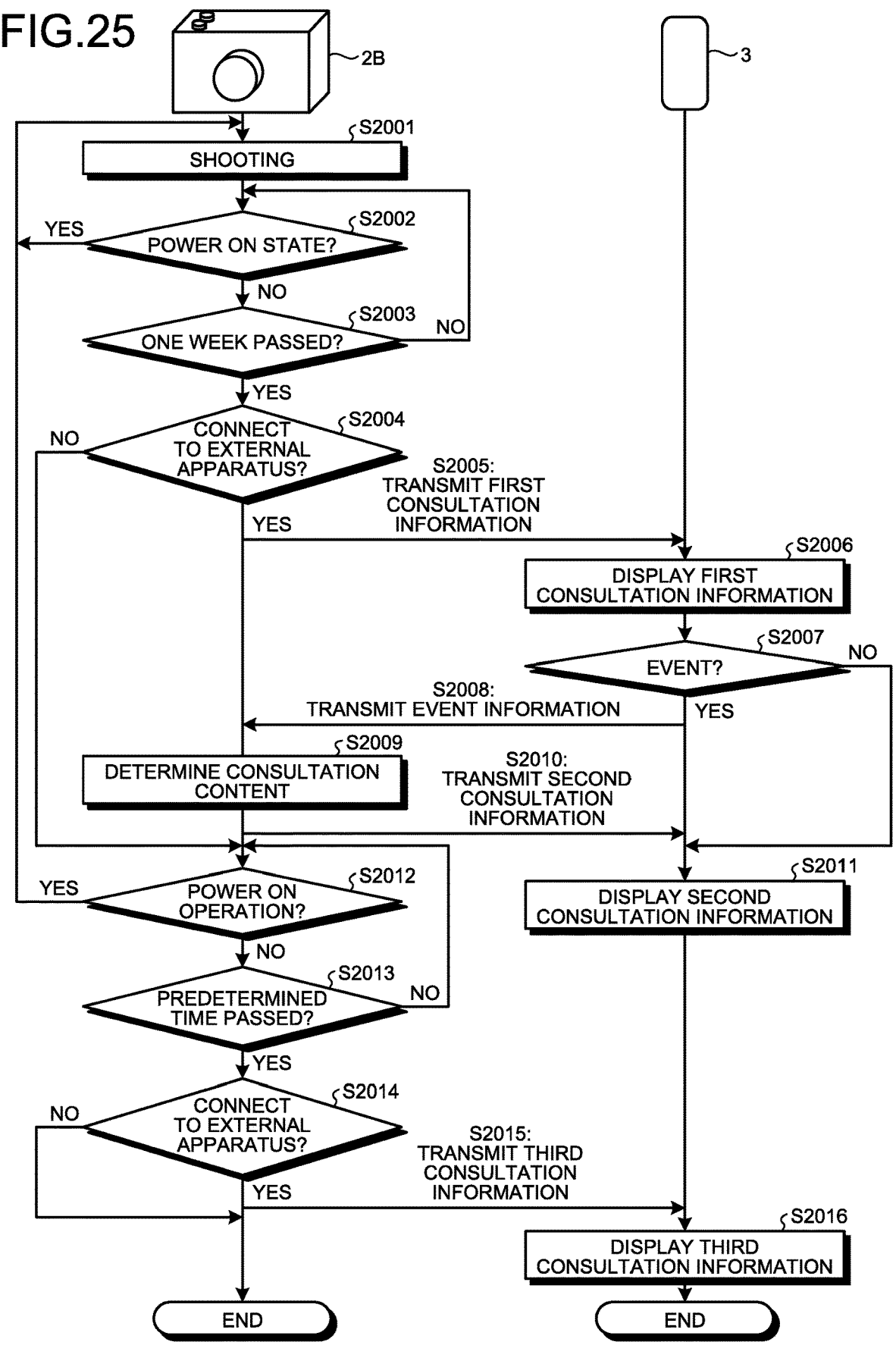
FIG. 25 is a conceptual diagram illustrating an overview of processing executed by a communication system according to the third embodiment.

Next, an overview of processing executed by a communication system 1B will be described. FIG. 25 is a conceptual diagram illustrating an overview of processing executed by the communication system 1B.

As illustrated in FIG. 25, the information apparatus 2B first captures an image of a subject according to an operation of the user (Step S2001).

Next, when a power operation such as, for example, a power off operation is not performed by the user via the power switch 107a, and the power on state is caused (Step S2002: Yes), the information apparatus 2B returns to Step S2001 described above. In contrast to this, when a power operation such as, for example, a power off operation is performed by the user via the power switch 107a, and the power is not in the on state (Step S2002: No), the information apparatus 2B advances the processing to Step S2003 to be described later. Here, a case where the power on state is not caused (sleep state) is a state where the information apparatus 2B is in a state where power is supplied at least to the second communication unit 117 and the clock 120, and power supply to the other units is stopped, and a state where, after power is supplied to the control unit 123 and the control unit 123 is activated only for a certain interval for each predetermined timing according to a timer of the clock 120, power supply to the control unit 123 is stopped again.

In Step S2003, in the information apparatus 2B, the use situation determination unit 123a determines, based on time and date information input from the clock 120, whether one week has passed from when the information apparatus 2B is switched to the power off state. When it is determined by the use situation determination unit 123a that one week has passed from when the information apparatus 2B is switched to the power off state (Step S2003: Yes), the information apparatus 2B advances the processing to Step S2004 to be described later. In contrast to this, when it is determined by the use situation determination unit 123a that one week has not passed from when the information apparatus 2B is switched to the power off state (Step S2003: No), the processing returns to Step S2002 described above. In addition, in some cases, a use state is caused by an acceleration sensor or the like determining that a power switch is operated or lifted as soon as the state is switched to the power off state or immediate before the switching. In this case, the user is considered to have use intention. In the case of such a situation, the use situation determination unit 123a may determine the state as a state where the information apparatus 2B is unused.

In Step S2004, when the second communication unit 117 connects to the portable information terminal 3 (Step S2004: Yes), the information apparatus 2B transmits first consultation information to the portable information terminal 3 (Step S2005). In contrast to this, when the second communication unit 117 does not connect to the portable information terminal 3 (Step S2004: No), the information apparatus 2B advances the processing to Step S2012 to be described later. In addition, because the information apparatus 2B can perform communication considering a consumption state of a battery, and information of an environment where the apparatus is placed, and the like, appropriate communication control suitable for the situation of the apparatus can be performed, which is not described in the flowchart. Here, information of the environment and the like includes, for example, GPS information, barometric information, a brightness determination result, and the like. In addition, as for the transmission of the radiowaves, for example, when the information apparatus 2B is left in a house of the user, whether to perform communication may be switched according to whether the user stays home. This can reduce trial of useless communication, and suppress energy consumption using close-range communication. For example, transition of GPS information, information of a life pattern obtained from an operation history or the like, and the like are obtained in advance from the portable information terminal 3, and in the case of a user who always comes home at night, such an arrangement that communication is performed only at night can be made. Even without such information of a life pattern, based on such a thought that communication is generally performed relatively easily at night, a communication timing may be decided. In particular, here, the description has been given of a case where the information apparatus 2B is a portable apparatus such as a camera, but it should be appreciated that the present disclosure can be applied to other products such as home electronics. In many cases, products such as home electronics are basically installed so as to stay home. In addition, a smartphone being a representative example of the portable information terminal 3 also has a high possibility of coming home at night together with the user, and entering a positional relationship in which a communication partner can be easily found.

Figure 26:
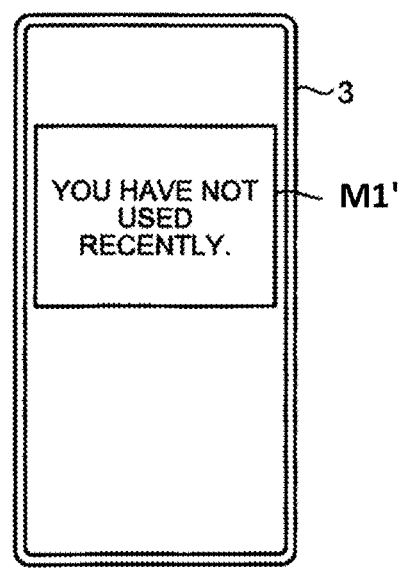
FIG. 26 is a diagram illustrating an example of a message displayed by a portable information terminal according to the third embodiment.

In Step S2006, in the portable information terminal 3, the display controller 32 causes first consultation information to be displayed on the display unit 33. Specifically, as illustrated in FIG. 26, the display controller 32 causes a message M1'corresponding to the first consultation information, to be displayed on the display unit 33. The user can thereby intuitively recognize a use situation of the information apparatus 2B via the portable information terminal 3. As a result, a use frequency of the information apparatus 2B of the user can be enhanced. In addition, here, the description has been given of an example where Step S2006 is triggered by information transmitted from the information apparatus 2B by a control step such as Step S2003, but the portable information terminal 3 may apply a trigger. In this case, even without determination in Step S2003, according to a request from the portable information terminal 3, the information apparatus 2B can determine a situation where the apparatus has been used, and transmit first consultation information in Step S2005. In addition, the display in Step S2006 needs not be performed immediately after information reception in Step S2005, and may be performed in a suitable situation. In addition, vibration or sound may be involved.

After that, in the portable information terminal 3 such as a smartphone and a wearable terminal, for example, the control unit 42 determines whether the user has an event, based on time and date information of the clock 41 and a schedule of an application recorded in the flash memory 31 (Step S2007). Specifically, the control unit 42 determines whether the schedule includes time and date of an event such as travel, outing, birthday, sports festival, entrance ceremony, graduation ceremony, and school play. In addition, aside from the schedule, the control unit 42 may determine whether the user has an event, based on an action history or an operation history of the portable information terminal 3, for example. The portable information terminal 3 may determine an annual event or a personal anniversary such as birthday, based on information obtained in the same time of the last year or the same time of the year before last, content such as written mails, blog, tweet, and received mails, or the like, or may directly determine an event from written information or acquired content (image, sound, etc.), without determining an event or anniversary. The event can also be determined from goods ordered by mail order or the like. For example, when the user buys a traveler's bag, it can be easily estimated that the user goes traveling after that. From such an action history or a purchase history, a profile of the user can be determined, and an event expected to be performed in Christmas, Halloween, Valentine's Day, or the like can be estimated by the portable information terminal 3. Furthermore, the portable information terminal 3 can also determine owned equipment or the like, from the purchase history. For example, when three months have passed from the purchase history, the information apparatus 2B that has purchased by mail order may be inquired of about a use situation. At a time point at which about three months have passed, there is a high possibility that energy in a battery remains, and the information apparatus 2B can perform communication. In addition, when the portable information terminal 3 and the information apparatus 2B are used in cooperation (e.g. when the portable information terminal shares content or controls the information apparatus in place of a remote controller), the portable information terminal 3 can also directly determine a use state of the information apparatus 2B. In other words, the information apparatus 2B can communicate with the portable information terminal 3, and the use situation determination unit 123a that determines a use situation of the information apparatus 2B can determine a use situation, a history, and the like, based on information from the portable information terminal 3. If a determination result of the use situation determination unit 123a is transmitted to the portable information terminal 3 in a state where the information apparatus 2B is unused, a useful advice can be conveyed to the user via the portable information terminal 3 usually carried by the user. Nevertheless, in this case, because a communication circuit needs to operate so as to periodically receive communication, so that communication can be performed, there is such a disadvantage that consumption energy becomes larger than that in the case of voluntarily well-timing as in Step S2008 in FIG. 25.

It should be appreciated that the control unit 42 may determine whether the day is a nonwork day or a holiday, based on time and date information of the clock 41, and when the day is a nonwork day or a holiday, determine that the user has an event. In addition, from such information, the use situation determination unit 123a determines a daily life pattern of the user, and transmits information of the pattern (e.g. go to work in the early morning, night work, etc.), to the information apparatus 2B, whereby an arrangement for facilitating communication at a timing at which the user stays home can be performed. It is better to determine, based on such a life pattern, an optimum timing at which consultation information is to be output. An arrangement for determining whether the user has heard the advice, or whether the advice has been helpful may be performed, and a way of outputting an advice may be modified. This can be determined using deep learning or the like, if data on a way of outputting an advice and a way of receiving are accumulated. In addition, because weekend night can be generally said to be a situation where a life pattern is settled, in this case, the use situation determination unit 123a may perform more simple determination that is based on the day of the week, a holiday, time designation, or the like.

When it is determined by the control unit 42 that the user has an event (Step S2007: Yes), the portable information terminal 3 transmits event information to the information apparatus 2B (Step S2008). After Step S2008, the portable information terminal 3 advances the processing to Step S2011 to be described later.

After Step S2008, the information apparatus 2B generates second consultation information based on the event information transmitted from the portable information terminal 3 (S2009), and a determination result determined by the use situation determination unit 123a, and transmits the second consultation information to the portable information terminal 3 (Step S2010). After Step S2010, the information apparatus 2B advances the processing to Step S2011 to be described later.

Figure 27:
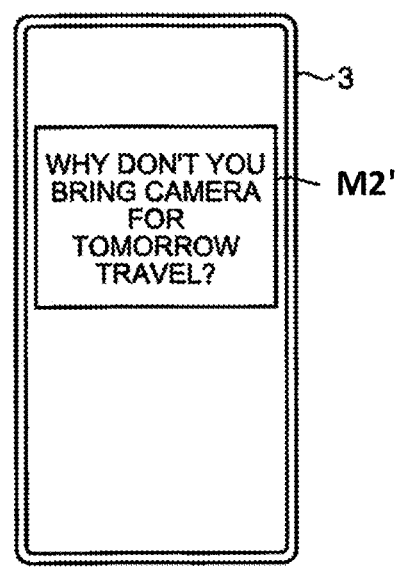
FIG. 27 is a diagram illustrating an example of a message displayed by the portable information terminal according to the third embodiment.

In Step S2011, in the portable information terminal 3, the display controller 32 causes the second consultation information to be displayed on the display unit 33. Specifically, as illustrated in FIG. 27, the display controller 32 causes a message M2' corresponding to the second consultation information, to be displayed on the display unit 33. This can promote the user to carry the information apparatus 2B when the user goes out. After Step S2011, the portable information terminal 3 advances the processing to Step S2016 to be described later. The display also needs not be performed immediately after receiving communication, and it is better to perform display by well-timing so that the user easily hears an advice. For example, if the information apparatus 2B is a camera, by outputting an advice at a settled timing before the user goes out, rather than outputting an advice during busy time such as during business or work, the user can increase a use frequency. Incidentally, the portable information terminal 3 may have information of such a life pattern of the user or the like.

In Step S2012, when a power operation such as, for example, a power on operation is performed by the user via the power switch 107a (Step S2012: Yes), the information apparatus 2B returns to Step S2001 described above. In contrast to this, when a power on operation is not performed by the user (Step S2012: No), the information apparatus 2B advances the processing to Step S2013 described above.

In Step S2013, in the information apparatus 2B, the use situation determination unit 123a determines whether a predetermined time has passed from when the information apparatus 2B is switched to the power off state. For example, the use situation determination unit 123a determines whether one month or more has passed from when the information apparatus 2B had been switched to the power off state. When it is determined by the use situation determination unit 123a that the predetermined time has passed from when the information apparatus 2B is switched to the power off state (Step S2013: Yes), the information apparatus 2B advances the processing to Step S2014 to be described later. In contrast to this, when it is determined by the use situation determination unit 123a that the predetermined time has not passed from when the information apparatus 2B is switched to the power off state (Step S2013: No), the processing returns to Step S2012 described above.

In Step S2014, when the second communication unit 117 connects to the portable information terminal 3 (Step S2014: Yes), the information apparatus 2B transmits third consultation information to the portable information terminal 3 via the second communication unit 117 (Step S2015). In contrast to this, when the second communication unit 117 does not connect to the portable information terminal 3 (Step S2014: No), the information apparatus 2B ends the processing.

Figure 28:
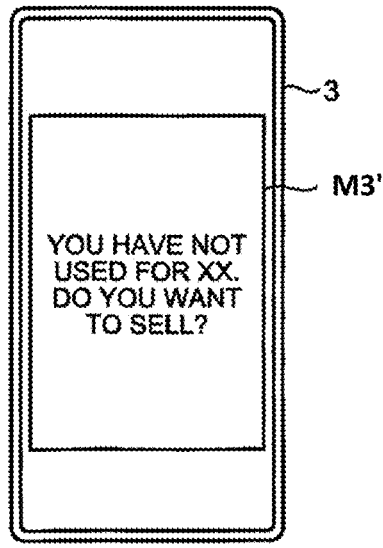
FIG. 28 is a diagram illustrating an example of a message displayed by the portable information terminal according to the third embodiment.

In Step S2016, in the portable information terminal 3, the display controller 32 causes the third consultation information to be displayed on the display unit 33. Specifically, as illustrated in FIG. 28, the display controller 32 causes a message M3' corresponding to first advice information, to be displayed on the display unit 33. The user can thereby intuitively recognize a use situation of the information apparatus 2B via the portable information terminal 3. As a result, a use frequency of the information apparatus 2B of the user can be enhanced, or sellout of an unnecessary information apparatus 2B can be promoted. After Step S2016, the portable information terminal 3 ends the processing.

Processing of Information Apparatus in Shooting

Figure 29:
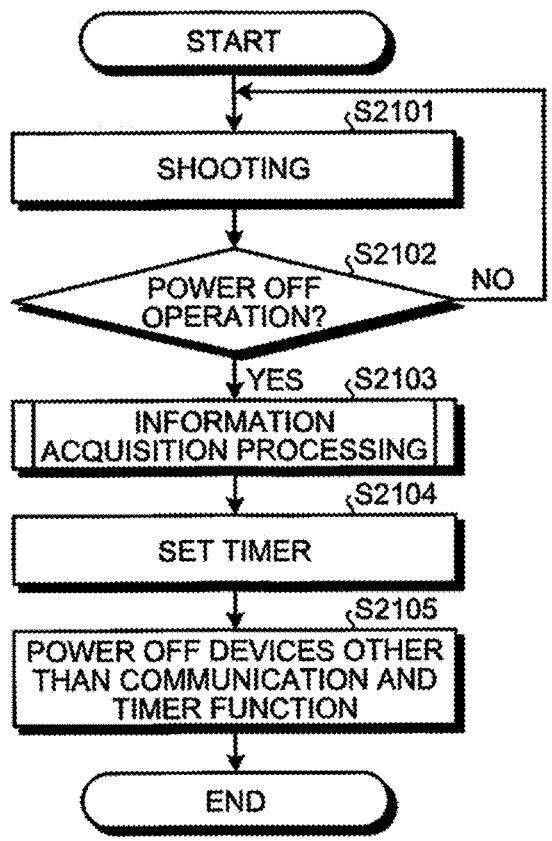
FIG. 29 is a flowchart illustrating an overview of processing executed by the information apparatus according to the third embodiment in shooting.

Next, details of processing executed by the information apparatus 2B in shooting will be described. FIG. 29 is a flowchart illustrating an overview of processing executed by the information apparatus 2B in shooting. In addition, in FIG. 29, processing performed by the information apparatus 2B in shooting will be described.

As illustrated in FIG. 29, the information apparatus 2B first performs shooting according to an operation of the operating unit 107 (Step S2101), and when a power off operation is performed via the power switch 107a (Step S2102: Yes), the information apparatus 2B advances the processing to Step S2103 to be described later. In contrast to this, when a power off operation is not performed via the power switch 107a (Step S2102: No), the information apparatus 2B returns to Step S2101 described above.

In Step S2103, the information apparatus 2B executes information acquisition processing of acquiring a shooting history and position information of the information apparatus 2B (Step S2103). After Step S2103, the information apparatus 2B advances the processing to Step S2104 to be described later.

Information Acquisition Processing

Figure 30:
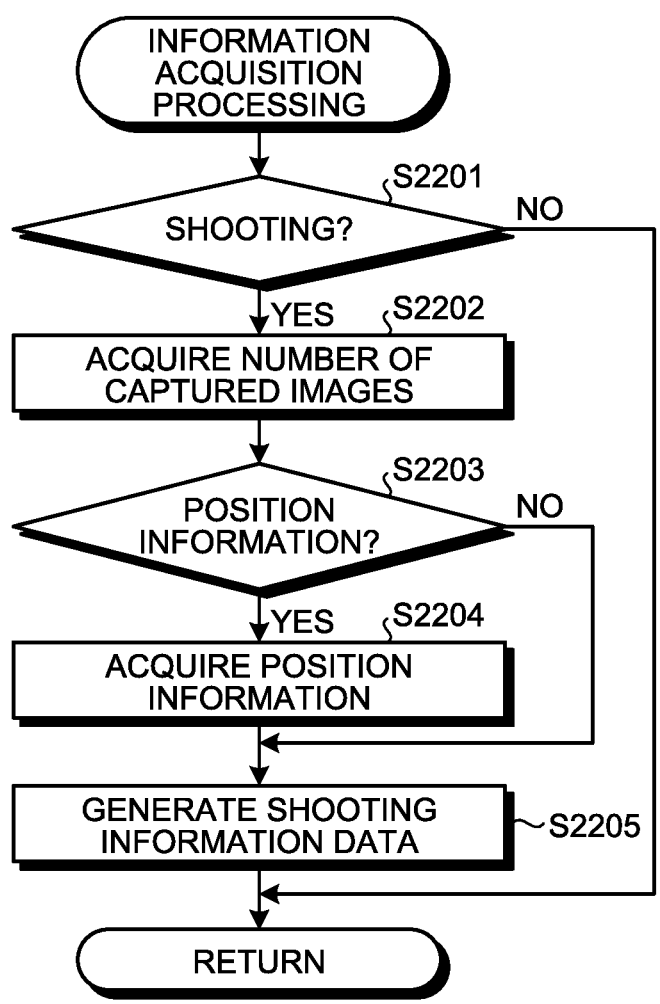
FIG. 30 is a flowchart illustrating an overview of information acquisition processing in FIG. 29.

FIG. 30 is a flowchart illustrating an overview of the information acquisition processing in Step S2103 of FIG. 29.

As illustrated in FIG. 30, when the information apparatus 2B performs shooting (Step S2201: Yes), the control unit 123 acquires the number of captured images via the recording medium W1 (Step S2202). After Step S2202, the information apparatus 2B advances the processing to Step S2203 to be described later. In contrast to this, when the information apparatus 2B does not perform shooting (Step S2201: No), the information apparatus 2B returns to a main routine in FIG. 29.

In Step S2203, when the GPS 112 acquires position information (Step S2203: Yes), the control unit 123 acquires the position information acquired by the GPS 112 (Step S2204). After Step S2204, the information apparatus 2B advances the processing to Step S2205 to be described later. In contrast to this, when the GPS 112 does not acquire position information (Step S2203: No), the information apparatus 2B advances the processing to Step S2205 to be described later.

In Step S2205, the control unit 123 generates shooting information data at least based on the number of captured images acquired in Step S2202 (Step S2205). After Step S2205, the information apparatus 2B returns to a main routine in FIG. 29.

Referring back to FIG. 29, the description subsequent to Step S2104 will be continued.

In Step S2104, the control unit 123 sets a timer that starts counting of a time from when a power off operation is performed.

Subsequently, the control unit 123 powers off devices other than communication and the timer, in the units constituting the information apparatus 2B (Step S2105). Specifically, the control unit 123 performs control of powering off devices other than devices related to the first communication unit 116, the second communication unit 117, the third communication unit 118, and the clock 120. More specifically, the control unit 123 powers off devices other than communication and the timer by stopping power supply from the battery 108 to main devices such as, for example, the image sensor 101, the communication unit 102, the image processor 106, the display controller 109, the display unit 110, the touch panel 111, the gyro sensor 113, the acceleration sensor 114, the earth magnetism sensor 115, and the lens device 20. By the power off, because many switches become unresponsive, and a display or the like can no longer be seen, the user can determine that the information apparatus 2B does not function and enters an energy saving state, and can put off or put the apparatus into a bag or a pocket while feeling safe. If the information apparatus 2B becomes nondisplay, many users forget about the apparatus, and start another action or work. Thus, in the subject application, a power off processing of stopping the information apparatus 2B is performed by performing energy saving and recording various types of parameters into the flash memory 105 so that the information can be communicated later. In addition, in this third embodiment, it is represented that "devices other than communication and the timer are powered off", but a specific switch, a partial clock, actuation of a partial function at a time set by a timer as necessary, or the like is enabled to be performed. After Step S2105, the information apparatus 2B ends the processing.

Processing of Information Apparatus after Power Off

Figure 31:
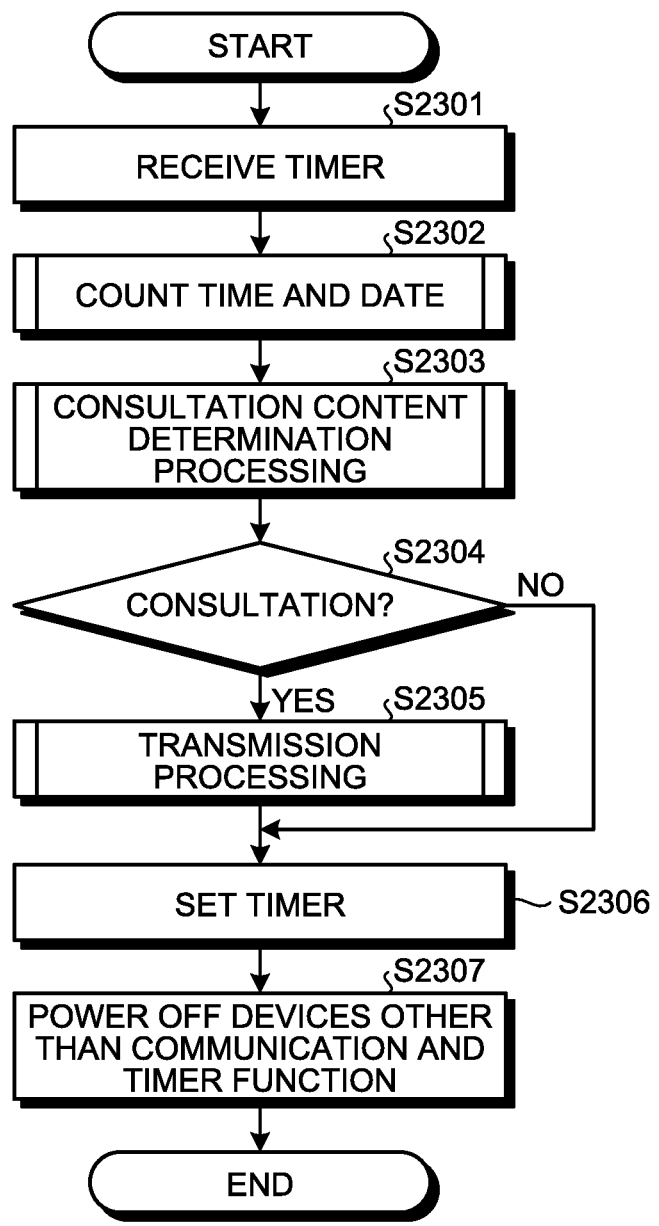
FIG. 31 is a flowchart illustrating an overview of processing executed by the information apparatus according to the third embodiment after power off.

Next, processing executed by the information apparatus 2B after power off will be described. FIG. 31 is a flowchart illustrating an overview of processing executed by the information apparatus 2B after power off.

As illustrated in FIG. 31, the control unit 123 first executes timer reception processing of receiving time information from the clock 120 (Step S2301).

Subsequently, the control unit 123 counts time and date from when the information apparatus 2B is switched to the power off state, based on the time information received from the clock 120 (Step S2302).

After that, the information apparatus 2B executes consultation content determination processing of determining content for consulting with the user of the information apparatus 2B by transmitting a message to the portable information terminal 3 (Step S2303). After Step S2303, the information apparatus 2B advances the processing to Step S2304 to be described later.

Consultation Content Determination Processing

Figure 32:
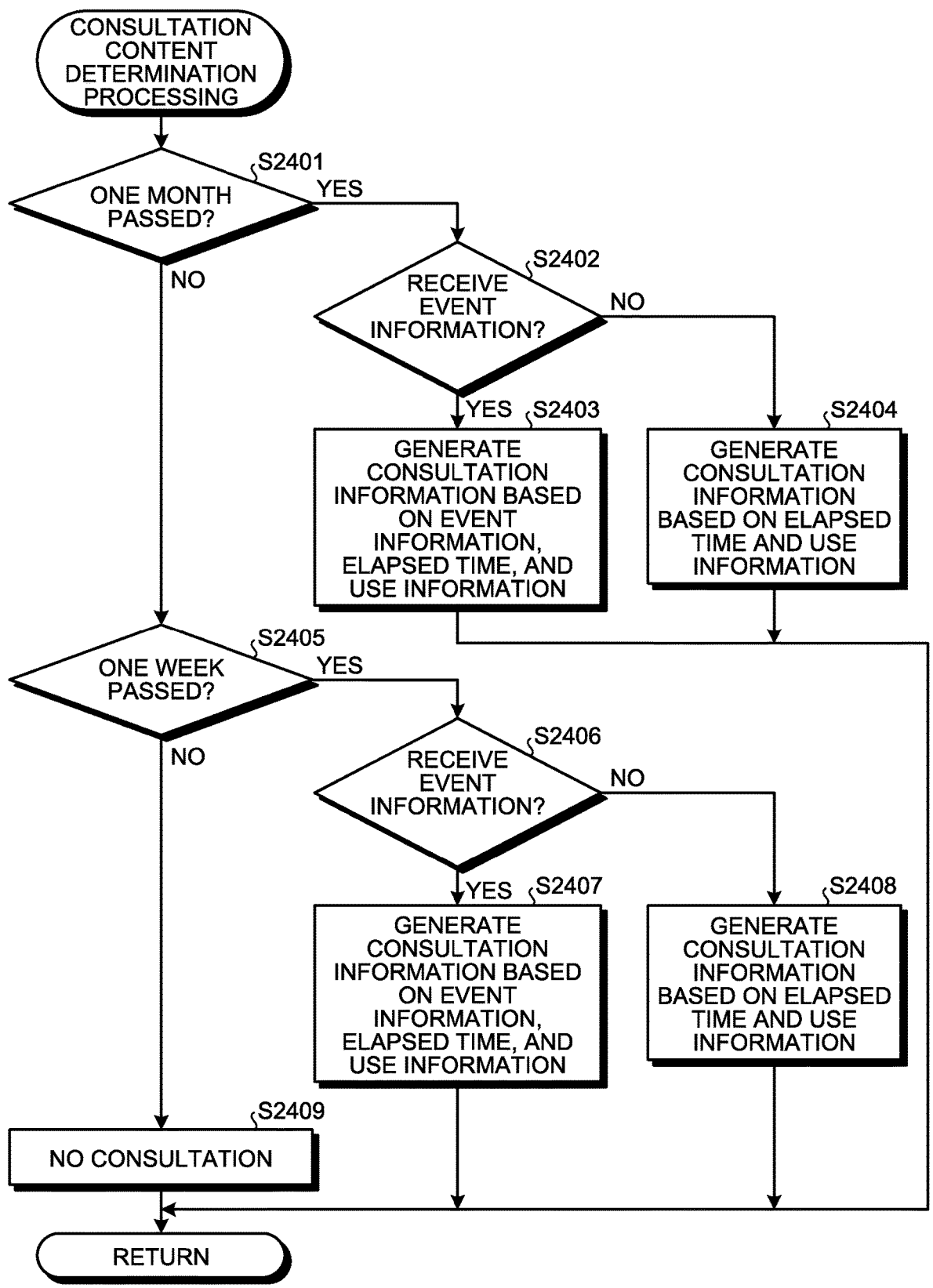
FIG. 32 is a flowchart illustrating an overview of consultation content determination processing in FIG. 31.

FIG. 32 is a flowchart illustrating an overview of the consultation content determination processing in Step S2303 of FIG. 31.

As illustrated in FIG. 32, the use situation determination unit 123a first determines whether one month has passed from when the information apparatus 2B is switched to the power off state, based on the time and date information input from the clock 120 (Step S2401). When it is determined by the use situation determination unit 123a that one month has passed from when the information apparatus 2B is switched to the power off state (Step S2401: Yes), the information apparatus 2B advances the processing to Step S2402 to be described later. In contrast to this, when it is determined by the use situation determination unit 123a that one month has not passed from when the information apparatus 2B is switched to the power off state (Step S2401: No), the information apparatus 2B advances the processing to Step S2405 to be described later.

In Step S2402, when the first communication unit 116 receives event information from the portable information terminal 3 (Step S2402: Yes), the consultation information generation unit 123d generates consultation information based on an elapsed time determined by the use situation determination unit 123a, the event information received by the first communication unit 116, and use information generated by the use information generation unit 123b (Step S2403). After Step S2403, the information apparatus 2B returns to a main routine in FIG. 31.

In Step S2402, when the first communication unit 116 does not receive event information from the portable information terminal 3 (Step S2402: No), the consultation information generation unit 123d generates consultation information based on an elapsed time determined by the use situation determination unit 123a, and use information generated by the use information generation unit 123b (Step S2404). After Step S2404, the information apparatus 2B returns to a main routine in FIG. 31.

In Step S2405, the use situation determination unit 123a determines, based on the time and date information input from the clock 120, whether one week has passed from when the information apparatus 2B is switched to the power off state. When it is determined by the use situation determination unit 123a that one week has passed from when the information apparatus 2B is switched to the power off state (Step S2405: Yes), the information apparatus 2B advances the processing to Step S2406 to be described later. In contrast to this, when it is determined by the use situation determination unit 123a that one week has not passed from when the information apparatus 2B is switched to the power off state (Step S2405: No), the information apparatus 2B advances the processing to Step S2409 to be described later.

In Step S2406, when the first communication unit 116 receives event information from the portable information terminal 3 (Step S2406: Yes), the consultation information generation unit 123d generates consultation information based on an elapsed time determined by the use situation determination unit 123a, the event information received by the first communication unit 116, and use information generated by the use information generation unit 123b (Step S2407). After Step S2407, the information apparatus 2B returns to a main routine in FIG. 31.

In Step S2406, when the first communication unit 116 does not receive event information from the portable information terminal 3 (Step S2406: No), the consultation information generation unit 123d generates consultation information based on an elapsed time determined by the use situation determination unit 123a, and use information generated by the use information generation unit 123b (Step S2408). After Step S2408, the information apparatus 2B returns to a main routine in FIG. 31.

In Step S2409, the consultation information generation unit 123d generates a flag of no consultation. After Step S2409, the information apparatus 2B returns to a main routine in FIG. 31.

Referring back to FIG. 31, the description subsequent to Step S2304 will be continued.

In Step S2304, when consultation is to be performed (Step S2304: Yes), the information apparatus 2B executes transmission processing of transmitting consultation information to the portable information terminal 3 (Step S2305). After Step S2305, the information apparatus 2B advances the processing to Step S2306 to be described later.

Transmission Processing

Figure 33:
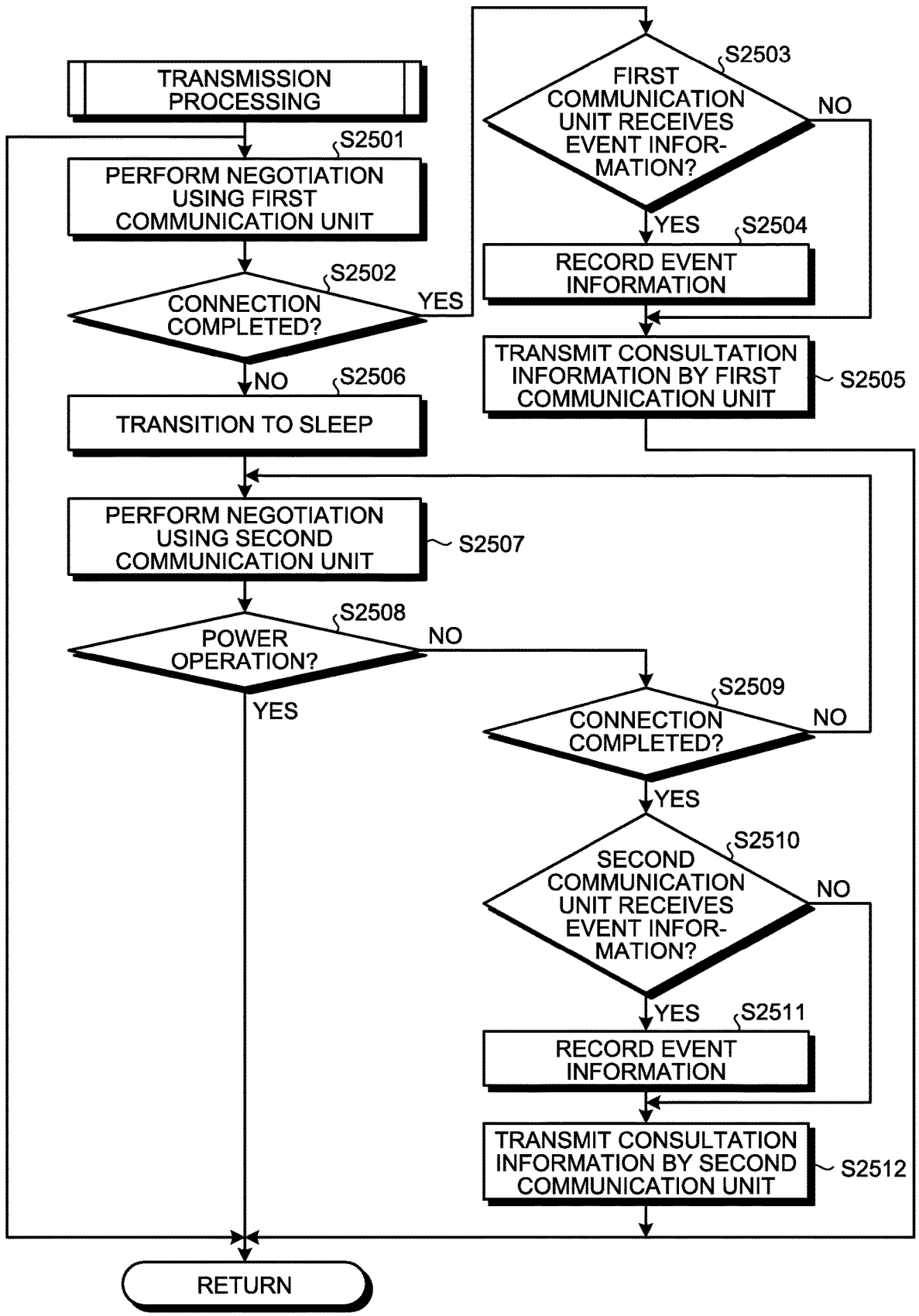
FIG. 33 is a flowchart illustrating an overview of transmission processing in FIG. 31.

Next, the details of the transmission processing described in Step S2305 of FIG. 31 described above will be described. FIG. 33 is a flowchart illustrating an overview of the transmission processing.

As illustrated in FIG. 33, the communication controller 123e first performs negotiation for performing communication with the portable information terminal 3, using the first communication unit 116 (Step S2501), and when connection with the portable information terminal 3 is completed (Step S2502: Yes), when the first communication unit 116 receives event information from the portable information terminal 3 (Step S2503: Yes), the control unit 123 records the event information into the flash memory 105 or the SDRAM 103 (Step S2504). After Step S2504, the information apparatus 2B advances the processing to Step S2505 to be described later.

In Step S2503, when the first communication unit 116 does not receive event information from the portable information terminal 3 (Step S2503: No), the information apparatus 2B advances the processing to Step S2505 to be described later.

In Step S2505, the communication controller 123e causes the first communication unit 116 to transmit consultation information to the portable information terminal 3. After Step S2505, the information apparatus 2B returns to a main routine in FIG. 31.

In Step S2502, when connection with the portable information terminal 3 is not completed (Step S2502: No), a state of the information apparatus 2B is shifted to sleep (the power off state) (Step S2506). After Step S2506, the information apparatus 2B advances the processing to Step S2507 to be described later.

Subsequently, the communication controller 123e performs, using the second communication unit 117, negotiation for performing communication with the portable information terminal 3 (Step S2507), and when a power operation of bringing the power of the information apparatus 2B into the on state is performed on the power switch 107a (Step S2508: Yes), the information apparatus 2B returns to a main routine in FIG. 31. In contrast to this, when a power operation of bringing the power of the information apparatus 2B into the on state is not performed on the power switch 107a (Step S2508: No), the information apparatus 2B advances the processing to Step S2509 to be described later.

In Step S2509, when connection with the portable information terminal 3 is completed (Step S2509: Yes), when the first communication unit 116 receives event information from the portable information terminal 3 (Step S2510: Yes), the control unit 123 records the event information into the flash memory 105 or the SDRAM 103 (Step S2511). After Step S2511, the information apparatus 2B advances the processing to Step S2512 to be described later.

In Step S2509, when connection with the portable information terminal 3 is not completed (Step S2509: No), the information apparatus 2B returns to Step S2507 described above.

In Step S2510, when the first communication unit 116 does not receive event information from the portable information terminal 3 (Step S2510: No), the information apparatus 2B advances the processing to Step S2512 to be described later.

Subsequently, the communication controller 123e causes the second communication unit 117 to transmit consultation information to the portable information terminal 3 (Step S2512). After Step S2512, the information apparatus 2B returns to a main routine in FIG. 31.

Referring back to FIG. 31, the description subsequent to Step S2306 will be continued.

In Step S2306, the control unit 123 sets, in the clock 120, a timer for activating the control unit 123 by starting power supply.

Subsequently, the control unit 123 powers off devices other than communication and a timer function, in the units constituting the information apparatus 2B (Step S2307). After Step S2307, the information apparatus 2B ends the processing.

Processing of Portable Information Terminal

Figure 34:
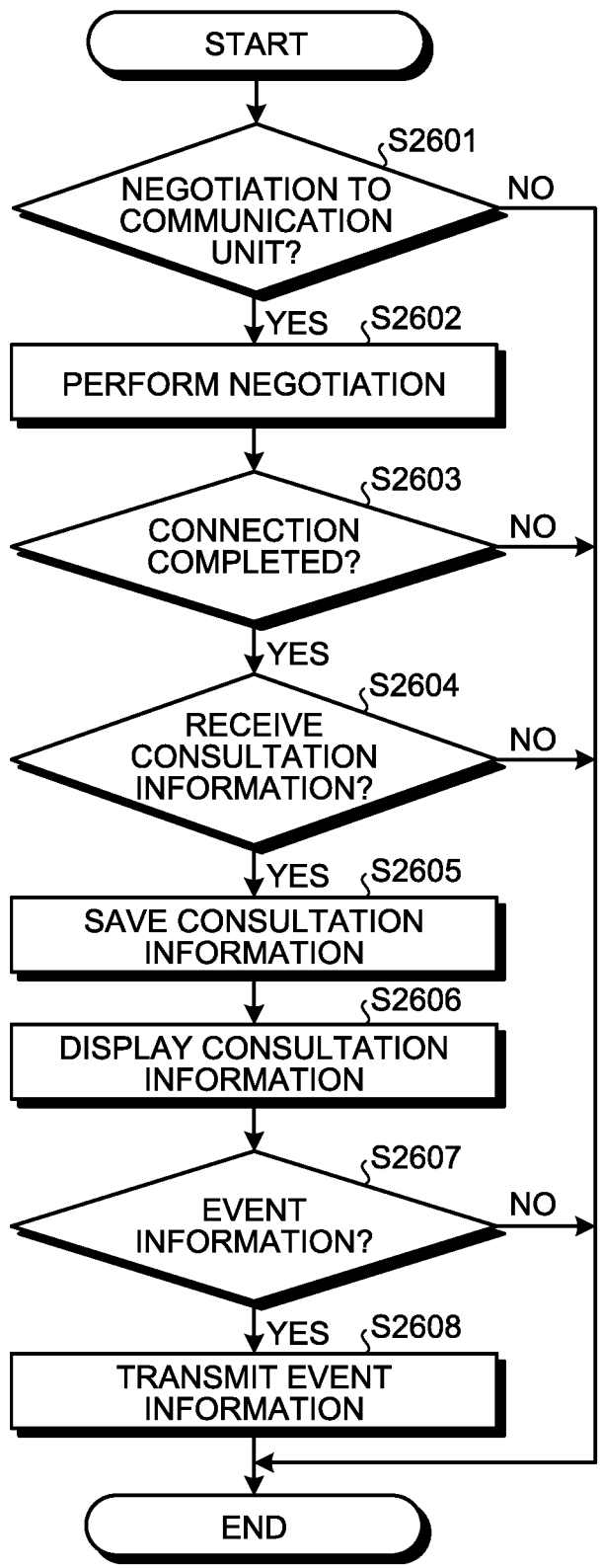
FIG. 34 is a flowchart illustrating an overview of processing executed by the portable information terminal according to the third embodiment.

Next, processing executed by the portable information terminal 3 will be described. FIG. 34 is a flowchart illustrating an overview of processing executed by the portable information terminal 3.

As illustrated in FIG. 34, when negotiation is performed from the information apparatus 2B to the first communication unit 35 (Step S2601: Yes), the control unit 42 first performs negotiation for performing communication with the information apparatus 2B, using the first communication unit 35 (Step S2602), and when the first communication unit 35 has completed connection with the information apparatus 2B (Step S2603: Yes), when consultation information is received from the information apparatus 2B (Step S2604: Yes), the control unit 42 saves the consultation information into the SDRAM 39 (Step S2605).

Subsequently, the display controller 32 causes a message corresponding to the consultation information saved in the SDRAM 39, to be displayed on the display unit 33 (Step S2606).

Subsequently, when there is event information in a schedule application recorded in the flash memory 31 (Step S2607: Yes), the control unit 42 causes the first communication unit 35 to transmit the event information (Step S2608). After Step S2608, the portable information terminal 3 ends the processing.

In Step S2601, when negotiation is not performed from the information apparatus 2B to the first communication unit 35 (Step S2601: No), the portable information terminal 3 ends the processing.

In Step S2603, when the first communication unit 35 has not completed connection with the information apparatus 2B (Step S2603: No), the portable information terminal 3 ends the processing.

In Step S2604, when consultation information is not received from the information apparatus 2B (Step S2604: No), the portable information terminal 3 ends the processing.

In Step S2607, when there is no event information in a schedule application recorded in the flash memory 31 (Step S2607: No), the portable information terminal 3 ends the processing.

According to the third embodiment described above, because the communication controller 123e transmits a determination result of the use situation determination unit 123a to the portable information terminal 3, efficient use of the apparatus can be promoted. In addition, according to this third embodiment, a use situation can be recognized after a power operation.

In addition, according to the third embodiment, because the use situation determination unit 123a determines an operational situation of the information apparatus 2B based on time and date counted by the clock 120, a use situation can be recognized after a power operation.

In addition, according to the third embodiment, because the communication controller 123e transmits consultation information generated by the consultation information generation unit 123d, to the portable information terminal 3, the user of the portable information terminal 3 can recognize a use situation of the information apparatus 2B.

In addition, according to the third embodiment, because the consultation information generation unit 123d generates consultation information based on event information received from the portable information terminal 3 and a determination result of the use situation determination unit 123a, the user of the portable information terminal 3 can be promoted to take out the information apparatus 2B at the time of an event.

In addition, in the third embodiment, a consultation information generation unit 123d generates consultation information different in content, based on an elapsed time, but the generation is not limited to this, and for example, consultation information may be generated based on position information acquired by the position information acquisition unit 123c and a determination result of the use situation determination unit 123a.

Fourth Embodiment

Next, the fourth embodiment will be described. A communication system according to the fourth embodiment has the same configuration as the communication system 1B according to the third embodiment described above, and consultation content determination processing executed by an information apparatus is different. Thus, hereinafter, consultation content determination processing executed by an information apparatus according to the fourth embodiment will be described. In addition, the same configurations as those in the communication system 1B according to the third embodiment described above are assigned the same signs, and the description thereof will be omitted.

Consultation Content Determination Processing

Figure 35:
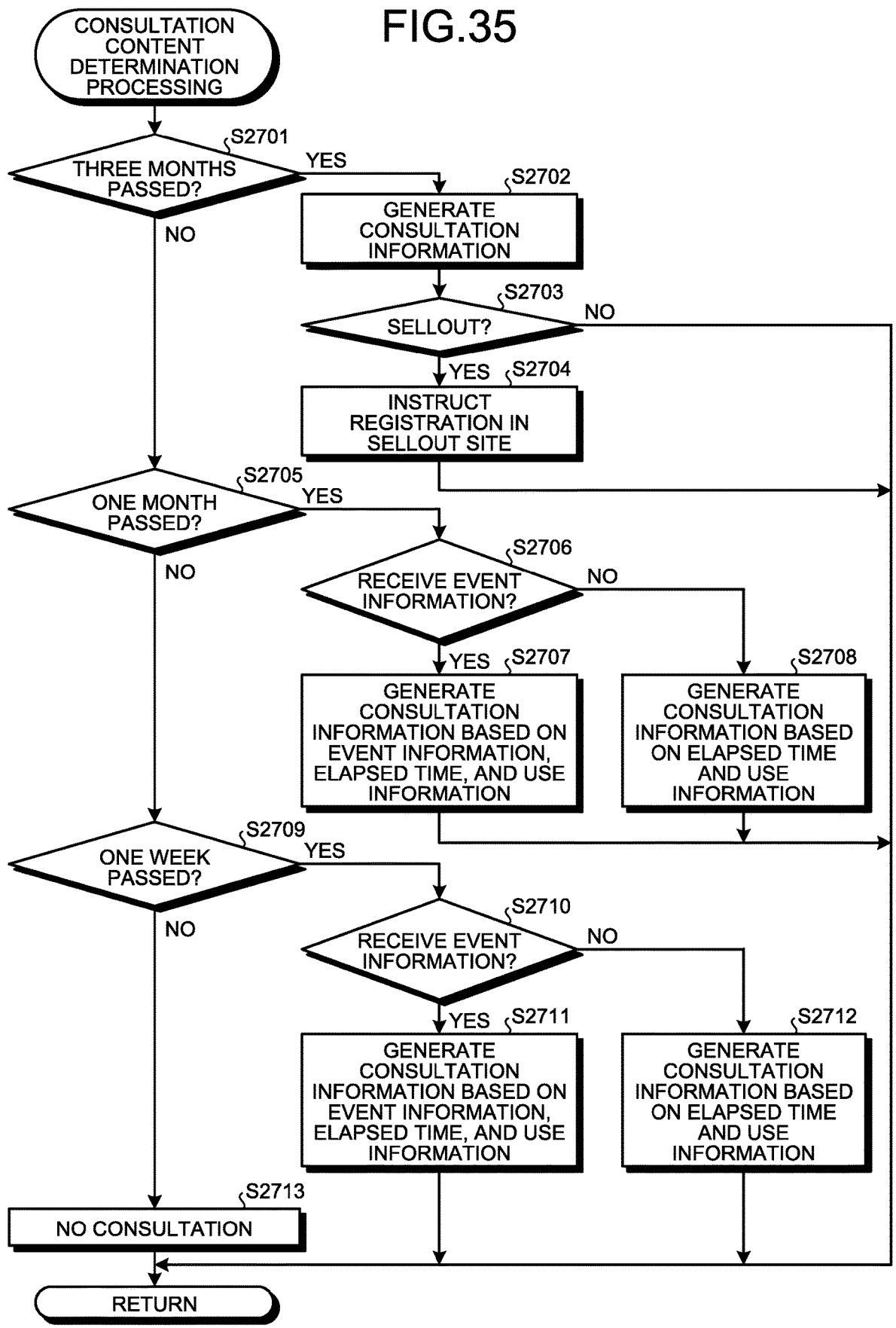
FIG. 35 is a flowchart illustrating an overview of consultation content determination processing executed by an information apparatus according to a fourth embodiment.

FIG. 35 is a flowchart illustrating an overview of the consultation content determination processing executed by an information apparatus 2B according to the fourth embodiment.

As illustrated in FIG. 35, the use situation determination unit 123a first determines whether three months have passed from when the information apparatus 2B is switched to the power off state, based on time and date information input from the clock 120 (Step S2701). When it is determined by the use situation determination unit 123a that three months have passed from when the information apparatus 2B is switched to the power off state (Step S2701: Yes), the information apparatus 2B advances the processing to Step S2702 to be described later. In contrast to this, when it is determined by the use situation determination unit 123a that three months have not passed from when the information apparatus 2B is switched to the power off state (Step S2701: No), the information apparatus 2B advances the processing to Step S2705 to be described later.

In Step S2702, the consultation information generation unit 123d generates consultation information based on an elapsed time determined by the use situation determination unit 123a, and use information generated by the use information generation unit 123b.

When the consultation information generated by the consultation information generation unit 123d indicates sellout of the information apparatus 2B (Step S2703: Yes), the communication controller 123e transmits, to the portable information terminal 3, via the server 4, an instruction signal for instructing a sellout site to register the information apparatus 2B (Step S2704). Based on the instruction signal from the information apparatus 2B, the portable information terminal 3 thereby registers sellout of the information apparatus 2B in the server 4 that manages an auction site. As a result, on a subsequent day, notification and a shipping member such as cardboard for selling the information apparatus 2B are transmitted from a management company that manages the server 4, to an address registered by the user of the portable information terminal 3. After Step S2704, the information apparatus 2B returns to a main routine in FIG. 31.

In Step S2703, when consultation information generated by the consultation information generation unit 123d does not indicate sellout of the information apparatus 2B (Step S2703: No), the information apparatus 2B returns to a main routine in FIG. 31.

Steps S2705 to S2713 respectively correspond to the aforementioned Steps S2401 to S2409 in FIG. 32.

According to the fourth embodiment described above, because the communication controller 123e transmits a determination result of the use situation determination unit 123a to the portable information terminal 3, a use situation can be recognized after a power operation.

In addition, according to the fourth embodiment, when the consultation information generated by the consultation information generation unit 123d indicates sellout of the information apparatus 2B, the communication controller 123e transmits, to the portable information terminal 3, via the server 4, an instruction signal for instructing a sellout site to register the information apparatus 2B. Thus, the unused information apparatus 2B can be easily sold.

Other Embodiments

Various inventions can be formed by appropriately combining a plurality of components disclosed in the aforementioned first to fourth embodiments of the present disclosure. For example, several components may be deleted from all the components described in the aforementioned first to fourth embodiments of the present disclosure. Furthermore, components described in the aforementioned first to fourth embodiments of the present disclosure may be appropriately combined. Furthermore, components described in the aforementioned first and second embodiments of the present disclosure may be appropriately combined. An apparatus written above as an information apparatus can be replaced with an apparatus including an electronic circuit, such as general home electronics, a vehicle such as an automobile, a drone, and a robot. In many cases, such an apparatus is an information apparatus from the viewpoint that various sensors are mounted.

In addition, in the first to fourth embodiments of the present disclosure, the aforementioned "unit" can also be read as "means", "circuit", and the like. For example, a control unit can also be read as a control means or a control circuit. In addition, in the embodiments, a portion described as the "unit" (section or unit) may be formed by a dedicated circuit or by combining a plurality of general-purpose circuits, or as necessary, may be formed by combining a microcomputer that performs an operation according to preprogrammed software, a processor such as a CPU, a sequencer, FPGA, and the like. In addition, a design can be made in such a manner that a part or all of the control is performed by an external apparatus, and in this case, a wired or wireless communication circuit is interposed. The communication is only required to be performed using Bluetooth, WiFi, a telephone circuit, or the like, and may be performed using a USB or the like. A dedicated circuit, a general-purpose circuit, and a control unit may be integrally formed as an ASIC. A moving portion or the like is formed by various actuators, and a coupling mechanism for movement as necessary, and the actuators are actuated by a driver circuit. The drive circuit is also controlled by a microcomputer, an ASIC, or the like according to a specific program. For such control, detailed correction, adjustment, and the like may be performed based on information output by various types of sensors and peripheral circuits thereof.

In addition, programs to be executed by an information apparatus or a portable information terminal according to the first to fourth embodiments of the present disclosure are provided with being recorded on a computer readable recording medium such as a CD-ROM, flexible disk (FD), CD-R, a digital versatile disk (DVD), a USB medium, and a flash memory, in file data in an installable format or executable format.

In addition, programs to be executed by an information apparatus or a portable information terminal according to the first to fourth embodiments of the present disclosure may be stored on a computer connected to a network such as the internet, and provided by being downloaded via the network. Furthermore, programs to be executed by an information apparatus or a portable information terminal according to the first to fourth embodiments of the present disclosure may be provided or delivered via a network such as the internet.

In addition, in the description of the flowcharts in this specification, an anteroposterior relationship in processing between steps is clearly indicated using wordings such as "first", "after that", and "subsequently", but the order of processes necessary for implementing the present disclosure is not uniquely defined by these wordings. In other words, the order of processes in the flowcharts described in this specification can be changed without causing contrariety. In addition, programs are not limited to such programs including simple branched processing, and branching may be performed by comprehensively determining a larger number of determination items. In this case, a technique of artificial intelligence that performs machine learning by promoting the user to perform a manual operation and repeating learning may be used together. In addition, execution may be performed by learning operation patterns performed by many professionals, and performing deep learning by inputting further complicated conditions.

Several embodiments of the embodiments of the subject application have been described in detail above based on the drawings, but these are exemplifications, and the present disclosure can be implemented in another mode on which various modifications and improvements are performed based on the knowledge of the one skilled in the art, starting from the modes described in the field of the present disclosure.

In addition, in the description or the drawings, a term described at least once with a different term having a broader sense or the same sense can be replaced with the different term in any location in the description or the drawings. In this manner, various modifications and applications can be made without departing from the scope of the disclosure.

In this manner, the present disclosure can include various embodiments that are not described here, and various design changes and the like can be performed without departing from the identified technical idea.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

(Additional Statement 1)

An information apparatus for interactively communicating with a portable information terminal, the information apparatus including:

an operating unit configured to switch a power state of the information apparatus;

a use situation determination unit configured to determine a use situation of the information apparatus after a predetermined time has passed from when the power state is switched by the operating unit; and a communication controller configured to transmit a determination result of the use situation determination unit to the portable information terminal.

(Additional Statement 2)

The information apparatus according to Additional Statement 1, wherein the use situation determination unit determines, as the use situation, any one or more of an operational situation of the information apparatus and a maintenance situation of the information apparatus.

(Additional Statement 3)

The information apparatus according to Additional Statement 1, further including a clock configured to count time and date from a time point at which the power state is switched by the operating unit, wherein the use situation determination unit determines an operational situation of the information apparatus based on the time and date counted by the clock.

(Additional Statement 4)

The information apparatus according to Additional Statement 1, further including a consultation information generation unit configured to generate consultation information for consulting with a user of the portable information terminal, based on a determination result of the use situation determination unit, wherein the communication controller transmits the consultation information generated by the consultation information generation unit, to the portable information terminal.

(Additional Statement 5)

The information apparatus according to Additional Statement 4, wherein the consultation information generation unit generates the consultation information based on event information received from the portable information terminal and a determination result of the use situation determination unit.

(Additional Statement 6)

The information apparatus according to Additional Statement 4, further including a use information generation unit configured to generate use information regarding a use situation of the information apparatus, wherein the consultation information generation unit generates the consultation information based on the use information generated by the use information generation unit and a determination result of the use situation determination unit.

(Additional Statement 7)

The information apparatus according to Additional Statement 4, further including a position information acquisition unit configured to acquire position information regarding a position of the information apparatus, wherein the consultation information generation unit generates the consultation information based on the position information acquired by the position information acquisition unit and a determination result of the use situation determination unit.

(Additional Statement 8)

The information apparatus according to Additional Statement 4, wherein the consultation information generation unit generates the consultation information different in content, according to an elapsed time.

(Additional Statement 9)

The information apparatus according to Additional Statement 4, wherein the consultation information includes a message prompting taking out of the information apparatus to an outside.

(Additional Statement 10)

The information apparatus according to Additional Statement 4, wherein the consultation information includes a message prompting sellout of the information apparatus.

What is claimed is:

1. An information apparatus for communicating with a portable information terminal, the information apparatus comprising:
    a power switch configured to switch a power state of the information apparatus from an on state to an off state;
    a memory configured to store use history information recording a use history of a manually set parameter in the information apparatus; and
    a processor comprising hardware, the processor being configured to:
        determine state information regarding a state of the information apparatus when the power state is switched, by the power switch, from the on state to the office state;
        determine whether the manually set parameter has been changed before and after the power state is switched from the on state to the off state, based on the use history information of a manually set parameter in the information apparatus; and
        transmit, to the portable information terminal, the state information indicating that the set parameter in the information apparatus has been changed when the processor determines that the set parameter has been changed while keeping the processor energized after the power state is switched from the on state to the off state.

2. The information apparatus according to claim 1, wherein
    the processor generates consultation information for consulting with a user of the portable information terminal, based on the use situation, and
    the processor transmits the generated consultation information to the portable information terminal.

3. The information apparatus according to claim 2, wherein the processor generates the consultation information based on information about a scheduled event received from the portable information terminal and the use situation.

4. The information apparatus according to claim 1, further comprising a clock configured to count time and date from an operation time point of the information apparatus,
    wherein the processor determines, as the use situation, an operational situation of the information apparatus based on the time and date counted by the clock.

5. The information apparatus according to claim 4, wherein the processor generates, based on the use situation, consultation information for consulting with a user of the portable information terminal, the consultation information being different in content according to an elapsed time from when the battery of the information apparatus was last charged.

6. The information apparatus according to claim 1, wherein the processor further determines a variation in a wear state of at least one unit of the information apparatus.

7. The information apparatus according to claim 1, wherein the processor further determines, based on the use history information, whether a usage count of the set parameter is equal to or less than a predetermined value has been changed.

8. The information apparatus according to claim 1, wherein the processor returns the set parameter to a state that existed just before the power state is switched when a reset request signal for returning the set parameter to a state that existed just before the power state is switched is input from the portable information terminal.

9. The information apparatus according to claim 1, further comprising a battery remaining amount detection circuit configured to detect a remaining amount of a battery attached to the information apparatus,
    wherein the processor determines whether the detected remaining amount is a predetermined value or less, and
    the processor transmits, to the portable information terminal, the state information indicating that the remaining amount is the predetermined value or less when the remaining amount is the predetermined value or less.

10. The information apparatus according to claim 1, further comprising a memory remaining amount detection circuit configured to detect a memory remaining amount of a non-transitory recording medium attached to the information apparatus,
    wherein the processor determines whether the detected memory remaining amount is a predetermined value or less, and
    the processor transmits, to the portable information terminal, the state information indicating that the memory remaining amount is the predetermined value or less when the memory remaining amount is the predetermined value or less.

11. The information apparatus according to claim 10, wherein, responsive to either of (A) receiving a media release request signal for releasing the memory remaining amount of the recording medium input from the portable information terminal and (B) recording a plurality of moving image data and a plurality of still image data in the recording medium, the processor transmits image data to the portable information terminal from the plurality of moving image data and deletes, from the recording medium, the plurality of moving image data transmitted from the recording medium.

12. The information apparatus according to claim 11, wherein the processor transmits, among the plurality of moving image data, image data to the portable information terminal in an order of older shooting time and date.

13. The information apparatus according to claim 1, further comprising an image sensor configured to generate image data by capturing an image of a subject,
    wherein the processor determines whether the image data has been newly generated after the power state is switched from an on state to an off state, and
    the processor transmits thumbnail image data of the newly-generated image data, as the state information, to the portable information terminal when the image data has been newly generated.

14. The information apparatus according to claim 1 [P6-1], wherein the processor transmits the use situation to the portable information terminal in a state where the information apparatus is unused.

15. A control method executed by an information apparatus for interactively communicating with a portable information terminal, the control method comprising:
    switching, responsive to a user input, a power state of the information apparatus from an on state to an off state;
    storing, on the information apparatus, use history information recording a use history of a manually set parameter in the information apparatus;
    determining, with a processor of the information apparatus, state information regarding a state of the information apparatus when the power state is switched from the on state to the office state;
    determining, with the processor of the information apparatus, whether the manually set parameter has been changed before and after the power state is switched from the on state to the off state, based on the use history information of a manually set parameter in the information apparatus; and
    transmitting, to the portable information terminal, the state information indicating that the set parameter in the information apparatus has been changed when the processor determines that the set parameter has been changed while keeping the processor energized after the power state is switched from the on state to the off state.

16. A non-transitory computer readable recording medium on which an executable program is recorded, the executable program, which when executed by at least one processor of an information apparatus, causes the at least one processor to:
    switch, responsive to a user input, a power state of the information apparatus from an on state to an off state;
    store, on the information apparatus, use history information recording a use history of a manually set parameter in the information apparatus;
    determine state information regarding a state of the information apparatus when the power state is switched from the on state to the office state;
    determine whether the manually set parameter has been changed before and after the power state is switched from the on state to the off state, based on the use history information of a manually set parameter in the information apparatus; and
    transmit, to the portable information terminal, the state information indicating that the set parameter in the information apparatus has been changed when the processor determines that the set parameter has been changed while keeping the processor energized after the power state is switched from the on state to the off state.

17. The information apparatus of claim 1, wherein the processor is further configured to:
    a processor comprising hardware, the processor being configured to:
        determine a use situation based on an operating rate per unit time of the information apparatus, wherein the use situation includes at least one of (A) when the information apparatus has been used, (B) how the information apparatus has been used, (C) when the information apparatus has been unused, (D) a location where the information apparatus is used, (E) a maintenance state of a unit included in the information apparatus, (F) whether repair or replacement is necessary when replacement of a member or replacement of a consumable member has not been performed for a specified time, (G) a continuous operating state of the information apparatus, (H) deterioration of the information apparatus caused by heat generation, (I) a usage value based on a number of releases of a shutter of the information apparatus, (J) a wear state of a battery in the information apparatus, (K) a degree of shutter abrasion in the information apparatus, (L) a degree of deterioration of the battery based on an elapsed time from when the battery was last charged, and (M) a number of charging times of the battery; and
    transmit the use situation to the portable information terminal upon the occurrence of a predetermined condition.

18. The information apparatus of claim 1, wherein the manually set parameter includes at least one of (A) and aperture value (F value), (B) a shutter speed (SS), (C) an ISO sensitivity, (D) an exposure compensation value, (E) image processor parameter, (F) contrast value, (G) a sharpness value, (H) a saturation value, (I) a white balance value, (J) a gradation value, (K) a focal length, (L) a focus position, (M) a type of autofocus (AF) mode, (N) presence or absence of face detection, (O) setting state of special effect processing, and (P) type of image quality mode.

* * * * *